US012733772B2

(12) United States Patent
Ciccone et al.

(10) Patent No.: US 12,733,772 B2
(45) Date of Patent: Sep. 15, 2026

(54) SPACE EFFICIENT GAS VALVES FOR GRILLS

(71) Applicant: Weber-Stephen Products LLC, Palatine, IL (US)

(72) Inventors: John R. Ciccone, Barrington, IL (US); Joshua Lee, Palatine, IL (US); Sebastian Szulakiewicz, Mount Prospect, IL (US)

( * ) Notice: Subject to any disclaimer, the term of this patent is extended or adjusted under 35 U.S.C. 154(b) by 380 days.

(21) Appl. No.: 18/595,362

(22) Filed: Mar. 4, 2024

(65) Prior Publication Data

US 2025/0275650 A1 Sep. 4, 2025

(51) Int. Cl.
*A47J 37/07* (2006.01)
*F23K 5/00* (2006.01)

(52) U.S. Cl.
CPC ........... *A47J 37/0786* (2013.01); *F23K 5/007* (2013.01); *F23K 2900/05002* (2013.01)

(58) Field of Classification Search
USPC ................ 251/311; 137/625.47, 625.19, 905
See application file for complete search history.

(56) References Cited

U.S. PATENT DOCUMENTS 1,982,101 A * 11/1934 Herbster .................. F23Q 9/00 431/280
2,106,310 A * 1/1938 Warrick ................ F16K 11/083 431/280
2,108,299 A * 2/1938 Steffen .................. F16K 5/0214 431/280
2,162,232 A * 6/1939 Schoenberger ......... F16K 5/106 137/625

(Continued)

FOREIGN PATENT DOCUMENTS

CN 202597769 U 12/2012
CN 106641340 B 11/2018

(Continued)

OTHER PUBLICATIONS

International Searching Authority, "International Search Report and Written Opinion," issued in connection with International Patent Application No. PCT/US2024/058081, mailed on Mar. 18, 2025, 11 pages.

(Continued)

*Primary Examiner* — Jorge A Pereiro
(74) *Attorney, Agent, or Firm* — Avantech Law, LLP

(57) ABSTRACT

Space efficient gas valves for grills are disclosed. An example gas valve includes a chamber, a flow control member, an inlet conduit, an outlet conduit, and a stem. The flow control member is disposed within the chamber and is rotatable between an open position and a closed position. The inlet conduit extends downwardly from the chamber and includes an inlet flow channel having an inlet. The outlet conduit extends upwardly from the chamber and includes an outlet flow channel having an outlet. The stem is operatively coupled to the flow control member such that rotation of the stem about an axis of rotation of the stem causes a corresponding rotation of the flow control member within the chamber about an axis of rotation of the flow control member. The outlet of the outlet flow channel is located above the axis of rotation of the of the flow control member.

20 Claims, 29 Drawing Sheets

SECTION A-A

(56) References Cited

U.S. PATENT DOCUMENTS

| | | | | | |
|---|---|---|---|---|---|
| 2,162,233 | A * | 6/1939 | Schoenberger | F16K 5/106 | 137/625 |
| 2,252,134 | A * | 8/1941 | Mueller | F16K 5/12 | 137/625 |
| 2,304,140 | A * | 12/1942 | Bergholm | A47J 37/0682 | 126/41 R |
| 2,667,325 | A * | 1/1954 | Mueller | F16K 35/04 | 251/297 |
| 2,683,465 | A * | 7/1954 | Mueller | F16K 35/04 | 251/297 |
| 2,854,027 | A * | 9/1958 | Kaiser | A61M 39/223 | D23/245 |
| 2,855,955 | A * | 10/1958 | Lamar | F16K 5/12 | 137/601.19 |
| 2,855,956 | A * | 10/1958 | Huff | F16K 5/12 | 137/625.47 |
| 4,779,643 | A * | 10/1988 | Genbauffe | F16K 5/0207 | 137/601.19 |
| 4,886,044 | A * | 12/1989 | Best | A47J 37/0682 | 126/41 R |
| 7,096,887 | B2 * | 8/2006 | Tupa | F23N 1/007 | 137/625.47 |
| 8,387,611 | B2 | 3/2013 | Bruno et al. | | |
| 8,764,436 | B2 * | 7/2014 | Deng | F23K 5/147 | 431/278 |
| 9,347,665 | B2 | 5/2016 | Gadini et al. | | |
| 9,488,282 | B2 | 11/2016 | Li | | |
| 9,696,041 | B2 | 7/2017 | Moro et al. | | |
| 9,791,063 | B2 | 10/2017 | Querejeta Andueza | | |
| 10,203,117 | B2 | 2/2019 | Moon et al. | | |
| 10,760,697 | B2 | 9/2020 | Querejeta Andueza et al. | | |
| 10,835,078 | B2 | 11/2020 | Querejeta Andueza et al. | | |
| 10,900,663 | B2 | 1/2021 | Bertelli | | |
| 11,054,047 | B2 | 7/2021 | Querejeta Andueza | | |
| 11,346,553 | B2 | 5/2022 | Bratti et al. | | |
| 11,391,459 | B2 | 7/2022 | Arriola-Bengoa Unzueta et al. | | |
| 11,486,507 | B2 | 11/2022 | Lewis | | |
| 11,536,452 | B2 | 12/2022 | Pablo Curto et al. | | |
| 11,892,099 | B2 | 2/2024 | Pintossi | | |
| 2005/0178450 | A1 | 8/2005 | Tupa et al. | | |
| 2010/0126495 | A1 | 5/2010 | Shaffer | | |
| 2011/0174405 | A1 | 7/2011 | Jones | | |
| 2018/0347728 | A1 | 12/2018 | Li | | |
| 2019/0093885 | A1 * | 3/2019 | Kalisiak | F23N 1/007 | |
| 2019/0313849 | A1 * | 10/2019 | Yin | A47J 37/0713 | |
| 2022/0010959 | A1 | 1/2022 | Zhou et al. | | |
| 2022/0186936 | A1 | 6/2022 | Gonzalez Llana et al. | | |
| 2022/0333785 | A1 | 10/2022 | Shoeb et al. | | |
| 2023/0167909 | A1 | 6/2023 | Turhan | | |
| 2023/0167974 | A1 | 6/2023 | Turhan | | |

FOREIGN PATENT DOCUMENTS

| | | | |
|---|---|---|---|
| CN | 217301717 | U | 8/2022 |
| DE | 202022101919 | U1 | 4/2022 |
| EP | 3077731 | B1 | 3/2019 |
| EP | 3546831 | B1 | 8/2020 |
| EP | 3521701 | B1 | 1/2021 |
| EP | 3438536 | B1 | 6/2021 |
| EP | 3438542 | B1 | 11/2021 |
| EP | 3740716 | B1 | 3/2023 |
| EP | 3935315 | B1 | 8/2023 |
| ES | 1065130 | U | 6/2007 |
| ES | 1229089 | U | 5/2019 |
| GB | 2264770 | A | 9/1993 |
| GB | 2407865 | A | 5/2005 |
| WO | 2022167910 | A1 | 8/2022 |
| WO | 2022240372 | A1 | 11/2022 |

OTHER PUBLICATIONS

Weber, Slate 30" Rust-Resistant Griddle, accessed on Feb. 15, 2024 from https://www.weber.com/us/en/griddle/stand-up-griddles/slate-30-rust-resistant-griddle/1500014.html.

Weber, Slate 36" Rust-Resistant Griddle, accessed on Feb. 15, 2024 from https://www.weber.com/us/en/griddle/stand-up-griddles/slate-36-rust-resistant-griddle/1500216.html.

* cited by examiner

SECTION A-A 100
130
128
132
124
106
120
1010
1008
916
206
1004
918
208
912
904
900
114
910
202
1014
204
922
1002
108
112
920
906
908
902
1012
102
914
104
122
1006
SECTION A-A

SECTION B-B

SECTION A-A 100
2000
130
128
132
124
106
120
1010
1008
916
904
206
1004
918
912
208
1306
102
900
910
114
202
1014
204
922
902
1002
908
108
112
920
906
1304
1202
1502
1012
1212
1216
1402
1200
104
122
1006
SECTION A-A

SECTION B-B

SECTION A-A

SECTION A-A

SECTION B-B

SECTION C-C

SECTION D-D

SECTION E-E

SPACE EFFICIENT GAS VALVES FOR GRILLS

FIELD OF THE DISCLOSURE

This disclosure relates generally to gas valves and, more specifically, to space efficient gas valves for grills.

BACKGROUND

Gas grills are typically equipped with a burner assembly including a manifold, a burner tube, and a gas valve (e.g., a control valve), with the gas valve being operatively positioned between the manifold and the burner tube to control a flow of pressurized fluid (e.g., pressurized gas) from the manifold into the gas valve, and from the gas valve into the burner tube. In such conventional gas grill implementations, it is common for the outlet of the gas valve leading into the burner tube to be coaxially aligned with an axis of rotation of a flow control member of the gas valve, and/or to be coaxially aligned with an axis of rotation of a stem that controls the rotation of such a flow control member.

Figure 1:
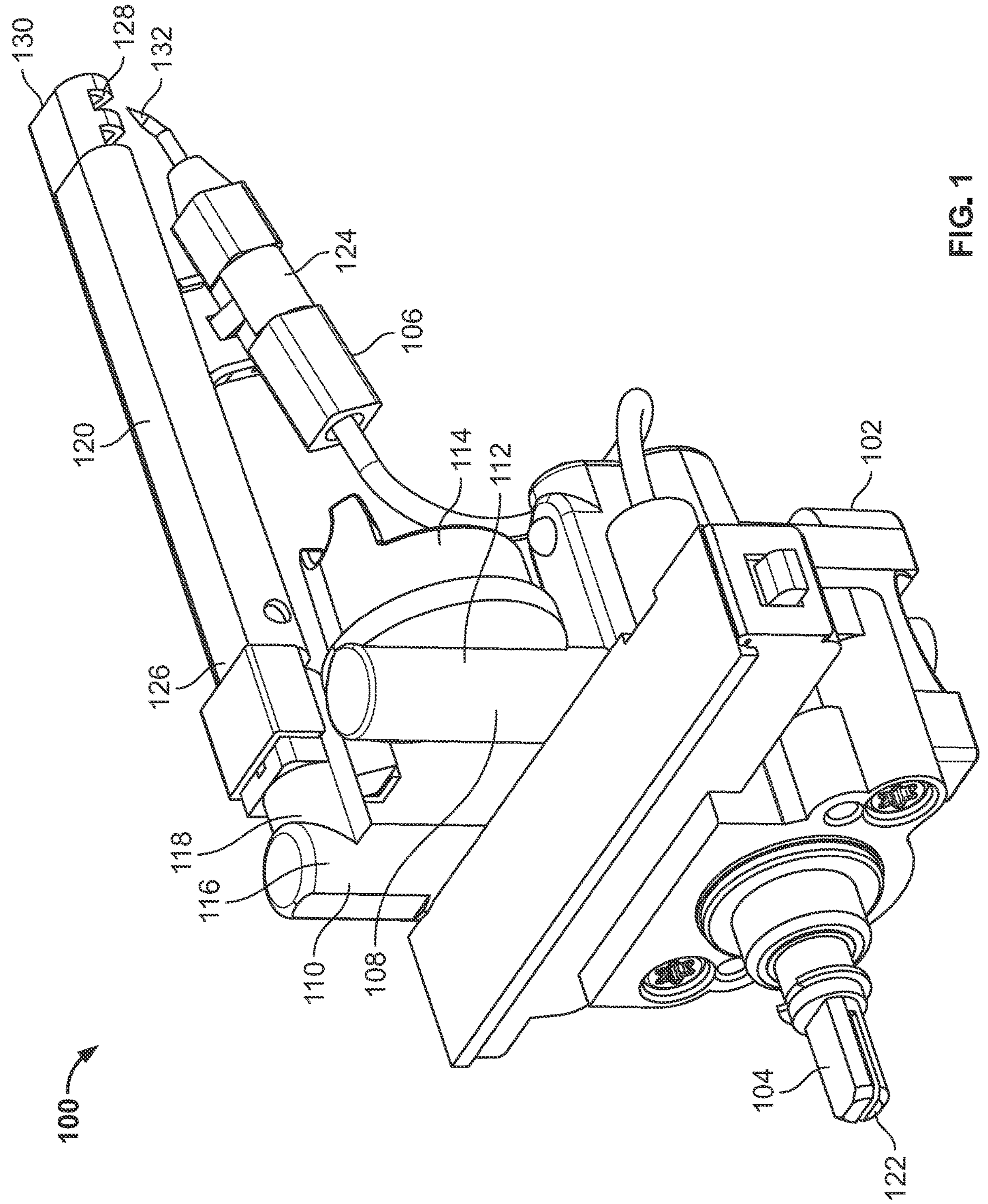
FIG. 1 is a first perspective view of an example gas valve constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

As discussed above, gas grills are typically equipped with a burner assembly including a manifold, a burner tube, and a gas valve (e.g., a control valve), with the gas valve being operatively positioned between the manifold and the burner tube to control a flow of pressurized fluid (e.g., pressurized gas) from the manifold into the gas valve, and from the gas valve into the burner tube. In such conventional gas grill implementations, it is common for the outlet of the gas valve leading into the burner tube to be coaxially aligned with an axis of rotation of a flow control member of the gas valve, and/or to be coaxially aligned with an axis of rotation of a stem that controls the rotation of such a flow control member.

The aforementioned relationship between parts results in a gas valve that is spatially inefficient, particularly with regard to the front-to-to rear distance between the stem of the gas valve and the burner tube of the gas grill. As a result, conventional gas grills often include a control panel chamber (e.g., the area between a control panel of the gas grill and a front wall of a cookbox of the gas grill) that is undesirably large and/or bulky, particularly along the front-to-rear dimension of the control panel chamber.

Example gas valves disclosed herein provide significant improvements with regard to spatial efficiency relative to the gas valves of the conventional gas grills described above. In some disclosed examples, a gas valve includes a chamber, a flow control member, an inlet conduit, an outlet conduit, and a stem. The flow control member is disposed within the chamber. The flow control member is rotatable within the chamber between an open position and a closed position. The inlet conduit extends downwardly from the chamber. The inlet conduit includes an inlet flow channel having an inlet. The outlet conduit extends upwardly from the chamber. The outlet conduit includes an outlet flow channel having an outlet. The stem is operatively coupled to the flow control member such that rotation of the stem about an axis of rotation of the stem causes a corresponding rotation of the flow control member within the chamber about an axis of rotation of the flow control member. The outlet of the outlet flow channel is located above the axis of rotation of the of the flow control member.

In some disclosed examples, the inlet conduit is configured to be coupled to a manifold of a grill such that the inlet is in fluid communication with the manifold, and the outlet conduit is configured to be coupled to a burner tube of the grill such that the outlet is in fluid communication with the burner tube.

In some disclosed examples, the axis of rotation of the flow control member is coaxially aligned with the axis of rotation of the stem.

In some disclosed examples, the chamber includes an inlet opening and an outlet opening, and the flow control member includes a flow chamber having an inlet opening and an outlet opening. In some disclosed examples, the inlet flow channel of the inlet conduit is in fluid communication with the flow chamber of the flow control member via the inlet opening of the chamber and the inlet opening of the flow chamber when the flow control member is in the open position, and the inlet flow channel of the inlet conduit is not in fluid communication with the flow chamber of the flow control member when the flow control member is in the closed position. In some disclosed examples, the outlet flow channel of the outlet conduit is in fluid communication with the flow chamber of the flow control member via the outlet opening of the flow control member and the outlet opening of the chamber when the flow control member is in the open position, and the outlet flow channel of the outlet conduit remains in fluid communication with the flow chamber of the flow control member via the outlet opening of the flow control member and the outlet opening of the chamber when the flow control member is in the closed position.

In some disclosed examples, the outlet opening of the chamber is a first outlet opening of the chamber and the chamber further includes a second outlet opening, the outlet opening of the flow chamber is a first outlet opening of the flow chamber and the flow chamber further includes a second outlet opening, the outlet conduit is a first outlet conduit of the gas valve, the outlet flow channel is a first outlet flow channel, and the outlet is a first outlet, and the gas valve further includes a second outlet conduit including a second outlet flow channel having a second outlet. In some disclosed examples, the second outlet flow channel of the second outlet conduit is in fluid communication with the flow chamber of the flow control member via the second outlet opening of the flow chamber and the second outlet opening of the chamber when the flow control member is in the open position, and the second outlet flow channel of the second outlet conduit is not in fluid communication with the flow chamber of the flow control member when the flow control member is in the closed position. In some disclosed examples, the second outlet conduit is configured to be coupled to an ignition conduit of a grill such that the second outlet is in fluid communication with the ignition conduit.

In some disclosed examples, a gas train of the gas valve includes an S-shaped portion defined by the chamber and the outlet flow channel. In some disclosed examples, the outlet flow channel includes a first segment extending upwardly from and being in fluid communication with the chamber, a second segment extending forwardly from and being in fluid communication with the first segment, a third segment extending upwardly from and being in fluid communication with the second segment, and a fourth segment extending rearwardly from and being in fluid communication with the third segment. In some disclosed examples, the fourth segment includes the outlet, and the S-shaped portion of the gas train includes the chamber, the first segment, the second segment, the third segment, and the fourth segment. In some disclosed examples, the first segment, the second segment, the third segment, and the fourth segment are linear. In some disclosed examples, a central axis of the chamber, a central axis of the second segment, and a central axis of the fourth segment are parallel to one another and horizontally oriented, and a central axis of the first segment and a central axis of the third segment are parallel to one another and vertically oriented. In some disclosed examples, the central axis of the second segment is located above the central axis of the chamber, the central axis of the fourth segment is located above the central axis of the second segment, the central axis of the third segment is located forward of the central axis of the first segment, and the central axis of the third segment is parallel to and located forward of a central axis of the inlet flow channel.

The above-described features of the disclosed gas valves advantageously provide significant improvements with regard to spatial efficiency relative to gas valves of the conventional gas grills described above. In this regard, positioning the outlet of the gas valve at a location that is offset from (e.g., located above) the axis of rotation of the flow control member of the gas valve, and/or offset from (e.g., located above) the axis of rotation of the stem of the gas valve enables the front-to-rear distance between the stem of the gas valve and the outlet of the gas valve to be reduced (e.g., minimized). The improved space efficiency associated with this reduced dimension of the gas valve advantageously enables the gas valve to be disposed within a correspondingly smaller (e.g., reduced depth) control panel chamber of a grill, and also advantageously enables the burner ports of a burner tube of such a grill to be located closer to an interior front wall of a cookbox of the grill, and/or closer to a front lip of a flat top cooking surface of a griddle of the grill, as further described herein.

The above-identified features as well as other advantageous features of example space efficient gas valves for grills as disclosed herein are further described below in connection with the figures of the application.

As used herein, the term "configured" means sized, shaped, arranged, structured, oriented, positioned, and/or located. For example, in the context of a first part configured to fit within a second part, the first part is sized, shaped, arranged, structured, oriented, positioned, and/or located to fit within the second part.

As used herein in the context of a first object circumscribing a second object, the term "circumscribe" means that the first object is constructed around and/or defines an area around the second object. In interpreting the term "circumscribe" as used herein, it is to be understood that the first object circumscribing the second object can include gaps and/or can consist of multiple spaced-apart objects, such that a boundary formed by the first object around the second object is not necessarily a continuous boundary.

As used herein, unless otherwise stated, the terms "above" and "below" describe the relationship of two parts relative to Earth. For example, as used herein, a first part is "above" a second part if the second part is closer to Earth than the first part is. As another example, as used herein, a first part is "below" a second part if the first part is closer to Earth than the second part is. It is to be understood that a first part can be above or below a second part with one or more of: another part or parts therebetween; without another part therebetween; with the first and second parts contacting one another; or without the first and second parts contacting one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts at the point (or points) of contact between the two parts.

As used herein, the term "fastener" means any device(s), structure(s), and/or material(s) that is/are configured, individually or collectively, to couple, connect, attach, and/or fasten one or more component(s) to one or more other component(s). For example, a fastener can be implemented by any type(s) and/or any number(s) of bolts, nuts, screws, posts, anchors, rivets, pins, clips, ties, welds, adhesives, etc.

As used herein in the context of describing the relationship between two structures, the terms "in fluid communication," "fluidically connected," and/or "fluidically coupled" mean that the two structures are individually and/or collectively configured to allow a fluid (e.g., a gas or a liquid) to pass (e.g., to flow) from the first of the two structures to the second of the two structures, or vice-versa. For example, a second flow channel may be described as being in fluid communication with a first flow channel when a fluid (e.g., a gas or a liquid) is able to pass (e.g., to flow) from the first flow channel into the second flow channel, or from the second flow channel into the first flow channel.

As used herein, the terms "substantially" and/or "approximately" modify their subjects and/or values to recognize the potential presence of variations that occur in real world applications. For example, "substantially" and/or "approximately" may modify dimensions that may not be exact due to manufacturing tolerances and/or other real-world imperfections as will be understood by persons of ordinary skill in the art. For example, "substantially" and/or "approximately" may indicate such dimensions may be within a tolerance range of +/−10% unless otherwise specified in the description provided herein.

As used herein, the terms "including" and "comprising" (and all forms and tenses thereof) are open-ended terms. Thus, whenever the written description or a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or method actions may be implemented by, for example, the same entity or object. Additionally, although individual features may be included in different examples or claims, these may possibly be combined, and the inclusion in different examples or claims does not imply that a combination of features is not feasible and/or advantageous.

The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C.

As used herein, when the phrase "at least" is used as the transition term in, for example, a preamble of a claim, it is open-ended in the same manner as the term "comprising" and "including" are open-ended. As used herein in the context of describing structures, components, items, objects, and/or things, the phrase "at least one of A and B" is intended to refer to implementations including any of (1) at least one A, (2) at least one B, or (3) at least one A and at least one B. Similarly, as used herein in the context of describing structures, components, items, objects, and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, or (3) at least one A and at least one B.

Figure 2:
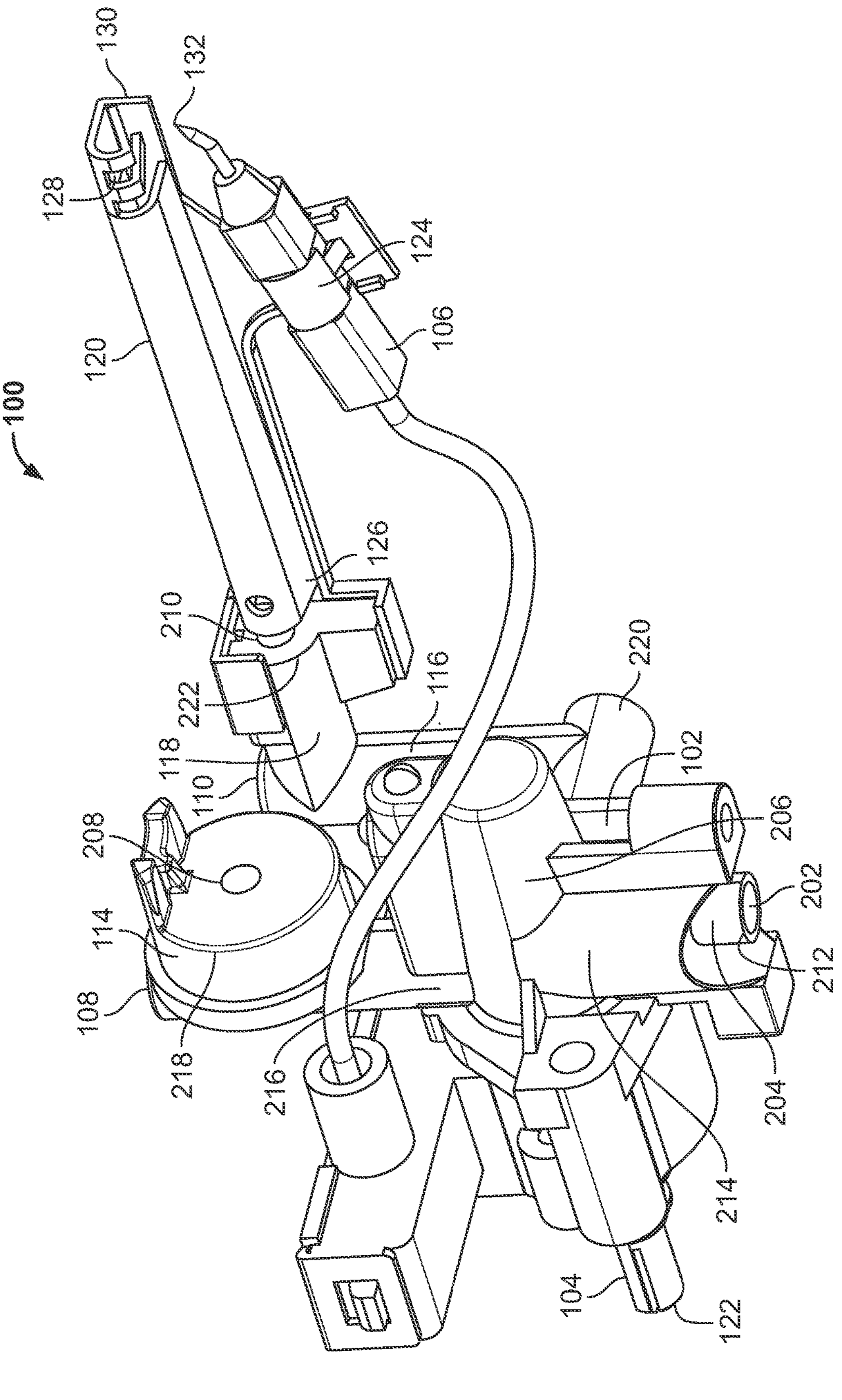
FIG. 2 is a second perspective view of the gas valve of FIG. 1.
Figure 3:
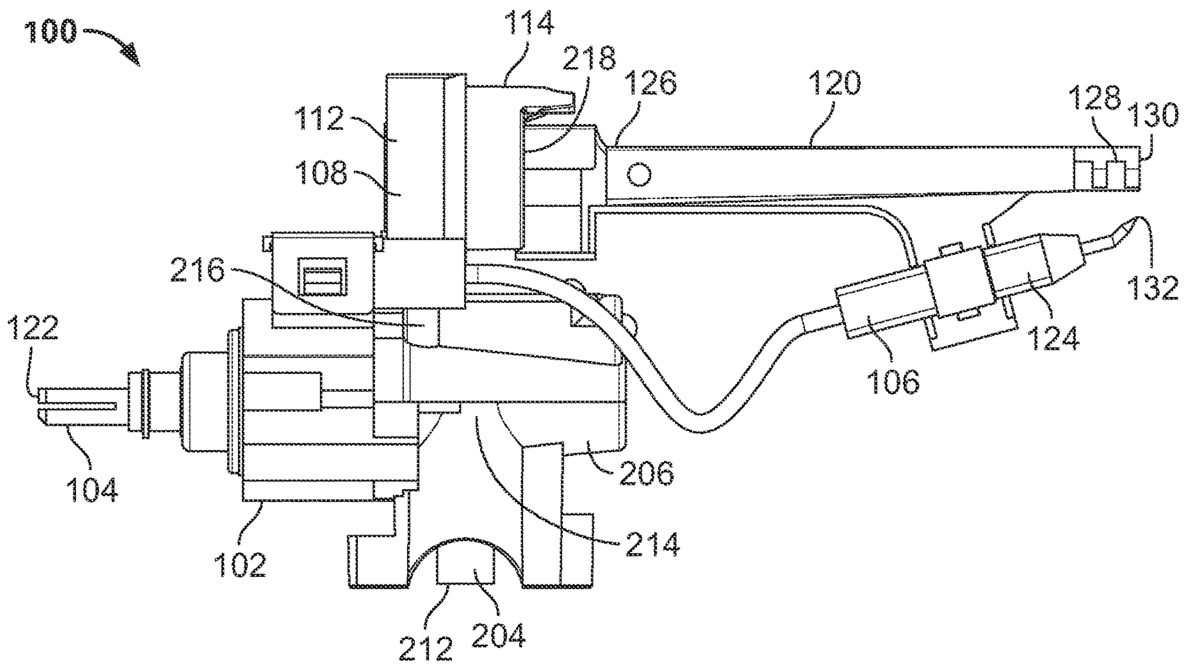
FIG. 3 is a right side view of the gas valve of FIGS. 1 and 2.
Figure 4:
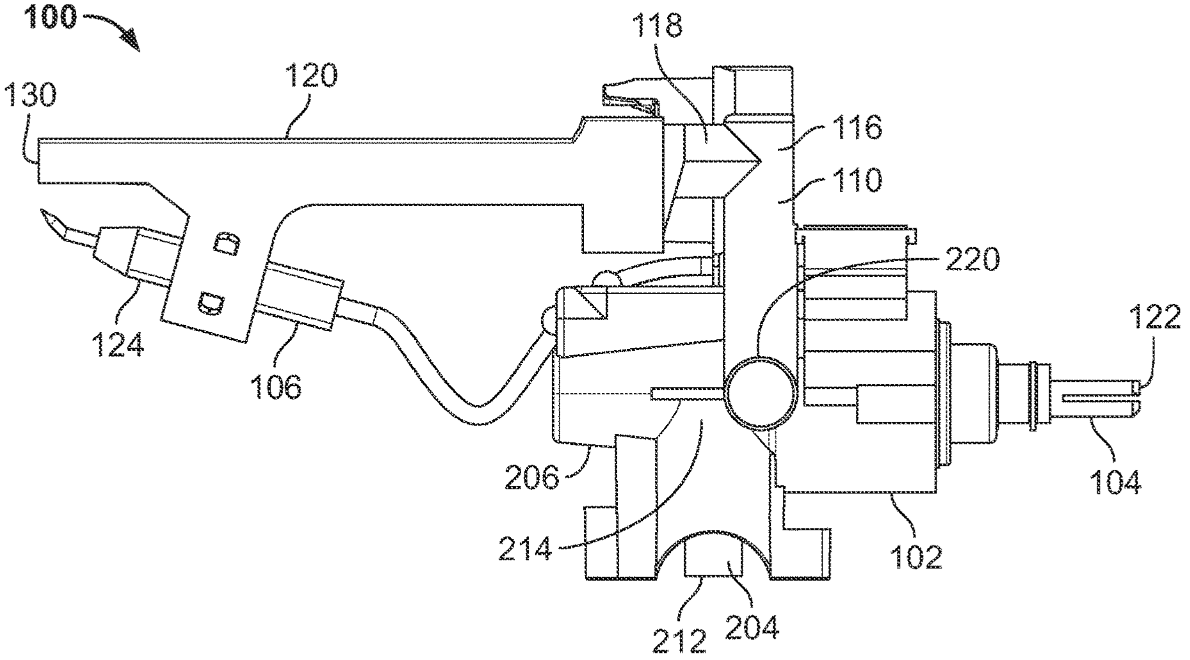
FIG. 4 is a left side view of the gas valve of FIGS. 1-3.
Figure 5:
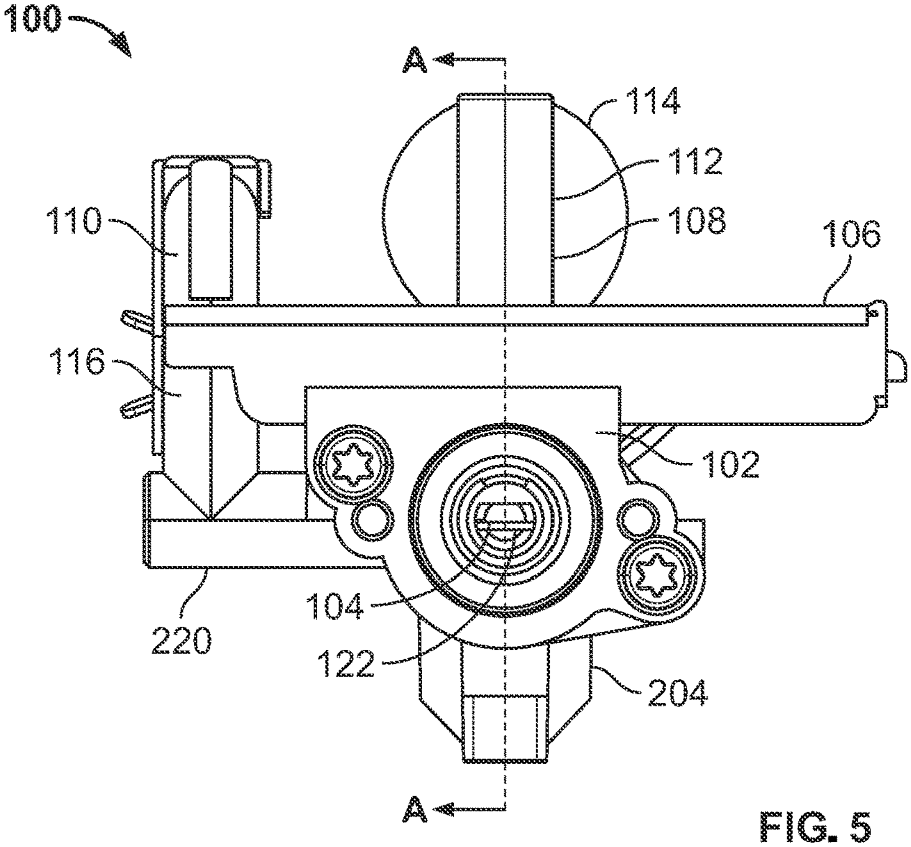
FIG. 5 is a front view of the gas valve of FIGS. 1-4.
Figure 6:
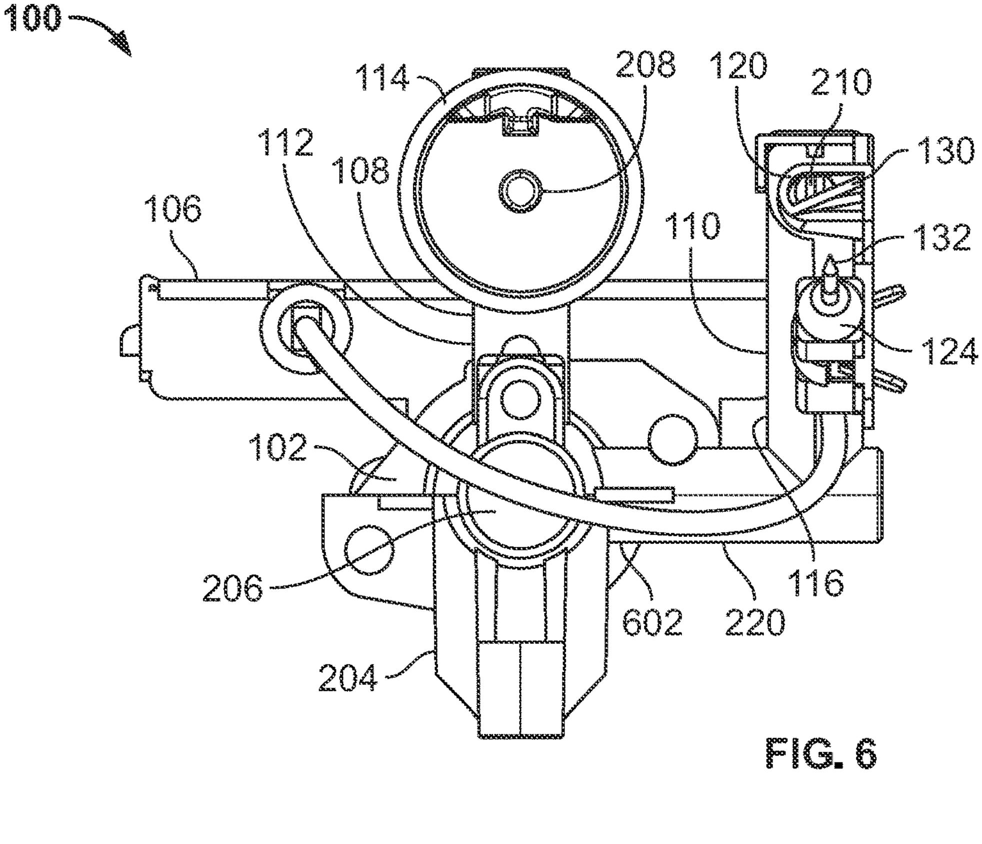
FIG. 6 is a rear view of the gas valve of FIGS. 1-5.
Figure 8:
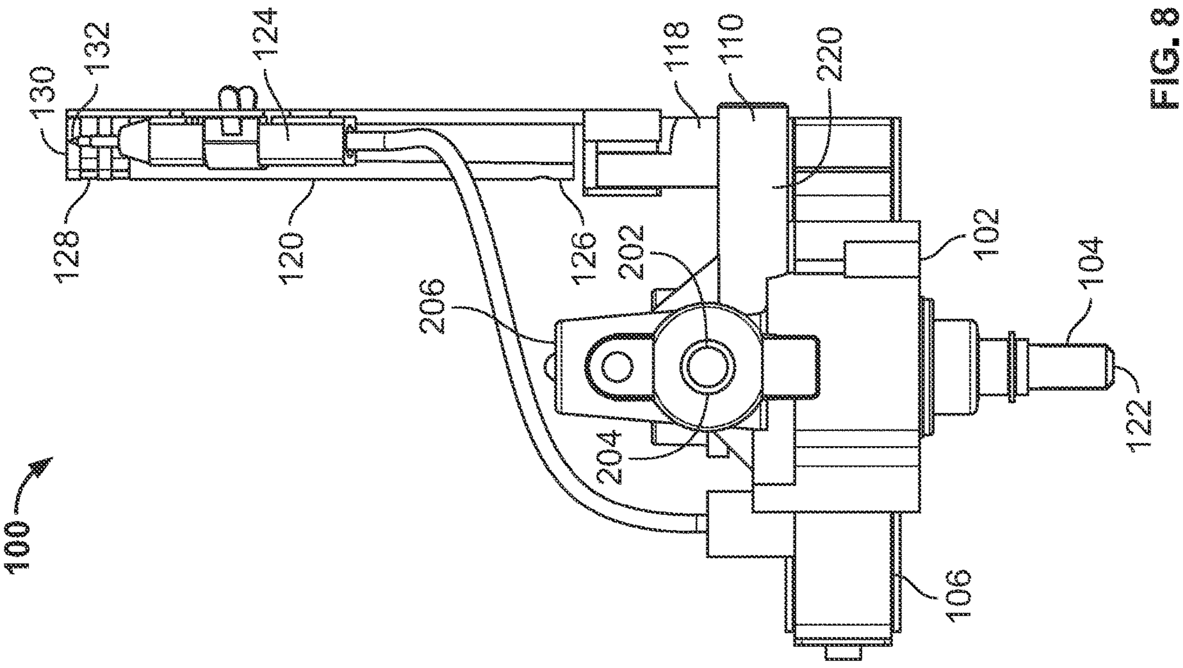
FIG. 8 is a bottom view of the gas valve of FIGS. 1-7.
Figure 7:
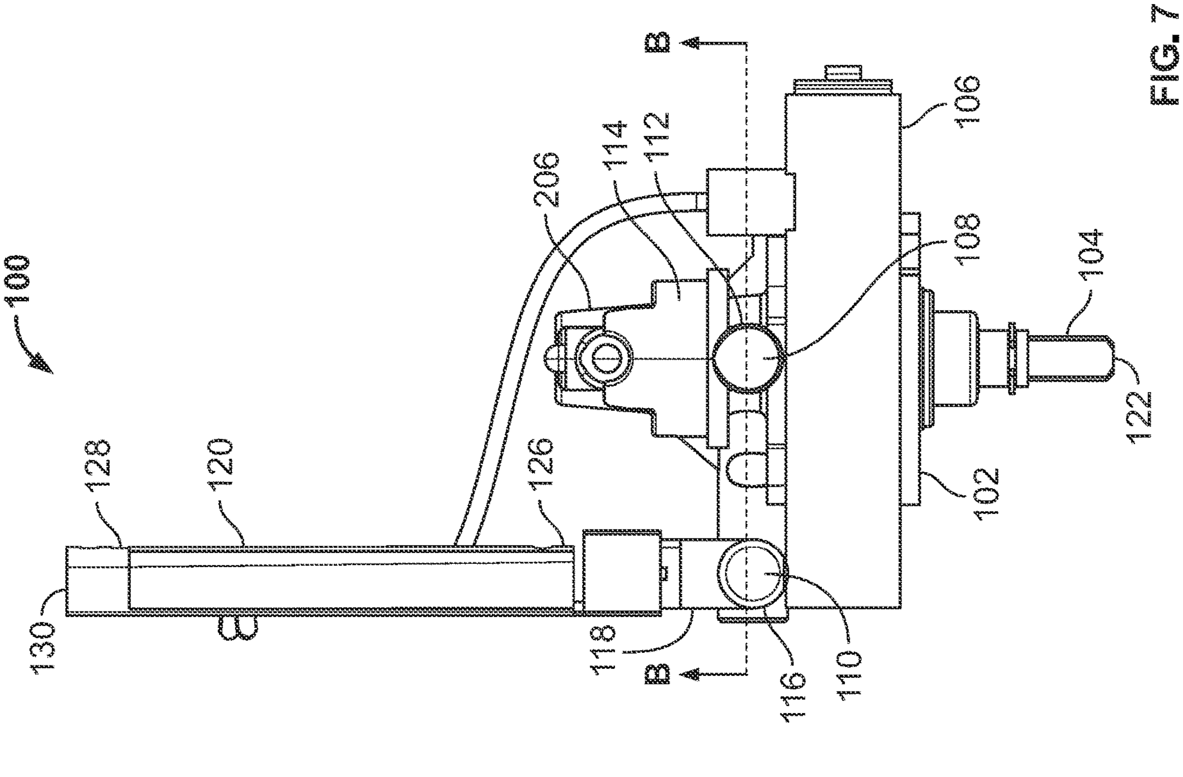
FIG. 7 is a top view of the gas valve of FIGS. 1-6.

FIG. 1 is a first perspective view of an example gas valve 100 constructed in accordance with the teachings of this disclosure. FIG. 2 is a second perspective view of the gas valve 100 of FIG. 1. FIG. 3 is a right side view of the gas valve 100 of FIGS. 1 and 2. FIG. 4 is a left side view of the gas valve 100 of FIGS. 1-3. FIG. 5 is a front view of the gas valve 100 of FIGS. 1-4. FIG. 6 is a rear view of the gas valve 100 of FIGS. 1-5. FIG. 7 is a top view of the gas valve 100 of FIGS. 1-6. FIG. 8 is a bottom view of the gas valve 100 of FIGS. 1-7. The gas valve 100 of FIGS. 1-8 includes an example body 102, a flow control member, an example stem 104, and an example ignition assembly 106. The body 102 of the gas valve 100 is configured to house, contain, carry, and/or support the flow control member, the stem 104, and the ignition assembly 106 of the gas valve 100, as further described herein.

In the illustrated example of FIGS. 1-8, the body 102 of the gas valve 100 includes an example inlet 202, an example inlet conduit 204, an example chamber housing 206, an example first outlet conduit 108, an example first outlet 208, an example second outlet conduit 110, and an example second outlet 210. The inlet 202 of the body 102 is formed by and/or located at an example first end 212 of the inlet conduit 204. The inlet 202 and/or the first end 212 of the inlet conduit 204 of the body 102 is/are configured to be coupled to a manifold such that a pressurized fluid (e.g., a pressurized gas) present in and/or flowing through the manifold is able to flow into the inlet 202 and/or into the first end 212 of the inlet conduit 204. The inlet 202 of the body 102 is accordingly in fluid communication with the manifold, as further described herein.

The inlet conduit 204 of the body 102 of FIGS. 1-8 is coupled (e.g., at or proximate to an example second end 214 of the inlet conduit 204) to the chamber housing 206 of the body 102. The inlet conduit 204 is configured to transport and/or carry pressurized fluid (e.g., pressurized gas) from the inlet 202 of the body 102 toward and/or into the chamber housing 206 of the body 102. In this regard, the inlet conduit 204 includes and/or defines an inlet flow channel that is fluidically coupled to and extends between the inlet 202 of the body 102 and a chamber of the chamber housing 206 of the body 102. The inlet flow channel of the inlet conduit 204 is further described below in connection with FIGS. 9-11 and 20-25.

In the illustrated example of FIGS. 1-8, the inlet conduit 204 of the body 102 extends downwardly from the chamber housing 206 of the body 102 such that at least a portion (e.g., the first end 212) of the inlet conduit 204 is located below the chamber housing 206. In other examples, inlet conduit 204 of the body 102 can instead extend laterally from (e.g., to the right or to the left of) the chamber housing 206 of the body 102. In the illustrated example of FIGS. 1-8, the inlet conduit 204 of the body 102 is oriented vertically (e.g., at ninety degrees relative to a horizontal plane). In other examples, the inlet conduit 204 can instead be oriented horizontally (e.g., parallel to a horizontal plane). In still other examples, the inlet conduit 204 can instead be oriented at an angle between a horizontal orientation and a vertical orientation (e.g., at thirty degrees, forty-five degrees, sixty degrees, etc. relative to a horizontal plane). In the illustrated example of FIGS. 1-8, the inlet conduit 204 of the body 102 includes a single linear segment. In other examples, the inlet conduit 204 can instead include a single curved or contoured segment. In still other examples, the inlet conduit 204 can instead include a plurality of segments of any types, sizes, and/or orientations, with respective ones of the segments being joined together to form the inlet conduit 204 as a whole.

The chamber housing 206 of the body 102 of FIGS. 1-8 is coupled to the inlet conduit 204, to first outlet conduit 108, and to the second outlet conduit 110 of the body 102. The chamber housing 206 is configured to transport and/or carry pressurized fluid (e.g., pressurized gas) from the inlet conduit 204 of the body 102 toward and/or into the first outlet conduit 108 of the body 102, and/or toward and/or into the second outlet conduit 110 of the body 102. In this regard, the chamber housing 206 includes and/or defines a chamber that is fluidically coupled to and extends between an inlet flow channel of the inlet conduit 204 of the body 102 on the one hand, and respective ones of a first outlet flow channel of the first outlet conduit 108 and a second outlet flow channel of the second outlet conduit 110 of the body 102 on the other hand. The chamber of the chamber housing 206 is configured to receive and/or contain the flow control member of the gas valve 100, with the flow control member being rotatable relative to the chamber of the chamber housing 206 and/or, more generally, relative to the body 102 of the gas valve 100. The chamber of the chamber housing 206 is further described below in connection with FIGS. 9-11 and 20-25. An example flow control member that is configured to be received within the chamber of the chamber housing 206 is further described below in connection with FIGS. 12-25.

In the illustrated example of FIGS. 1-8, the chamber housing 206 is oriented horizontally (e.g., parallel to a horizontal plane). In other examples, the chamber housing 206 can instead be oriented at an angle between a horizontal orientation and a vertical orientation (e.g., at thirty degrees, forty-five degrees, sixty degrees, etc. relative to a horizontal plane). In the illustrated example of FIGS. 1-8, a first portion (e.g., a front portion) of the chamber housing 206 of the body 102 extends, projects, and/or is located forward from and/or relative to the inlet conduit 204 of the body 102, and a second portion (e.g., a rear portion) of the chamber housing 206 of the body 102 extends, projects, and/or is located rearward from and/or relative to the inlet conduit 204 of the body 102. In other examples, the chamber housing 206 can instead be configured such the first portion (e.g., the front portion) of the chamber housing 206 of the body 102 extends, projects, and/or is located forward from and/or relative to the inlet conduit 204 of the body 102, and the second portion (e.g., the rear portion) of the chamber housing 206 of the body 102 does not extend or project, and/or is not located rearward from and/or relative to, the inlet conduit 204 of the body 102. In other examples, the chamber housing 206 can instead be configured such the first portion (e.g., the front portion) of the chamber housing 206 of the body 102 does not extend or project, and/or is not located forward from and/or relative to, the inlet conduit 204 of the body 102, and the second portion (e.g., the rear portion) of the chamber housing 206 of the body 102 extends, projects, and/or is located rearward from and/or relative to the inlet conduit 204 of the body 102.

The first outlet conduit 108 of the body 102 of FIGS. 1-8 is coupled (e.g., at or proximate to an example first end 216 of the first outlet conduit 108) to the chamber housing 206 of the body 102. The first outlet conduit 108 is configured to transport and/or carry pressurized fluid (e.g., pressurized gas) from the chamber housing 206 of the body 102 toward and/or to the first outlet 208 of the body 102. In this regard, the first outlet conduit 108 includes and/or defines a first outlet flow channel that is fluidically coupled to and extends between the chamber of the chamber housing 206 of the body 102 and the first outlet 208 of the body 102. In some examples, a first portion of the first outlet flow channel is included within and/or defined by the chamber housing 206, and a second portion of the first outlet flow channel downstream of the first portion of the first outlet flow channel is included within and/or defined by the first outlet conduit 108. The first outlet flow channel of the first outlet conduit 108 is further described below in connection with FIGS. 9-11 and 20-25.

In the illustrated example of FIGS. 1-8, the first outlet conduit 108 of the body 102 includes an example first segment 112 and an example second segment 114, with the second segment 114 being coupled to the first segment 112. In other examples, the first outlet conduit 108 can include a different number (e.g., 1, 3, 4, etc.) of segments. In the illustrated example of FIGS. 1-8, the first segment 112 of the first outlet conduit 108 extends upwardly from the chamber housing 206 of the body 102 such that at least a portion of the first segment 112 of the first outlet conduit 108 is located above the chamber housing 206. In other examples, the first segment 112 of the first outlet conduit 108 can instead extend laterally from (e.g., to the right or to the left of) the chamber housing 206 of the body 102. In the illustrated example of FIGS. 1-8, the first segment 112 of the first outlet conduit 108 is oriented vertically (e.g., at ninety degrees relative to a horizontal plane). In other examples, the first segment 112 of the first outlet conduit 108 can instead be oriented horizontally (e.g., parallel to a horizontal plane). In still other examples, the first segment 112 of the first outlet conduit 108 can instead be oriented at an angle between a horizontal orientation and a vertical orientation (e.g., at thirty degrees, forty-five degrees, sixty degrees, etc. relative to a horizontal plane). In the illustrated example of FIGS. 1-8, the first segment 112 of the first outlet conduit 108 is linear. In other examples, the first segment 112 of the first outlet conduit 108 can instead be curved or contoured.

The second segment 114 of the first outlet conduit 108 of FIGS. 1-8 is configured to engage and/or to be coupled to an end portion of a burner tube. For example, as shown in FIGS. 1-8, the second segment 114 of the first outlet conduit 108 is configured to be inserted into an open end of a burner tube such that the burner tube circumscribes the second segment 114 of the first outlet conduit 108, as further described below. In the illustrated example of FIGS. 1-8, the second segment 114 of the first outlet conduit 108 extends rearwardly from the first segment 112 of the first outlet conduit 108 such that at least a portion of the second segment 114 of the first outlet conduit 108 is located to the rear of the first segment 112 of the first outlet conduit 108. In the illustrated example of FIGS. 1-8, the second segment 114 of the first outlet conduit 108 is oriented horizontally (e.g., parallel to a horizontal plane). In other examples, the second segment 114 of the first outlet conduit 108 can instead be oriented at an angle between a vertical orientation and a horizontal orientation (e.g., at thirty degrees, forty-five degrees, sixty degrees, etc. relative to a horizontal plane). In the illustrated example of FIGS. 1-8, the second segment 114 of the first outlet conduit 108 is linear. In other examples, the second segment 114 of the first outlet conduit 108 can instead be curved or contoured.

In the illustrated example of FIGS. 1-8, a first portion (e.g., a front portion) of the chamber housing 206 of the body 102 extends, projects, and/or is located forward from and/or relative to the first segment 112 of the first outlet conduit 108 of the body 102, and a second portion (e.g., a rear portion) of the chamber housing 206 of the body 102 extends, projects, and/or is located rearward from and/or relative to the first segment 112 of the first outlet conduit 108 of the body 102. In other examples, the chamber housing 206 can instead be configured such the first portion (e.g., the front portion) of the chamber housing 206 of the body 102 extends, projects, and/or is located forward from and/or relative to the first segment 112 of the first outlet conduit 108 of the body 102, and the second portion (e.g., the rear portion) of the chamber housing 206 of the body 102 does not extend or project, and/or is not located rearward from and/or relative to, the first segment 112 of the first outlet conduit 108 of the body 102. In still other examples, the chamber housing 206 can instead be configured such the first portion (e.g., the front portion) of the chamber housing 206 of the body 102 does not extend or project, and/or is not located forward from and/or relative to, the first segment 112 of the first outlet conduit 108 of the body 102, and the second portion (e.g., the rear portion) of the chamber housing 206 of the body 102 extends, projects, and/or is located rearward from and/or relative to the first segment 112 of the first outlet conduit 108 of the body 102.

The first outlet 208 of the body 102 is formed by and/or located at an example second end 218 of the first outlet conduit 108. The first outlet 208 and/or the second end 218 of the first outlet conduit 108 of the body 102 is/are configured to be coupled to a burner tube such that a pressurized fluid (e.g., a pressurized gas) present in and/or flowing through the first outlet conduit 108 and/or the first outlet 208 is able to flow into the burner tube. The burner tube is accordingly in fluid communication with the first outlet 208 of the body 102, as further described herein.

The second outlet conduit 110 of the body 102 of FIGS. 1-8 is coupled (e.g., at or proximate to an example first end 602 of the second outlet conduit 110) to the chamber housing 206 of the body 102. The second outlet conduit 110 is configured to transport and/or carry pressurized fluid (e.g., pressurized gas) from the chamber housing 206 of the body 102 toward and/or to the second outlet 210 of the body 102. In this regard, the second outlet conduit 110 includes and/or defines a second outlet flow channel that is fluidically coupled to and extends between the chamber of the chamber housing 206 of the body 102 and the second outlet 210 of the body 102. The second outlet flow channel of the second outlet conduit 110 is further described below in connection with FIGS. 9-11 and 20-25.

In the illustrated example of FIGS. 1-8, the second outlet conduit 110 of the body 102 includes an example first segment 220, an example second segment 116 coupled to the first segment 220, and an example third segment 118 coupled to the second segment 116. In other examples, the second outlet conduit 110 can include a different number (e.g., 1, 2, 4, etc.) of segments. In the illustrated example of FIGS. 1-8, the first segment 220 of the first outlet conduit 108 extends laterally from (e.g., to the right or to the left of) the chamber housing 206 of the body 102 such that at least a portion of the first segment 220 of the second outlet conduit 110 is located to the side of the chamber housing 206. In other examples, the first segment 220 of the second outlet conduit 110 can instead extend upwardly from the chamber housing 206 of the body 102. In the illustrated example of FIGS. 1-8, the first segment 220 of the second outlet conduit 110 is oriented horizontally (e.g., parallel to a horizontal plane). In other examples, the first segment 220 of the second outlet conduit 110 can instead be oriented vertically (e.g., at ninety degrees relative to a horizontal plane). In still other examples, the first segment 220 of the second outlet conduit 110 can instead be oriented at an angle between a horizontal orientation and a vertical orientation (e.g., at thirty degrees, forty-five degrees, sixty degrees, etc. relative to a horizontal plane). In the illustrated example of FIGS. 1-8, the first segment 220 of the second outlet conduit 110 is linear. In other examples, the first segment 220 of the second outlet conduit 110 can instead be curved or contoured.

In the illustrated example of FIGS. 1-8, the second segment 116 of the second outlet conduit 110 extends upwardly from the first segment 220 of the second outlet conduit 110 such that at least a portion of the second segment 116 of the second outlet conduit 110 is located above the first segment 220 of the second outlet conduit 110. In other examples, the second segment 116 of the second outlet conduit 110 can instead extend laterally from (e.g., to the right or to the left of) the first segment 220 of the second outlet conduit 110. In the illustrated example of FIGS. 1-8, the second segment 116 of the second outlet conduit 110 is oriented vertically (e.g., at ninety degrees relative to a horizontal plane). In other examples, the second segment 116 of the second outlet conduit 110 can instead be oriented horizontally (e.g., parallel to a horizontal plane). In still other examples, the second segment 116 of the second outlet conduit 110 can instead be oriented at an angle between a horizontal orientation and a vertical orientation (e.g., at thirty degrees, forty-five degrees, sixty degrees, etc. relative to a horizontal plane). In the illustrated example of FIGS. 1-8, the second segment 116 of the second outlet conduit 110 is linear. In other examples, the second segment 116 of the second outlet conduit 110 can instead be curved or contoured.

The third segment 118 of the second outlet conduit 110 of FIGS. 1-8 is configured to engage, be coupled to, and/or extend toward an end portion of an example ignition conduit 120 of the ignition assembly 106 of the gas valve 100. For example, as shown in FIGS. 1-8, the third segment 118 of the second outlet conduit 110 extends toward a front end of the ignition conduit 120. In the illustrated example of FIGS. 1-8, the third segment 118 of the second outlet conduit 110 extends rearwardly from the second segment 116 of the second outlet conduit 110 such that at least a portion of the third segment 118 of the second outlet conduit 110 is located to the rear of the second segment 116 of the second outlet conduit 110. In the illustrated example of FIGS. 1-8, the third segment 118 of the second outlet conduit 110 is oriented horizontally (e.g., parallel to a horizontal plane). In other examples, the third segment 118 of the second outlet conduit 110 can instead be oriented at an angle between a vertical orientation and a horizontal orientation (e.g., at thirty degrees, forty-five degrees, sixty degrees, etc. relative to a horizontal plane). In the illustrated example of FIGS. 1-8, the third segment 118 of the second outlet conduit 110 is linear. In other examples, the third segment 118 of the second outlet conduit 110 can instead be curved or contoured.

In the illustrated example of FIGS. 1-8, a first portion (e.g., a front portion) of the chamber housing 206 of the body 102 extends, projects, and/or is located forward from and/or relative to the first segment 220 of the second outlet conduit 110 of the body 102, and a second portion (e.g., a rear portion) of the chamber housing 206 of the body 102 extends, projects, and/or is located rearward from and/or relative to the first segment 220 of the second outlet conduit 110 of the body 102. In other examples, the chamber housing 206 can instead be configured such the first portion (e.g., the front portion) of the chamber housing 206 of the body 102 extends, projects, and/or is located forward from and/or relative to the first segment 220 of the second outlet conduit 110 of the body 102, and the second portion (e.g., the rear portion) of the chamber housing 206 of the body 102 does not extend or project, and/or is not located rearward from and/or relative to, the first segment 220 of the second outlet conduit 110 of the body 102. In still other examples, the chamber housing 206 can instead be configured such the first portion (e.g., the front portion) of the chamber housing 206 of the body 102 does not extend or project, and/or is not located forward from and/or relative to, the first segment 220 of the second outlet conduit 110 of the body 102, and the second portion (e.g., the rear portion) of the chamber housing 206 of the body 102 extends, projects, and/or is located rearward from and/or relative to the first segment 220 of the second outlet conduit 110 of the body 102.

In the illustrated example of FIGS. 1-8, a first portion (e.g., a front portion) of the chamber housing 206 of the body 102 extends, projects, and/or is located forward from and/or relative to the second segment 116 of the second outlet conduit 110 of the body 102, and a second portion (e.g., a rear portion) of the chamber housing 206 of the body 102 extends, projects, and/or is located rearward from and/or relative to the second segment 116 of the second outlet conduit 110 of the body 102. In other examples, the chamber housing 206 can instead be configured such the first portion (e.g., the front portion) of the chamber housing 206 of the body 102 extends, projects, and/or is located forward from and/or relative to the second segment 116 of the second outlet conduit 110 of the body 102, and the second portion (e.g., the rear portion) of the chamber housing 206 of the body 102 does not extend or project, and/or is not located rearward from and/or relative to, the second segment 116 of the second outlet conduit 110 of the body 102. In still other examples, the chamber housing 206 can instead be configured such the first portion (e.g., the front portion) of the chamber housing 206 of the body 102 does not extend or project, and/or is not located forward from and/or relative to, the second segment 116 of the second outlet conduit 110 of the body 102, and the second portion (e.g., the rear portion) of the chamber housing 206 of the body 102 extends, projects, and/or is located rearward from and/or relative to the second segment 116 of the second outlet conduit 110 of the body 102.

The second outlet 210 of the body 102 is formed by and/or located at an example second end 222 of the second outlet conduit 110. The second outlet 210 and/or the second end 222 of the second outlet conduit 110 of the body 102 is/are configured to be coupled to the ignition conduit 120 of the ignition assembly 106 of the gas valve 100 such that a pressurized fluid (e.g., a pressurized gas) present in and/or flowing through the second outlet conduit 110 and/or the second outlet 210 is able to flow into the ignition conduit 120. The ignition conduit 120 is accordingly in fluid communication with the second outlet 210 of the body 102, as further described herein.

The stem 104 of the gas valve 100 of FIGS. 1-8 is rotatable relative to the body 102 of the gas valve 100. In the illustrated example of FIGS. 1-8 the stem 104 extends forwardly from the body 102 such that at least a portion (e.g., an example front end 122) of the stem 104 is located in front of the body 102. A first portion (e.g., the front end 122) of the stem 104 is configured to be operatively and/or mechanically coupled to a control knob of a grill such that a rotation (e.g., a clockwise rotation or a counter-clockwise rotation) of the control knob about an axis of rotation of the control knob causes a corresponding rotation of the stem 104 about an axis of rotation of the stem 104. In some examples, the axis of rotation of the stem and the axis of rotation of the control knob are coaxially arranged relative to one another. A second portion (e.g., a rear end) of the stem 104 is configured to be operatively and/or mechanically coupled to the flow control member of the gas valve 100 such that a rotation (e.g., a clockwise rotation or a counter-clockwise rotation) of the stem 104 about an axis of rotation of the stem 104 causes a corresponding rotation of the flow control member about an axis of rotation of the flow control member, whereby rotation of the flow control member occurs within and/or relative to the chamber of the chamber housing 206 of the body 102 of the gas valve 100. In some examples, the axis of rotation of the stem and the axis of rotation of the flow control member are coaxially arranged relative to one another. In the illustrated example of FIGS. 1-8, the stem 104 is oriented horizontally (e.g., parallel to a horizontal plane). In other examples, the stem 104 can instead be oriented at an angle between a horizontal orientation and a vertical orientation (e.g., at thirty degrees, forty-five degrees, sixty degrees, etc. relative to a horizontal plane).

The ignition assembly 106 of the gas valve 100 of FIGS. 1-8 is configured to ignite and/or induce the ignition of combustible fluid (e.g., combustible gas) that passes and/or flows through the body 102 of the gas valve 100. In the illustrated example of FIGS. 1-8, the ignition assembly 106 includes the ignition conduit 120 described above, and further includes an example spark generator 124. The ignition conduit 120 is coupled (e.g., via a clip) to the third segment 118 of the second outlet conduit 110 of the body 102 of the gas valve 100. In the illustrated example of FIGS. 1-8, the ignition conduit 120 extends rearwardly from the third segment 118 of the second outlet conduit 110 such that at least a portion of the ignition conduit 120 is located to the rear of the third segment 118 of the second outlet conduit 110. In the illustrated example of FIGS. 1-8, the ignition conduit 120 is oriented horizontally (e.g., parallel to a horizontal plane). In other examples, the ignition conduit 120 can instead be oriented at an angle between a vertical orientation and a horizontal orientation (e.g., at thirty degrees, forty-five degrees, sixty degrees, etc. relative to a horizontal plane). In the illustrated example of FIGS. 1-8, the ignition conduit 120 is linear. In other examples, the ignition conduit 120 can instead be curved or contoured.

In the illustrated example of FIGS. 1-8, the ignition conduit 120 includes an inlet located at an example first end 126 of the ignition conduit 120, and further includes an example outlet 128 located at an example second end 130 of the ignition conduit 120. The inlet of the ignition conduit 120 is in fluid communication with the second outlet 210 of the body 102 of the gas valve 100 such that pressurized fluid (e.g., pressurized gas) exiting the body 102 of the gas valve 100 via the second outlet 210 of the body 102 passes (e.g., flows) into the inlet of the ignition conduit 120. The spark generator 124 of the ignition assembly 106 is coupled (e.g., via a clip) to the ignition conduit 120, with the spark generator 124 being oriented and/or positioned relative to the ignition conduit 120 such that an example tip 132 of the spark generator 124 is located adjacent and/or proximate to the outlet 128 of the ignition conduit 120, thereby enabling the spark generator 124 to ignite combustible gas (e.g., via a spark provided by the tip 132 of the spark generator 124 as the combustible gas exits the outlet 128 of the ignition conduit 120.

Figure 9:
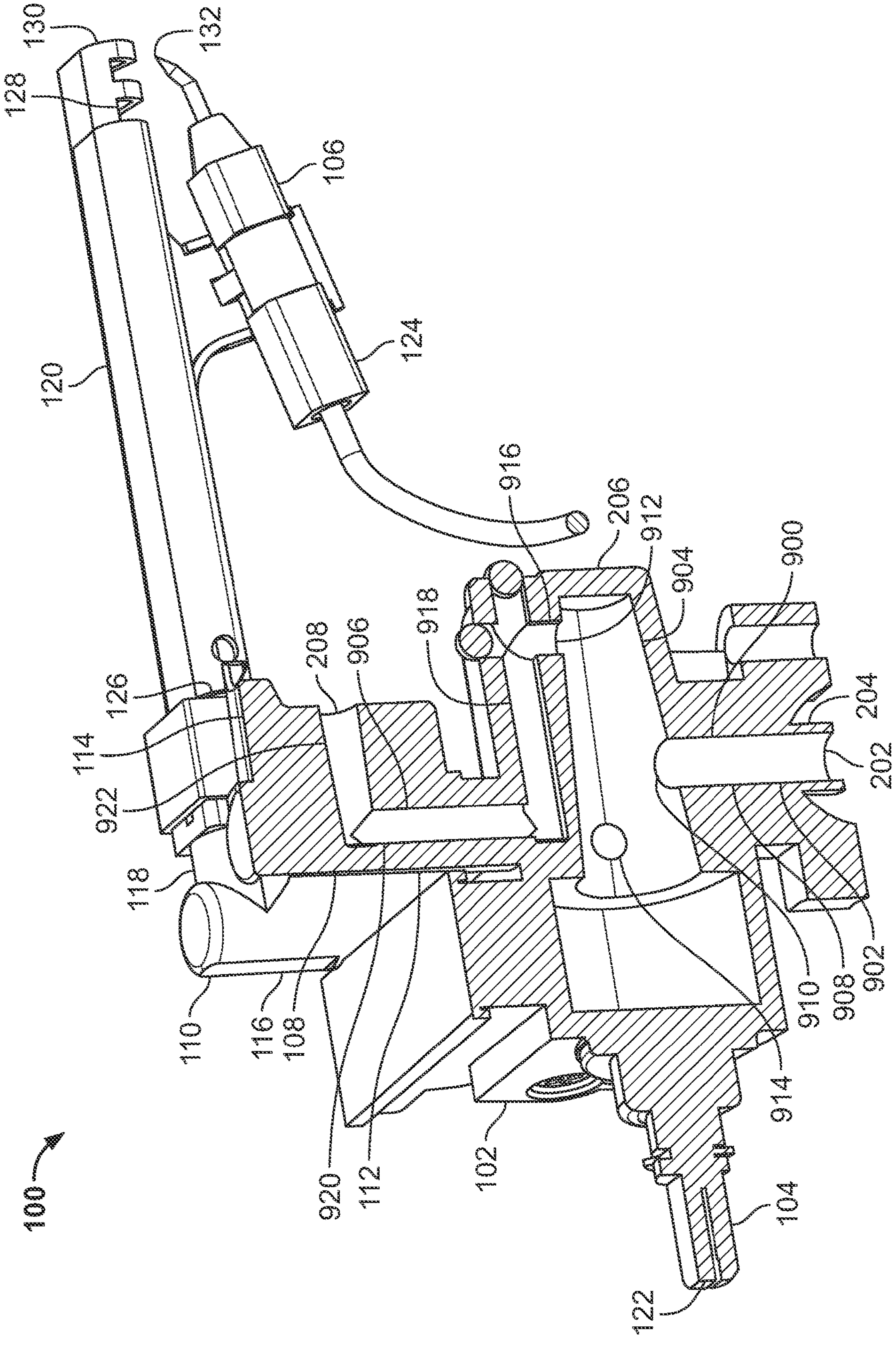
FIG. 9 is a partial cutaway view of the gas valve of FIGS. 1-8 taken along section A-A of FIG. 5, with the flow control member of the gas valve omitted for enhanced viewability.
Figure 10:
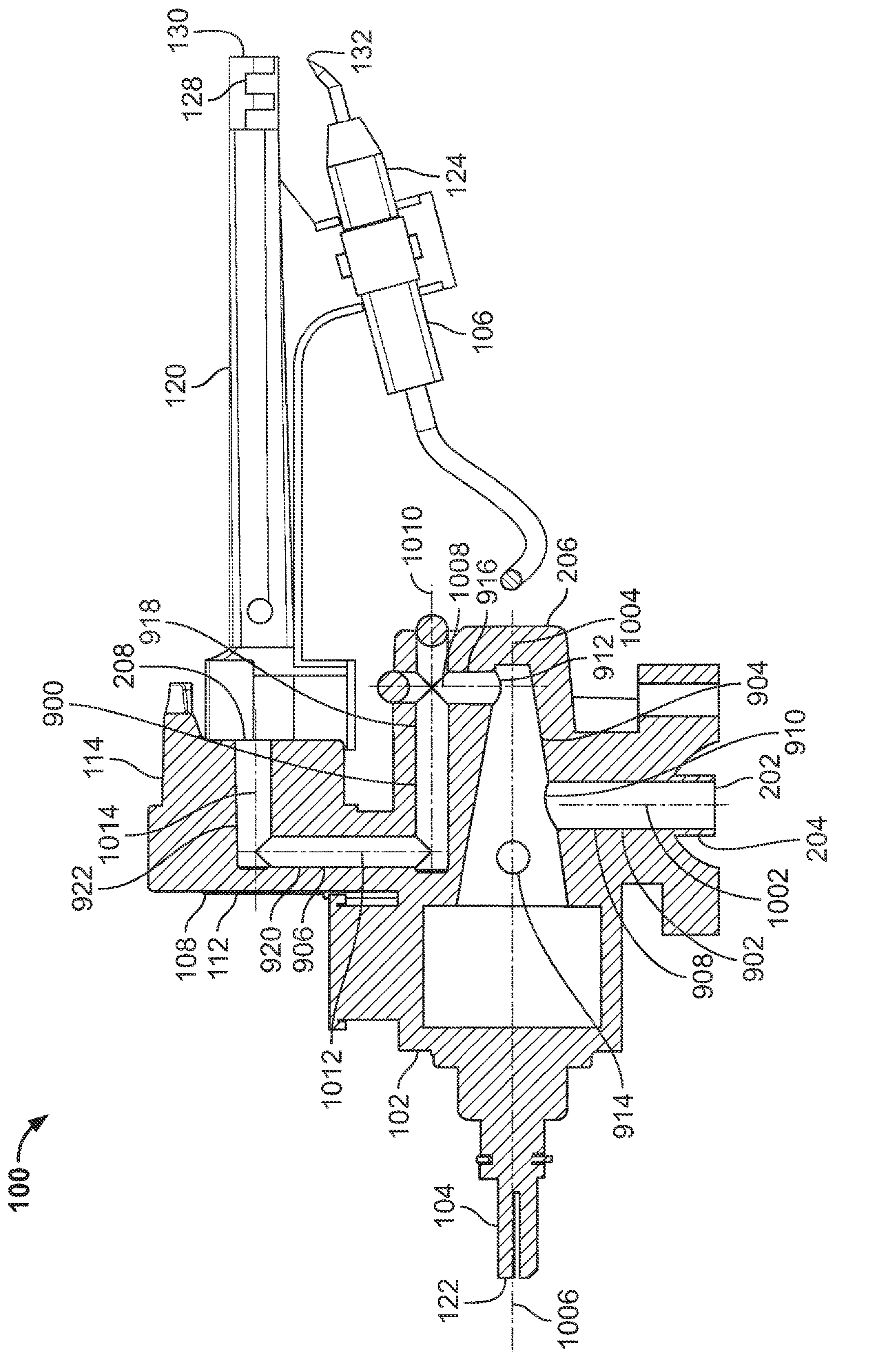
FIG. 10 is a cross-sectional view of the gas valve of FIGS. 1-9 taken along section A-A of FIG. 5, with the flow control member of the gas valve omitted for enhanced viewability.
Figure 11:
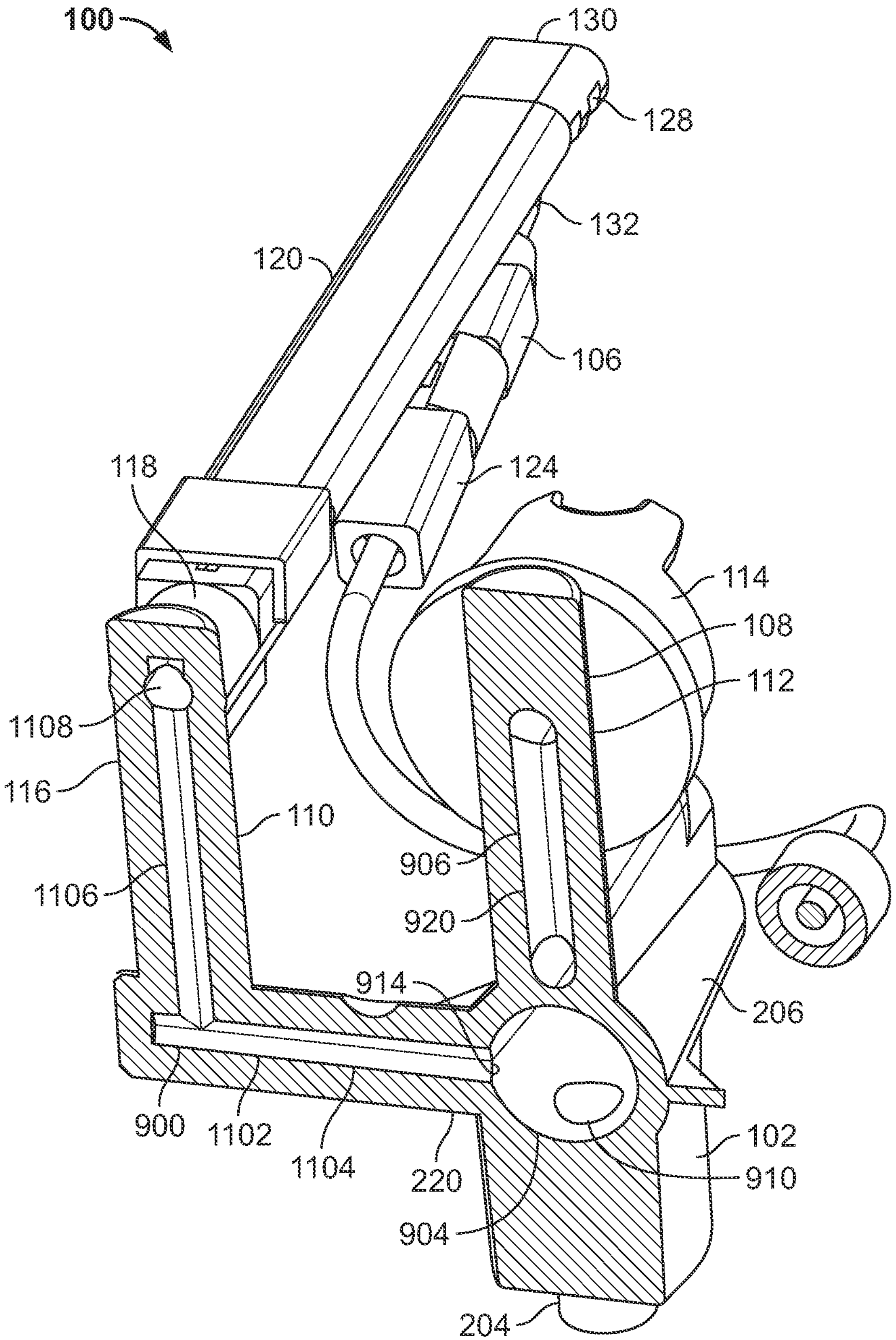
FIG. 11 is a partial cutaway view of the gas valve of FIGS. 1-10 taken along section B-B of FIG. 7, with the flow control member of the gas valve omitted for enhanced viewability.

FIG. 9 is a partial cutaway view of the gas valve 100 of FIGS. 1-8 taken along section A-A of FIG. 5, with the flow control member of the gas valve 100 omitted for enhanced viewability. FIG. 10 is a cross-sectional view of the gas valve 100 of FIGS. 1-9 taken along section A-A of FIG. 5, with the flow control member of the gas valve 100 omitted for enhanced viewability. FIG. 11 is a partial cutaway view of the gas valve 100 of FIGS. 1-10 taken along section B-B of FIG. 7, with the flow control member of the gas valve 100 omitted for enhanced viewability. As shown in FIGS. 9-11, the body 102 of the gas valve 100 includes and/or defines an example gas train 900 extending from the inlet 202 of the body 102 to respective ones of the first outlet 208 and the second outlet 210 of the body 102. In the illustrated example of FIGS. 9-11, the gas train 900 includes the inlet 202, an example inlet flow channel 902, an example chamber 904, an example first outlet flow channel 906, the first outlet 208, an example second outlet flow channel 1102, and the second outlet 210.

The inlet 202 of the gas train 900 of FIGS. 9-11 is formed by, defined by, and/or located at the first end 212 of the inlet conduit 204 of the body 102. The inlet 202 of the gas train 900 is configured to be in fluid communication with an outlet and/or an opening of a manifold such that pressurized fluid (e.g., pressurized gas) present in and/or flowing through the manifold is able to flow from the manifold into and/or through the inlet 202. The inlet flow channel 902 of the gas train 900 of FIGS. 9-11 is formed by, defined by, and/or located within the inlet conduit 204 of the body 102. The inlet flow channel 902 of the gas train 900 is in fluid communication with the inlet 202 of the gas train 900 such that pressurized fluid (e.g., pressurized gas) present in and/or flowing through the inlet 202 is able to flow from the inlet 202 into the inlet flow channel 902.

As shown in FIGS. 9-11, the inlet flow channel 902 of the gas train 900 extends downwardly from the chamber 904 of the gas train 900 such that at least a portion of the inlet flow channel 902 is located below the chamber 904. In other examples, inlet flow channel 902 of the gas train 900 can instead extend laterally from (e.g., to the right or to the left of) the chamber 904 of the gas train 900. In the illustrated example of FIGS. 9-11, the inlet flow channel 902 of the gas train 900 includes an example linear segment 908 having an example central axis 1002. As shown in FIGS. 9-11, the central axis 1002 of the linear segment 908 of the inlet flow channel 902 is oriented vertically (e.g., at ninety degrees relative to a horizontal plane). In other examples, the central axis 1002 of the linear segment 908 of the inlet flow channel 902 can instead be oriented horizontally (e.g., parallel to a horizontal plane). In still other examples, the central axis 1002 of the linear segment 908 of the inlet flow channel 902 can instead be oriented at an angle between a horizontal orientation and a vertical orientation (e.g., at thirty degrees, forty-five degrees, sixty degrees, etc. relative to a horizontal plane).

The chamber 904 of the gas train 900 of FIGS. 9-11 is formed by, defined by, and/or located within the chamber housing 206 of the body 102. In the illustrated example of FIGS. 9-11, the chamber 904 includes an example inlet opening 910, an example first outlet opening 912, and an example second outlet opening 914. The chamber 904 of the gas train 900 is in fluid communication with the inlet flow channel 902 of the gas train 900 such that pressurized fluid (e.g., pressurized gas) present in and/or flowing through the inlet flow channel 902 is able to flow from the inlet flow channel 902 into the chamber 904 via the inlet opening 910 of the chamber 904. The entry, passage, and/or flow of pressurized fluid (e.g., pressurized gas) from the inlet flow channel 902 into the chamber 904 via the inlet opening 910 of the chamber 904 occurs selectively based on the rotational position of the flow control member of the gas valve 100 within the chamber 904, as further described herein.

As shown in FIGS. 9-11, the first outlet opening 912 and the second outlet opening 914 of the chamber 904 respectively lead to separate exit pathways defined by the gas train 900. The first exit pathway of the gas train 900 of FIGS. 9-11, which originates at the first outlet opening 912 of the chamber 904, includes the first outlet flow channel 906 and the first outlet 208. The chamber 904 of the gas train 900 is in fluid communication with the first outlet flow channel 906 of the gas train 900 such that pressurized fluid (e.g., pressurized gas) present in and/or flowing through the chamber 904 is able to flow from the chamber 904 into the first outlet flow channel 906 via the first outlet opening 912 of the chamber 904. The entry, passage, and/or flow of pressurized fluid (e.g., pressurized gas) from the chamber 904 into the first outlet flow channel 906 via the first outlet opening 912 of the chamber 904 occurs selectively based on the rotational position of the flow control member of the gas valve 100 within the chamber 904, as further described herein.

The second exit pathway of the gas train 900 of FIGS. 9-11, which originates at the second outlet opening 914 of the chamber 904, includes the second outlet flow channel 1102 and the second outlet 210. The chamber 904 of the gas train 900 is in fluid communication with the second outlet flow channel 1102 of the gas train 900 such that pressurized fluid (e.g., pressurized gas) present in and/or flowing through the chamber 904 is able to flow from the chamber 904 into the second outlet flow channel 1102 via the second outlet opening 914 of the chamber 904. The entry, passage, and/or flow of pressurized fluid (e.g., pressurized gas) from the chamber 904 into the second outlet flow channel 1102 via the second outlet opening 914 of the chamber 904 occurs selectively based on the rotational position of the flow control member of the gas valve 100 within the chamber 904, as further described herein.

As shown in FIGS. 9-11, the chamber 904 of the gas train 900 is configured to receive and/or contain the flow control member of the gas valve 100, with the flow control member being rotatable within and/or relative to the chamber 904 and/or, more generally, relative to the body 102 of the gas valve 100. In the illustrated example of FIGS. 9-11, the chamber 904 has a conical chape configured to receive and/or contain a conically-shaped flow control member (e.g., a cone). An example conically-shaped flow control member that is configured to be received within the chamber 904 is further described below in connection with FIGS. 12-25. In other examples, the chamber 904 can instead have a cylindrical shape configured to receive a cylindrically-shaped flow control member, or a spherical shape configured to receive a spherically-shaped flow control member.

The chamber 904 of the gas train 900 of FIGS. 9-11 has an example central axis 1004. In the illustrated example of FIGS. 9-11, the central axis 1004 of the chamber 904 is oriented horizontally (e.g., parallel to a horizontal plane). In other examples, the central axis 1004 of the chamber 904 can instead be oriented at an angle between a horizontal orientation and a vertical orientation (e.g., at thirty degrees, forty-five degrees, sixty degrees, etc. relative to a horizontal plane). In the illustrated example of FIGS. 9-11, the central axis 1004 of the chamber 904 is parallel to and is coaxially aligned with an example axis of rotation 1006 of the stem 104 of the gas valve 100. In other examples, the axis of rotation 1006 of the stem 104 of the gas valve 100 can instead be offset from and/or angled relative to the central axis 1004 of the chamber 904. In the illustrated example of FIGS. 9-11, the inlet opening 910 of the chamber 904 is located between the first outlet opening 912 of the chamber 904 and the second outlet opening 914 of the chamber 904. In other examples, the first outlet opening 912 of the chamber 904 can be located between the inlet opening 910 of the chamber 904 and the second outlet opening 914 of the chamber 904. In still other examples, the second outlet opening 914 of the chamber 904 can be located between the inlet opening 910 of the chamber 904 and the first outlet opening 912 of the chamber 904.

The first outlet flow channel 906 of the gas train 900 of FIGS. 9-11 is formed by, defined by, and/or located within the chamber housing 206 and/or the first outlet conduit 108 of the body 102. For example, as shown in FIGS. 9-11, a first portion of the first outlet flow channel 906 of the gas train 900 is formed by, defined by, and/or located within the chamber housing 206 of the body 102, and a second portion of the first outlet flow channel 906 of the gas train 900 located downstream from the first portion of the first outlet flow channel 906 of the gas train 900 is formed by, defined by, and/or located within the first outlet conduit 108. The first outlet flow channel 906 of the gas train 900 is in fluid communication with the chamber 904 of the gas train 900 such that pressurized fluid (e.g., pressurized gas) present in and/or flowing through the chamber 904 is able to flow from the chamber 904 into the first outlet flow channel 906 via the first outlet opening 912 of the chamber 904. The entry, passage, and/or flow of pressurized fluid (e.g., pressurized gas) from the chamber 904 into the first outlet flow channel 906 via the first outlet opening 912 of the chamber 904 occurs selectively based on the rotational position of the flow control member of the gas valve 100 within the chamber 904, as further described herein.

As shown in FIGS. 9-11, the first outlet flow channel 906 of the gas train 900 extends upwardly from the chamber 904 of the gas train 900 such that at least a portion of the first outlet flow channel 906 is located above the chamber 904. In other examples, the first outlet flow channel 906 of the gas train 900 can instead extend laterally from (e.g., to the right or to the left of) the chamber 904 of the gas train 900. In the illustrated example of FIGS. 9-11, the first outlet flow channel 906 of the gas train 900 includes an example first linear segment 916, an example second linear segment 918, an example third linear segment 920, and an example fourth linear segment 922. The first linear segment 916 of the first outlet flow channel 906 is in fluid communication with and located downstream of the chamber 904. The second linear segment 918 of the first outlet flow channel 906 is in fluid communication with and located downstream of the first linear segment 916 of the first outlet flow channel 906. The third linear segment 920 of the first outlet flow channel 906 is in fluid communication with and located downstream of the second linear segment 918 of the first outlet flow channel 906. The fourth linear segment 922 of the first outlet flow channel 906 is in fluid communication with and located downstream of the third linear segment 920 of the first outlet flow channel 906.

In the illustrated example of FIGS. 9-11, the first linear segment 916 of the first outlet flow channel 906 extends upwardly from the chamber 904 of the gas train 900 such that at least a portion of the first linear segment 916 of the first outlet flow channel 906 is located above the chamber 904. The first linear segment 916 of the first outlet flow channel 906 has an example central axis 1008. As shown in FIGS. 9-11, the central axis 1008 of the first linear segment 916 of the first outlet flow channel 906 is oriented vertically (e.g., at ninety degrees relative to a horizontal plane). In other examples, the central axis 1008 of the first linear segment 916 of the first outlet flow channel 906 can instead be oriented horizontally (e.g., parallel to a horizontal plane). In still other examples, the central axis 1008 of the first linear segment 916 of the first outlet flow channel 906 can instead be oriented at an angle between a horizontal orientation and a vertical orientation (e.g., at thirty degrees, forty-five degrees, sixty degrees, etc. relative to a horizontal plane).

In the illustrated example of FIGS. 9-11, the second linear segment 918 of the first outlet flow channel 906 extends forwardly from the first linear segment 916 of the first outlet flow channel 906 such that at least a portion of the second linear segment 918 of the first outlet flow channel 906 is located in front of the first linear segment 916 of the first outlet flow channel 906. The second linear segment 918 of the first outlet flow channel 906 has an example central axis 1010. As shown in FIGS. 9-11, the central axis 1010 of the second linear segment 918 of the first outlet flow channel 906 is oriented horizontally (e.g., parallel to a horizontal plane). In other examples, the central axis 1010 of the second linear segment 918 of the first outlet flow channel 906 can instead be oriented vertically (e.g., at ninety degrees relative to a horizontal plane). In still other examples, the central axis 1010 of the second linear segment 918 of the first outlet flow channel 906 can instead be oriented at an angle between a horizontal orientation and a vertical orientation (e.g., at thirty degrees, forty-five degrees, sixty degrees, etc. relative to a horizontal plane).

In the illustrated example of FIGS. 9-11, the third linear segment 920 of the first outlet flow channel 906 extends upwardly from the second linear segment 918 of the first outlet flow channel 906 such that at least a portion of the third linear segment 920 of the first outlet flow channel 906 is located above the second linear segment 918 of the first outlet flow channel 906. The third linear segment 920 of the first outlet flow channel 906 has an example central axis 1012. As shown in FIGS. 9-11, the central axis 1012 of the third linear segment 920 of the first outlet flow channel 906 is oriented vertically (e.g., at ninety degrees relative to a horizontal plane). In other examples, the central axis 1012 of the third linear segment 920 of the first outlet flow channel 906 can instead be oriented horizontally (e.g., parallel to a horizontal plane). In still other examples, the central axis 1012 of the third linear segment 920 of the first outlet flow channel 906 can instead be oriented at an angle between a horizontal orientation and a vertical orientation (e.g., at thirty degrees, forty-five degrees, sixty degrees, etc. relative to a horizontal plane).

In the illustrated example of FIGS. 9-11, the fourth linear segment 922 of the first outlet flow channel 906 extends rearwardly from the third linear segment 920 of the first outlet flow channel 906 such that at least a portion of the fourth linear segment 922 of the first outlet flow channel 906 is located to the rear of the third linear segment 920 of the first outlet flow channel 906. The fourth linear segment 922 of the first outlet flow channel 906 has an example central axis 1014. As shown in FIGS. 9-11, the central axis 1014 of the fourth linear segment 922 of the first outlet flow channel 906 is oriented horizontally (e.g., parallel to a horizontal plane). In other examples, the central axis 1014 of the fourth linear segment 922 of the first outlet flow channel 906 can instead be oriented at an angle between a horizontal orientation and a vertical orientation (e.g., at thirty degrees, forty-five degrees, sixty degrees, etc. relative to a horizontal plane).

The first outlet 208 of the gas train 900 of FIGS. 9-11 is formed by, defined by, and/or located at the second end 218 of the first outlet conduit 108 of the body 102. The first outlet 208 of the gas train 900 is in fluid communication with the first outlet flow channel 906 of the gas train 900 such that pressurized fluid (e.g., pressurized gas) present in and/or flowing through the first outlet flow channel 906 (e.g., flowing sequentially through the first linear segment 916, the second linear segment 918, the third linear segment 920, and the fourth linear segment 922 of the first outlet flow channel 906) is able to flow from the first outlet flow channel 906 into and/or through the first outlet 208. The first outlet 208 of the gas train 900 is also configured to be in fluid communication with an open end of a burner tube operatively positioned downstream from the first outlet 208 such that pressurized fluid (e.g., pressurized gas) present in and/or flowing through the first outlet 208 is able to flow from the first outlet 208 into the burner tube.

In the illustrated example of FIGS. 9-11, the central axis of the 1004 of the chamber 904, the central axis 1008 of the first linear segment 916 of the first outlet flow channel 906, the central axis 1010 of the second linear segment 918 of the first outlet flow channel 906, the central axis 1012 of the third linear segment 920 of the first outlet flow channel 906, and the central axis 1014 of the fourth linear segment 922 of the first outlet flow channel 906 are coplanar. The central axis of the 1004 of the chamber 904, the central axis 1010 of the second linear segment 918 of the first outlet flow channel 906, and the central axis 1014 of the fourth linear segment 922 of the first outlet flow channel 906 are horizontally oriented and parallel to one another, with the central axis 1010 of the second linear segment 918 of the first outlet flow channel 906 being offset from and located above the central axis of the 1004 of the chamber 904, and with the central axis 1014 of the fourth linear segment 922 of the first outlet flow channel 906 being offset from and located above the central axis 1010 of the second linear segment 918 of the first outlet flow channel 906. The central axis 1008 of the first linear segment 916 of the first outlet flow channel 906 and the central axis 1012 of the third linear segment 920 of the first outlet flow channel 906 are vertically oriented and parallel to one another, with the central axis 1012 of the third linear segment 920 of the first outlet flow channel 906 being located forward of the central axis 1008 of the first linear segment 916 of the first outlet flow channel 906. Furthermore, respective ones of the central axis of the 1004 of the chamber 904, the central axis 1010 of the second linear segment 918 of the first outlet flow channel 906, and the central axis 1014 of the fourth linear segment 922 of the first outlet flow channel 906 are oriented orthogonally (e.g., perpendicularly) relative to respective ones of the central axis 1008 of the first linear segment 916 of the first outlet flow channel 906 and the central axis 1012 of the third linear segment 920 of the first outlet flow channel 906.

The above-described arrangement of parts results in the chamber 904, the first linear segment 916 of the first outlet flow channel 906, the second linear segment 918 of the first outlet flow channel 906, the third linear segment 920 of the first outlet flow channel 906, and the fourth linear segment 922 of the first outlet flow channel 906 forming, defining, and/or otherwise providing a serpentine (e.g., S-shaped) portion of the gas train 900. The serpentine (e.g., S-shaped) portion of the gas train 900 of FIGS. 9-11 advantageously reduces (e.g., minimizes) the front-to-rear distance between the inlet 202 of the gas valve 100 and the first outlet 208 of the gas valve 100, and/or the front-to-rear distance between the stem 104 of the gas valve 100 and the first outlet 208 of the gas valve 100. The improved space efficiency associated with this/these reduced dimension(s) of the gas valve 100 advantageously enables the gas valve 100 to be disposed within a correspondingly smaller (e.g., reduced depth) control panel chamber of a grill, and also advantageously enables a burner tube of such a grill to be located closer to an interior front wall of a cookbox of such a grill, as further described herein.

The second outlet flow channel 1102 of the gas train 900 of FIGS. 9-11 is formed by, defined by, and/or located within the second outlet conduit 110 of the body 102. The second outlet flow channel 1102 of the gas train 900 is in fluid communication with the chamber 904 of the gas train 900 such that pressurized fluid (e.g., pressurized gas) present in and/or flowing through the chamber 904 is able to flow from the chamber 904 into the second outlet flow channel 1102 via the second outlet opening 914 of the chamber 904. The entry, passage, and/or flow of pressurized fluid (e.g., pressurized gas) from the chamber 904 into the second outlet flow channel 1102 via the second outlet opening 914 of the chamber 904 occurs selectively based on the rotational position of the flow control member of the gas valve 100 within the chamber 904, as further described herein.

As shown in FIGS. 9-11, the second outlet flow channel 1102 of the gas train 900 extends both laterally and upwardly from the chamber 904 of the gas train 900. For example, as shown in FIGS. 9-11, a first portion of the second outlet flow channel 1102 is located to the side of the chamber 904, and a second portion of the second outlet flow channel 1102 located downstream of the first portion of the second outlet flow channel 1102 is located above the chamber 904. In other examples, the first portion of the second outlet flow channel 1102 can instead extend upwardly from the chamber 904, and the second portion of the second outlet flow channel 1102 can instead extend to the side of the chamber 904. In the illustrated example of FIGS. 9-11, the second outlet flow channel 1102 of the gas train 900 includes an example first linear segment 1104, an example second linear segment 1106, and an example third linear segment 1108. The first linear segment 1104 of the second outlet flow channel 1102 is in fluid communication with and located downstream of the chamber 904. The second linear segment 1106 of the second outlet flow channel 1102 is in fluid communication with and located downstream of the first linear segment 1104 of the second outlet flow channel 1102. The third linear segment 1108 of the second outlet flow channel 1102 is in fluid communication with and located downstream of the second linear segment 1106 of the second outlet flow channel 1102.

In the illustrated example of FIGS. 9-11, the first linear segment 1104 of the second outlet flow channel 1102 extends laterally from (e.g., to the right or to the left of) the chamber 904 of the gas train 900 such that at least a portion of the first linear segment 1104 of the second outlet flow channel 1102 is located to the side of the chamber 904. As shown in FIGS. 9-11, the first linear segment 1104 of the second outlet flow channel 1102 is oriented horizontally (e.g., parallel to a horizontal plane). In other examples, the first linear segment 1104 of the second outlet flow channel 1102 can instead be oriented vertically (e.g., at ninety degrees relative to a horizontal plane). In still other examples, the first linear segment 1104 of the second outlet flow channel 1102 can instead be oriented at an angle between a horizontal orientation and a vertical orientation (e.g., at thirty degrees, forty-five degrees, sixty degrees, etc. relative to a horizontal plane).

In the illustrated example of FIGS. 9-11, the second linear segment 1106 of the second outlet flow channel 1102 extends upwardly from the first linear segment 1104 of the second outlet flow channel 1102 such that at least a portion of the second linear segment 1106 of the second outlet flow channel 1102 is located above the first linear segment 1104 of the second outlet flow channel 1102. As shown in FIGS. 9-11, the second linear segment 1106 of the second outlet flow channel 1102 is oriented vertically (e.g., at ninety degrees relative to a horizontal plane). In other examples, the second linear segment 1106 of the second outlet flow channel 1102 can instead be oriented horizontally (e.g., parallel to a horizontal plane). In still other examples, the second linear segment 1106 of the second outlet flow channel 1102 can instead be oriented at an angle between a horizontal orientation and a vertical orientation (e.g., at thirty degrees, forty-five degrees, sixty degrees, etc. relative to a horizontal plane).

In the illustrated example of FIGS. 9-11, the third linear segment 1108 of the second outlet flow channel 1102 extends rearwardly from the second linear segment 1106 of the second outlet flow channel 1102 such that at least a portion of the third linear segment 1108 of the second outlet flow channel 1102 is located to the rear of the second linear segment 1106 of the second outlet flow channel 1102. As shown in FIGS. 9-11, the third linear segment 1108 of the second outlet flow channel 1102 is oriented horizontally (e.g., parallel to a horizontal plane). In other examples, the third linear segment 1108 of the second outlet flow channel 1102 can instead be oriented at an angle between a horizontal orientation and a vertical orientation (e.g., at thirty degrees, forty-five degrees, sixty degrees, etc. relative to a horizontal plane).

The second outlet 210 of the gas train 900 of FIGS. 9-11 is formed by, defined by, and/or located at the second end 222 of the second outlet conduit 110 of the body 102. The second outlet 210 of the gas train 900 is in fluid communication with the second outlet flow channel 1102 of the gas train 900 such that pressurized fluid (e.g., pressurized gas) present in and/or flowing through the second outlet flow channel 1102 (e.g., flowing sequentially through the first linear segment 1104, the second linear segment 1106, and the third linear segment 1108 of the second outlet flow channel 1102 is able to flow from the second outlet flow channel 1102 into and/or through the second outlet 210. The second outlet 210 of the gas train 900 is also configured to be in fluid communication with the first end 126 of the ignition conduit 120 of the gas valve 100 such that pressurized fluid (e.g., pressurized gas) present in and/or flowing through the second outlet 210 is able to flow from the second outlet 210 into the ignition conduit 120.

Figure 12:
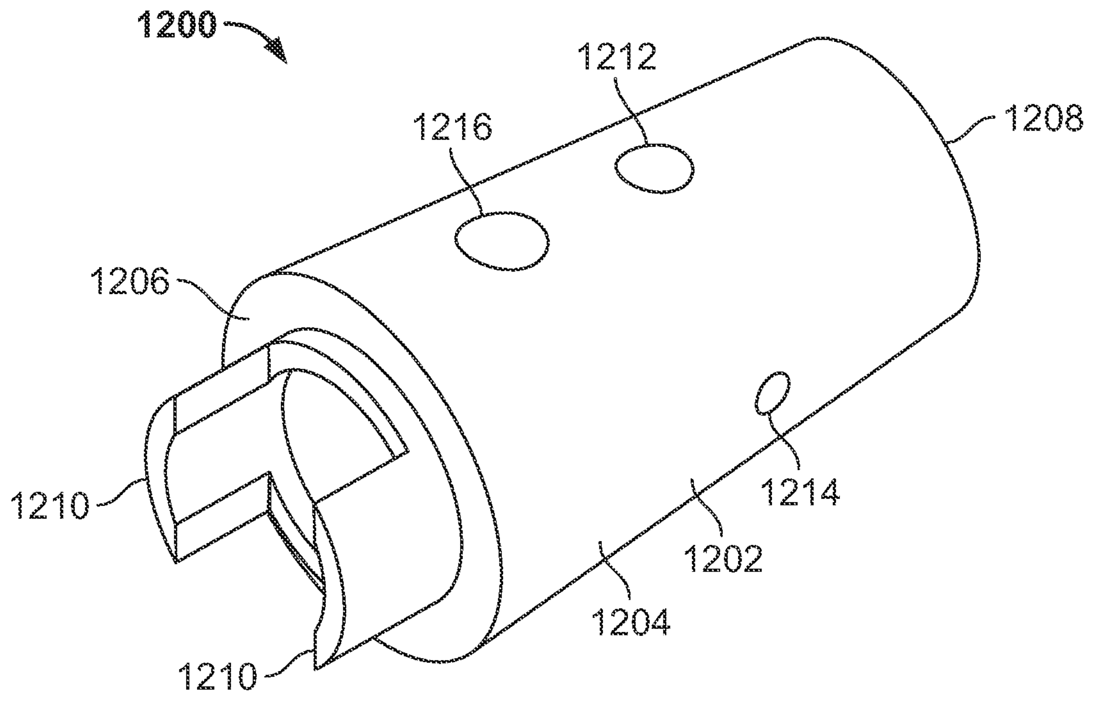
FIG. 12 is a first perspective view of an example cone constructed in accordance with the teachings of this disclosure.
Figure 13:
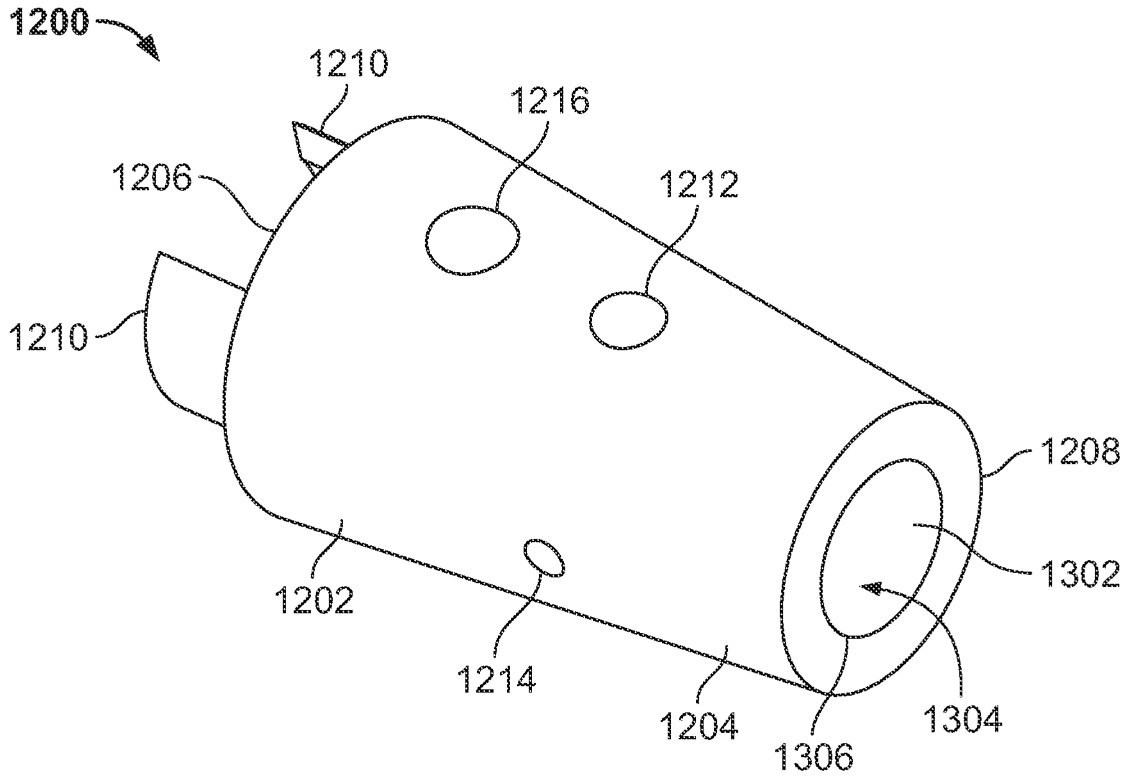
FIG. 13 is a second perspective view of the cone of FIG. 12.
Figure 14:
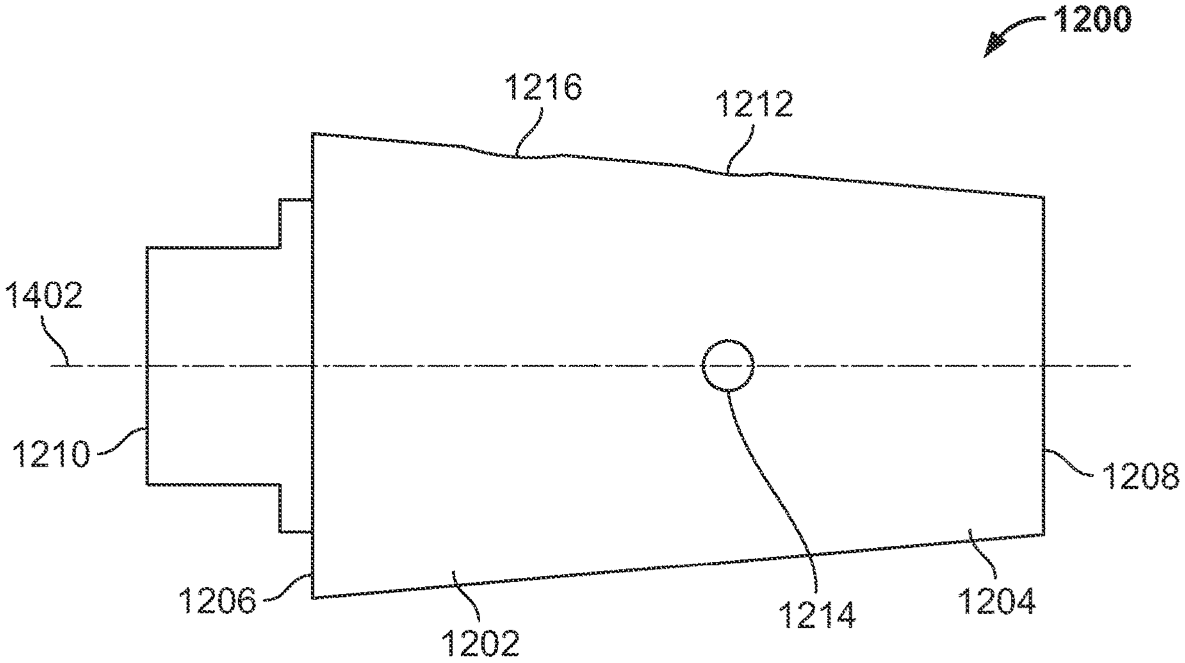
FIG. 14 is a right side view of the cone of FIGS. 12 and 13.
Figure 15:
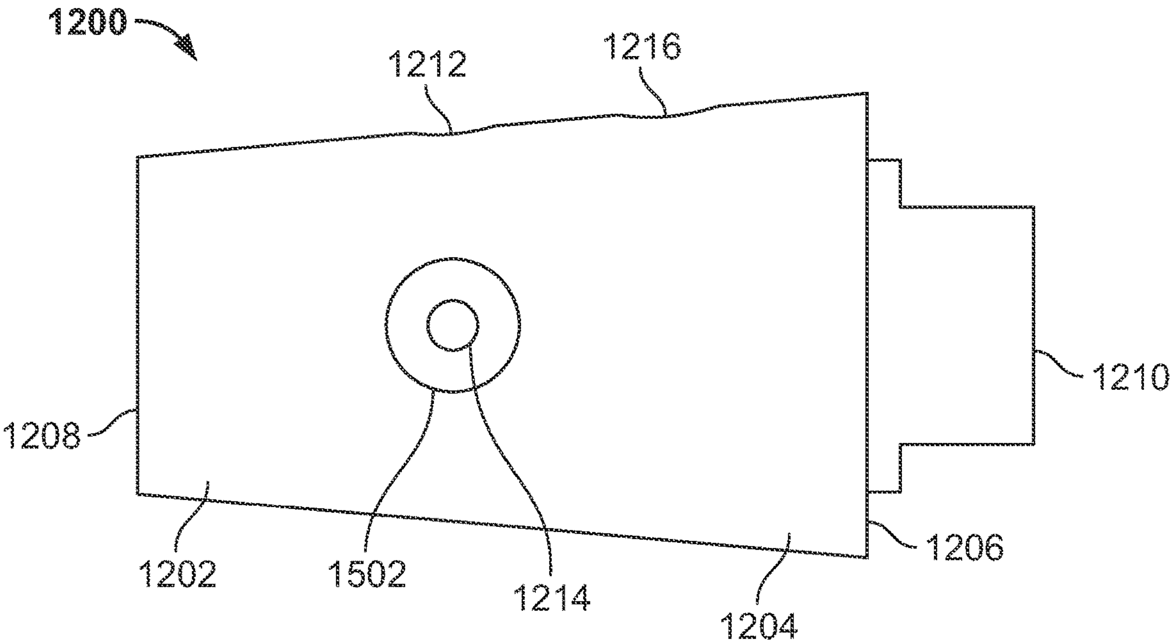
FIG. 15 is a left side view of the cone of FIGS. 12-14.
Figure 16:
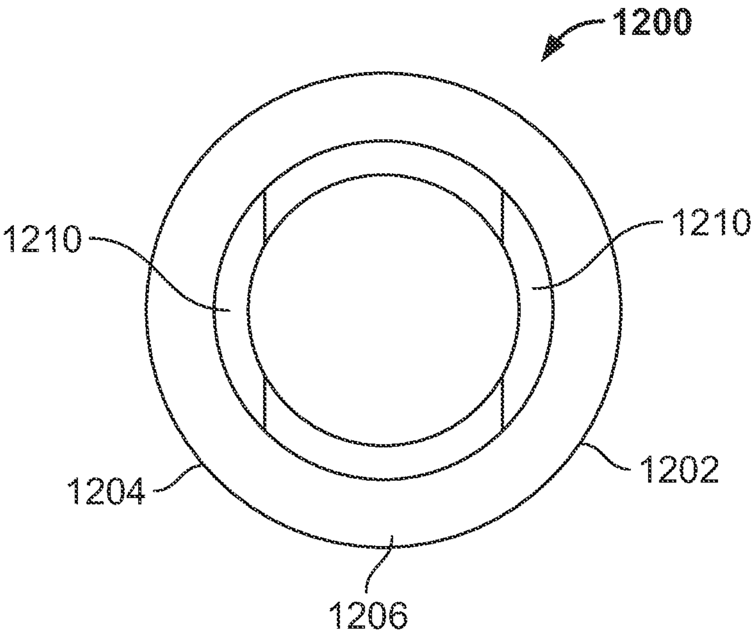
FIG. 16 is a front view of the cone of FIGS. 12-15.
Figure 17:
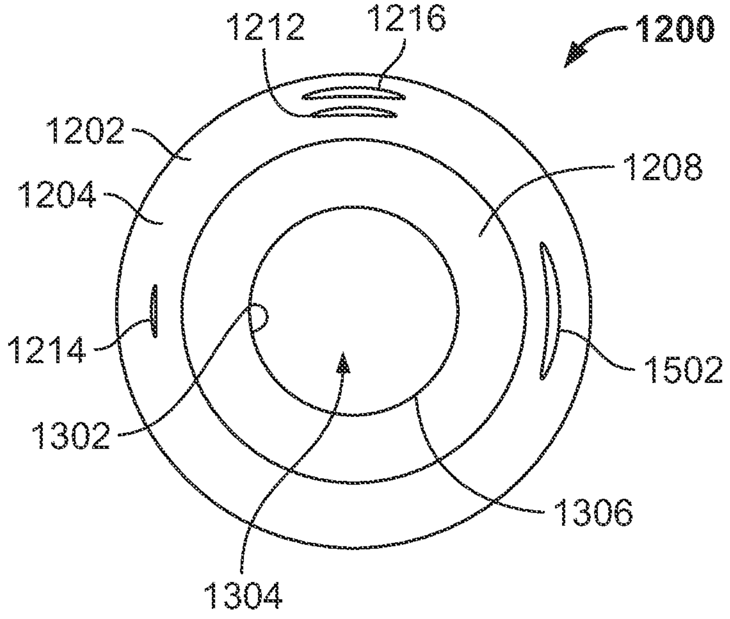
FIG. 17 is a rear view of the cone of FIGS. 12-16.
Figure 19:
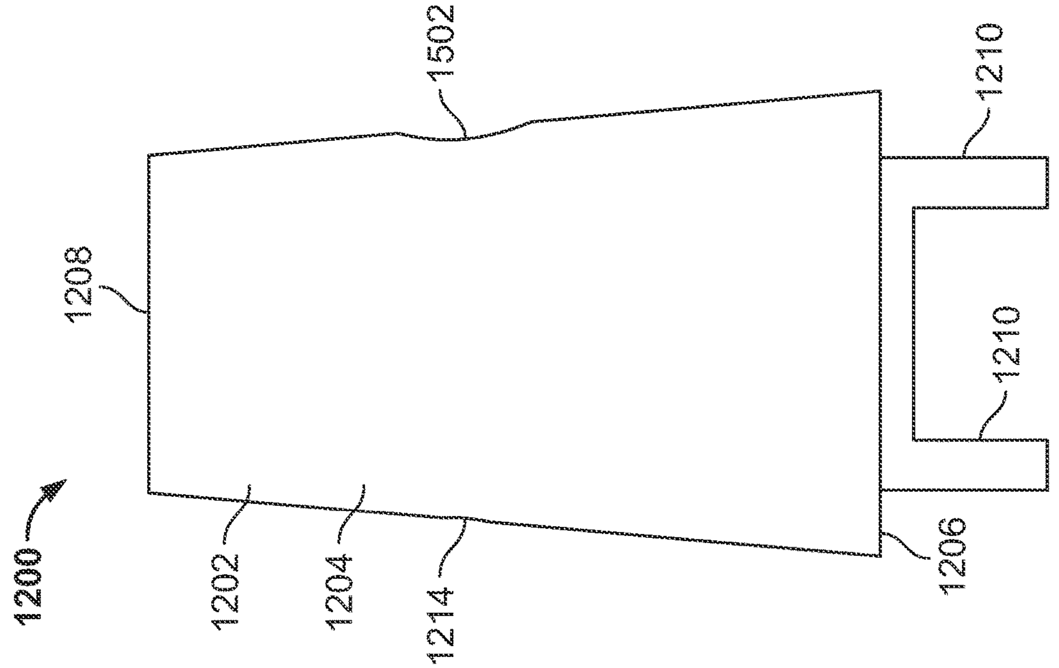
FIG. 19 is a bottom view of the cone of FIGS. 12-18.
Figure 18:
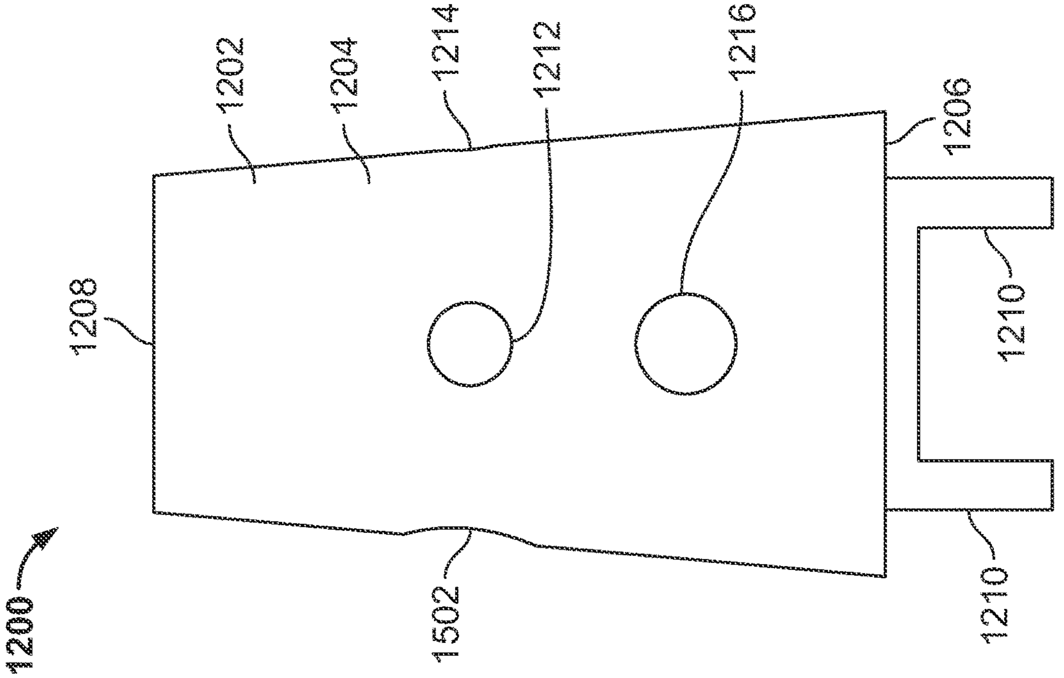
FIG. 18 is a top view of the cone of FIGS. 12-17.

FIG. 12 is a first perspective view of an example cone 1200 constructed in accordance with the teachings of this disclosure. FIG. 13 is a second perspective view of the cone 1200 of FIG. 12. FIG. 14 is a right side view of the cone 1200 of FIGS. 12 and 13. FIG. 15 is a left side view of the cone 1200 of FIGS. 12-14. FIG. 16 is a front view of the cone 1200 of FIGS. 12-15. FIG. 17 is a rear view of the cone 1200 of FIGS. 12-16. FIG. 18 is a top view of the cone 1200 of FIGS. 12-17. FIG. 19 is a bottom view of the cone 1200 of FIGS. 12-18. The cone 1200 of FIGS. 12-19 can be implemented as the flow control member of the gas valve 100 of FIGS. 1-11 described above. In this regard, the cone 1200 of FIGS. 12-19 includes an example sidewall 1202 having an example outer surface 1204 and an example inner surface 1302. The outer surface 12014 of the sidewall 1202 of the cone 1200 has a conical shape that is configured to engage and/or fit snugly within, but remains rotatable relative to, the conically-shaped chamber 904 of the gas train 900 of the gas valve 100. The inner surface 1302 of the sidewall 1202 of the cone 1200 is located radially inward of the outer surface 1204 of the sidewall 1202 of the cone 1200. The inner surface 1302 of the sidewall 1202 of the cone 1200 defines an example flow chamber 1304 of the cone 1200.

The cone 1200 of FIGS. 12-19 further includes an example first end 1206 (e.g., a front end) and an example second end 1208 (e.g., a rear end) located opposite the first end 1206. The first end 1206 of the cone 1200 is closed such that pressurized fluid (e.g., pressurized gas) present in and/or flowing through the flow chamber 1304 of the cone 1200 is not able to flow out of the flow chamber 1304 through the first end 1206 of the cone 1200. The second end 1208 of the cone 1200 is open such that pressurized fluid (e.g., pressurized gas) present in and/or flowing through the flow chamber 1304 of the cone 1200 is able to flow out of the flow chamber 1304 through the second end 1208 of the cone 1200.

The cone 1200 of FIGS. 12-19 has an example central axis 1402 extending between the first end 1206 and the second end 1208 of the cone 1200. The central axis 1402 of the cone 1200 also serves as an axis of rotation of the cone 1200. In this regard, the central axis 1402 of the cone 1200 is coaxially positioned relative to the central axis 1004 of the chamber 904 of the gas train 900 of the gas valve 100 when the cone 1200 is disposed within the chamber 904. When so disposed, the central axis 1402 of the cone 1200 is also coaxially positioned relative to the axis of rotation 1006 of the stem 104 of the gas valve 100. In the illustrated example of FIGS. 12-19, the first end 1206 of the cone 1200 includes example flanges 1210 configured to be mechanically engaged by and/or mechanically coupled to one or more intervening structural component(s) (e.g., a link, a rod, a pin, a fitting, a spring, etc.) that is/are in turn mechanically coupled to the stem 104 of the gas valve 100 such that rotational movement of the stem 104 about the axis of rotation 1006 of the stem 104 causes a corresponding rotational movement of the cone 1200 about the central axis 1402 of the cone 1200, and/or about the central axis 1004 of the chamber 904 of the gas valve 100 when the cone 1200 is disposed in the chamber 904. In other examples, the stem 104 of the gas valve 100 can instead be directly mechanically coupled to the first end 1206 of the cone 1200 such that rotational movement of the stem 104 about the axis of rotation 1006 of the stem 104 causes a corresponding rotational movement of the cone 1200 about the central axis 1402 of the cone 1200, and/or about the central axis 1004 of the chamber 904 of the gas valve 100 when the cone 1200 is disposed in the chamber 904.

The cone 1200 of FIGS. 12-19 further includes an example first inlet opening 1502, an example second inlet opening 1212, and an example third inlet opening 1214, each of which extends through the sidewall 1202 of the cone 1200 (e.g., from the outer surface 1204 of the sidewall 1202 to the inner surface 1302 of the sidewall 1202). In the illustrated example of FIGS. 12-19, the diameter of the first inlet opening 1502 of the cone 1200 is greater than the diameter of the second inlet opening 1212 of the cone 1200, and the diameter of the second inlet opening 1212 of the cone 1200 is greater than the diameter of the third inlet opening 1214 of the cone 1200. In other examples, the diameter of the first inlet opening 1502 of the cone 1200 can instead be less than the diameter of the second inlet opening 1212 of the cone 1200, and the diameter of the second inlet opening 1212 of the cone 1200 can instead be less than the diameter of the third inlet opening 1214 of the cone 1200. In the illustrated example of FIGS. 12-19, the first inlet opening 1502, the second inlet opening 1212, and the third inlet opening 1214 of the cone 1200 are spaced apart from one another and circumferentially arranged about the sidewall 1202 of the cone 1200. In other examples, the first inlet opening 1502, the second inlet opening 1212, and the third inlet opening 1214 of the cone 1200 can instead be fluidically connected to one another (e.g., via a slot or channel) to create a continuous (e.g., slotted) inlet opening that extends circumferentially about an arc portion of the sidewall 1202 of the cone 1200.

The cone 1200 of FIGS. 12-19 further includes an example first outlet opening 1306 and an example second outlet opening 1216. The first outlet opening 1306 of the cone 1200 is formed and/or located at the second end 1208 (e.g., the rear end) of the cone 1200. The second outlet opening 1216 of the cone 1200 extends through the sidewall 1202 of the cone 1200 (e.g., from the outer surface 1204 of the sidewall 1202 to the inner surface 1302 of the sidewall 1202). In the illustrated example of FIGS. 12-19, the diameter of the first outlet opening 1306 of the cone 1200 is greater than the diameter of the second outlet opening 1216 of the cone 1200. In other examples, the diameter of the first outlet opening 1306 of the cone 1200 can instead be less than the diameter of the second outlet opening 1216 of the cone 1200. In the illustrated example of FIGS. 12-19, the second outlet opening 1216 of the cone 1200 is located forward of each of the first inlet opening 1502, the second inlet opening 1212, and the third inlet opening 1214 of the cone 1200. In other examples, the second outlet opening 1216 of the cone 1200 can instead be located rearward of the first inlet opening 1502, the second inlet opening 1212, and/or the third inlet opening 1214 of the cone 1200.

When the cone 1200 of FIGS. 12-19 is disposed within the chamber 904 of the gas train 900, movement of pressurized fluid (e.g., pressurized gas) from the inlet flow channel 902 of the gas train 900 into the chamber 904 of the gas train 900 and/or into the flow chamber 1304 of the cone 1200, and movement of pressurized fluid (e.g., pressurized gas) from the flow chamber 1304 of the cone 1200 and/or the chamber 904 of the gas train 900 into respective ones of the first outlet flow channel 906 and/or the second outlet flow channel 1102 of the gas train 900 is controlled by the rotational position of the cone 1200 relative to the chamber 904. In this regard, the cone 1200 of the gas valve 100 is rotatable relative to the chamber 904 of the gas valve 100 between a closed position and one or more open position(s). Placing the cone 1200 in the closed position prevents the movement of pressurized fluid (e.g., pressurized gas) from the inlet flow channel 902 into the chamber 904 and/or the flow chamber 1304, and/or prevents the movement of pressurized fluid (e.g., pressurized gas) from the flow chamber 1304 and/or the chamber 904 into respective ones of the first outlet flow channel 906 and/or the second outlet flow channel 1102. Conversely, placing the cone 1200 in one of the open position(s) enables the movement of pressurized fluid (e.g., pressurized gas) from the inlet flow channel 902 into the chamber 904 and/or the flow chamber 1304, and/or enables the movement of pressurized fluid (e.g., pressurized gas) from the flow chamber 1304 and/or the chamber 904 into respective ones of the first outlet flow channel 906 and/or the second outlet flow channel 1102.

Figure 20:
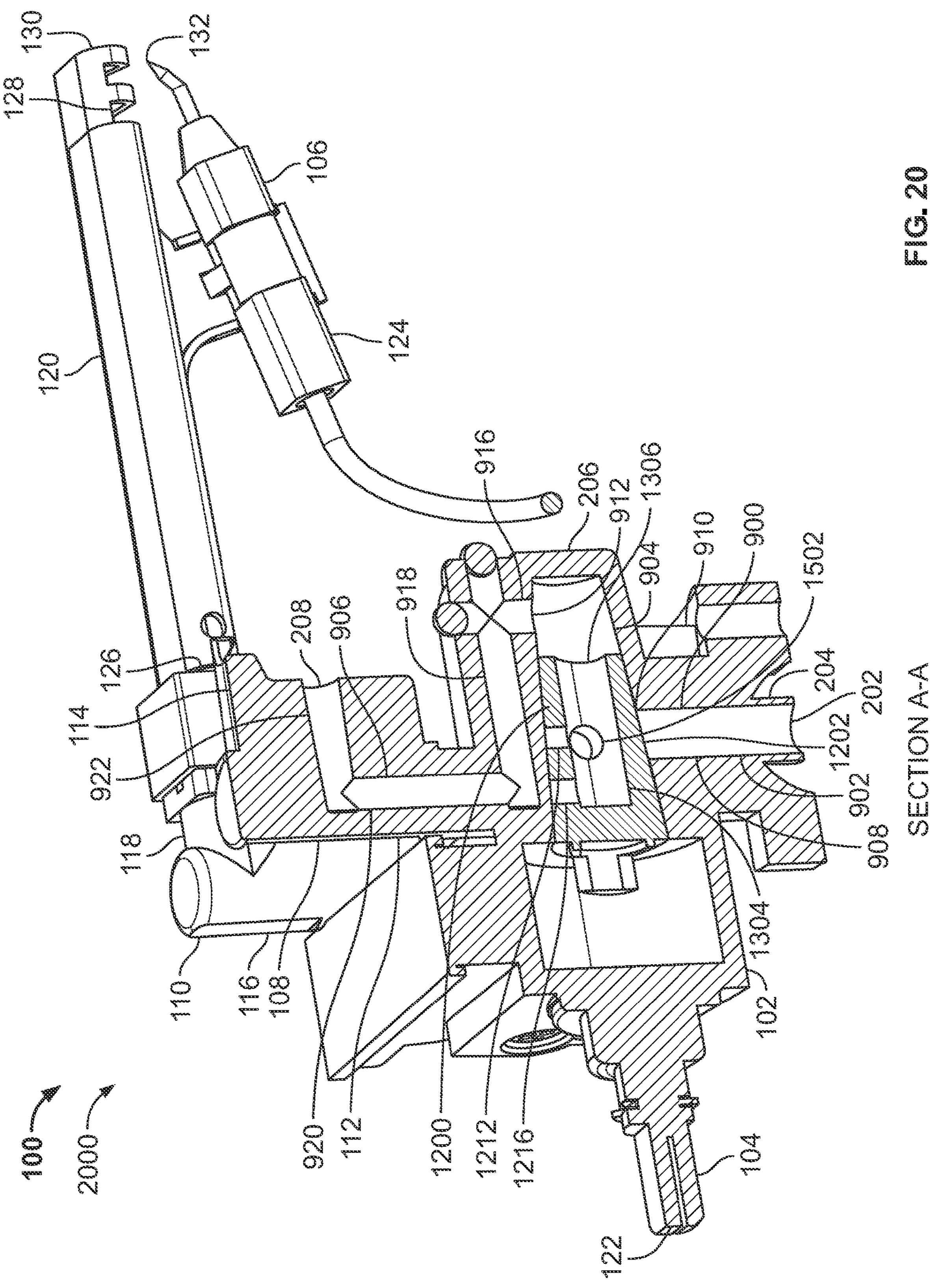
FIG. 20 is a partial cutaway view taken along section A-A of FIG. 5, showing the cone of FIGS. 12-19 disposed in the chamber of the gas valve of FIGS. 1-11, with the cone in an example closed position.
Figure 21:
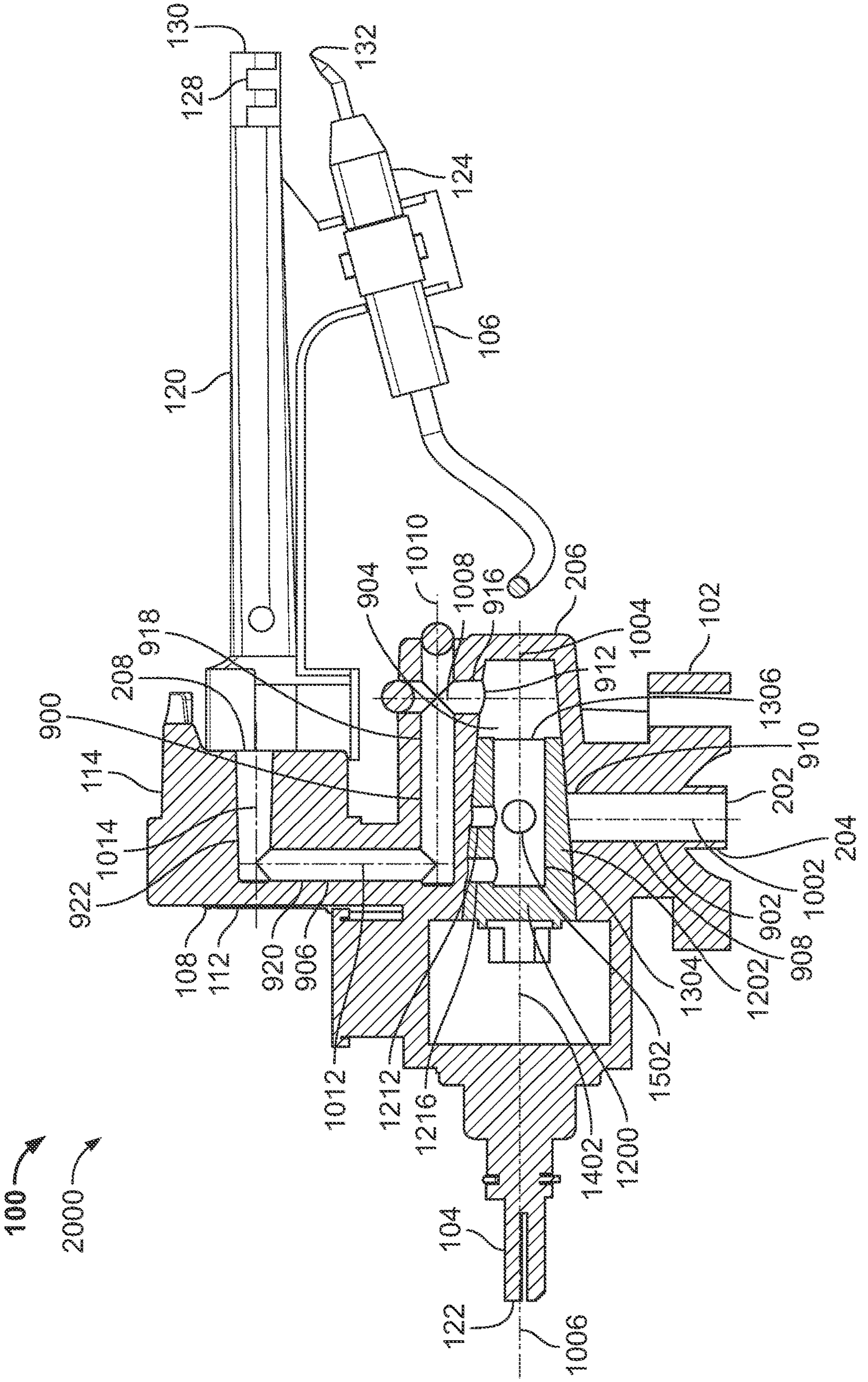
FIG. 21 is a cross-sectional view taken along section A-A of FIG. 5, showing the cone of FIGS. 12-20 disposed in the chamber of the gas valve of FIGS. 1-11 and 20, with the cone in the closed position of FIG. 20.
Figure 22:
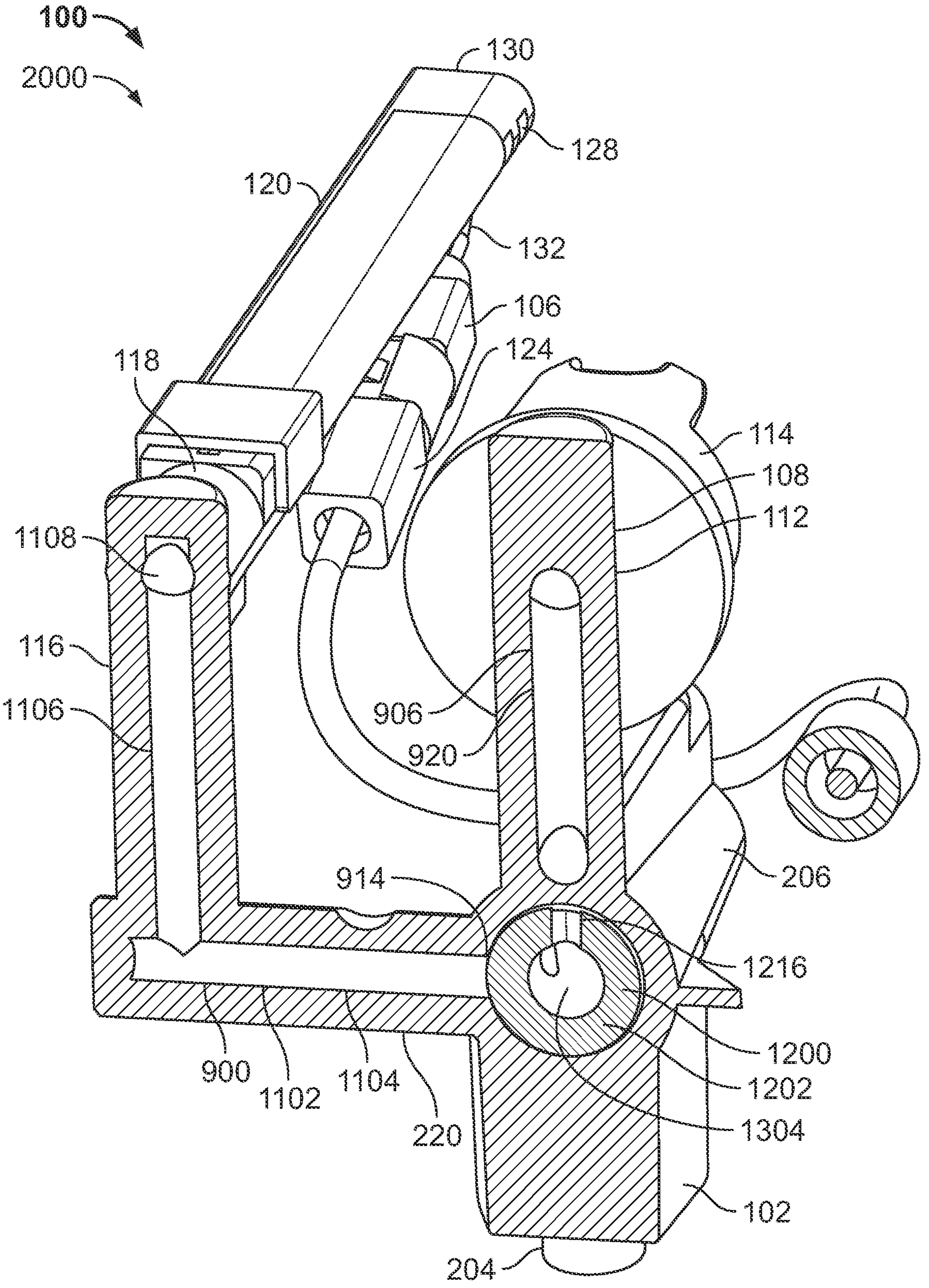
FIG. 22 is a partial cutaway view taken along section B-B of FIG. 7, showing the cone of FIGS. 12-21 disposed in the chamber of the gas valve of FIGS. 1-11, 20, and 21, with the cone in the closed position of FIGS. 20 and 21.

FIG. 20 is a partial cutaway view taken along section A-A of FIG. 5, showing the cone 1200 of FIGS. 12-19 disposed in the chamber 904 of the gas valve 100 of FIGS. 1-11, with the cone 1200 in an example closed position 2000. FIG. 21 is a cross-sectional view taken along section A-A of FIG. 5, showing the cone 1200 of FIGS. 12-20 disposed in the chamber 904 of the gas valve 100 of FIGS. 1-11 and 20, with the cone 1200 in the closed position 2000 of FIG. 20. FIG. 22 is a partial cutaway view taken along section B-B of FIG. 7, showing the cone 1200 of FIGS. 12-21 disposed in the chamber 904 of the gas valve 100 of FIGS. 1-11, 20, and 21, with the cone 1200 in the closed position 2000 of FIGS. 20 and 21.

When the cone 1200 is positioned in the closed position 2000 shown in FIGS. 20-22 relative to the chamber 904 of the gas train 900, none of the inlet openings (e.g., the first inlet opening 1502, the second inlet opening 1212, and the third inlet opening 1214) formed in the sidewall 1202 of the cone 1200 is aligned with the inlet opening 910 of the chamber 904. The inlet opening 910 of the chamber 904 is accordingly blocked and/or covered by a solid portion of the sidewall 1202 of the cone 1200, thereby preventing the flow chamber 1304 of the cone 1200 from being in fluid communication with the inlet flow channel 902 of the gas train 900, and thereby also preventing the movement of pressurized fluid (e.g., pressurized gas) from the inlet flow channel 902 of the gas train 900 into the flow chamber 1304 of the cone 1200 via the inlet opening 910 of the chamber 904.

When the cone 1200 is positioned in the closed position 2000 shown in FIGS. 20-22 relative to the chamber 904 of the gas train 900, there is also a lack of alignment between the second outlet opening 1216 formed in the sidewall 1202 of the cone 1200 and the second outlet opening 914 of the chamber 904. The second outlet opening 914 of the chamber 904 is accordingly blocked and/or covered by a solid portion of the sidewall 1202 of the cone 1200, thereby preventing the flow chamber 1304 of the cone 1200 from being in fluid communication with the second outlet flow channel 1102 of the gas train 900, and thereby also preventing the movement of pressurized fluid (e.g., pressurized gas) from the flow chamber 1304 of the cone 1200 into the second outlet flow channel 1102 of the gas train 900 via the second outlet opening 914 of the chamber 904.

Figure 23:
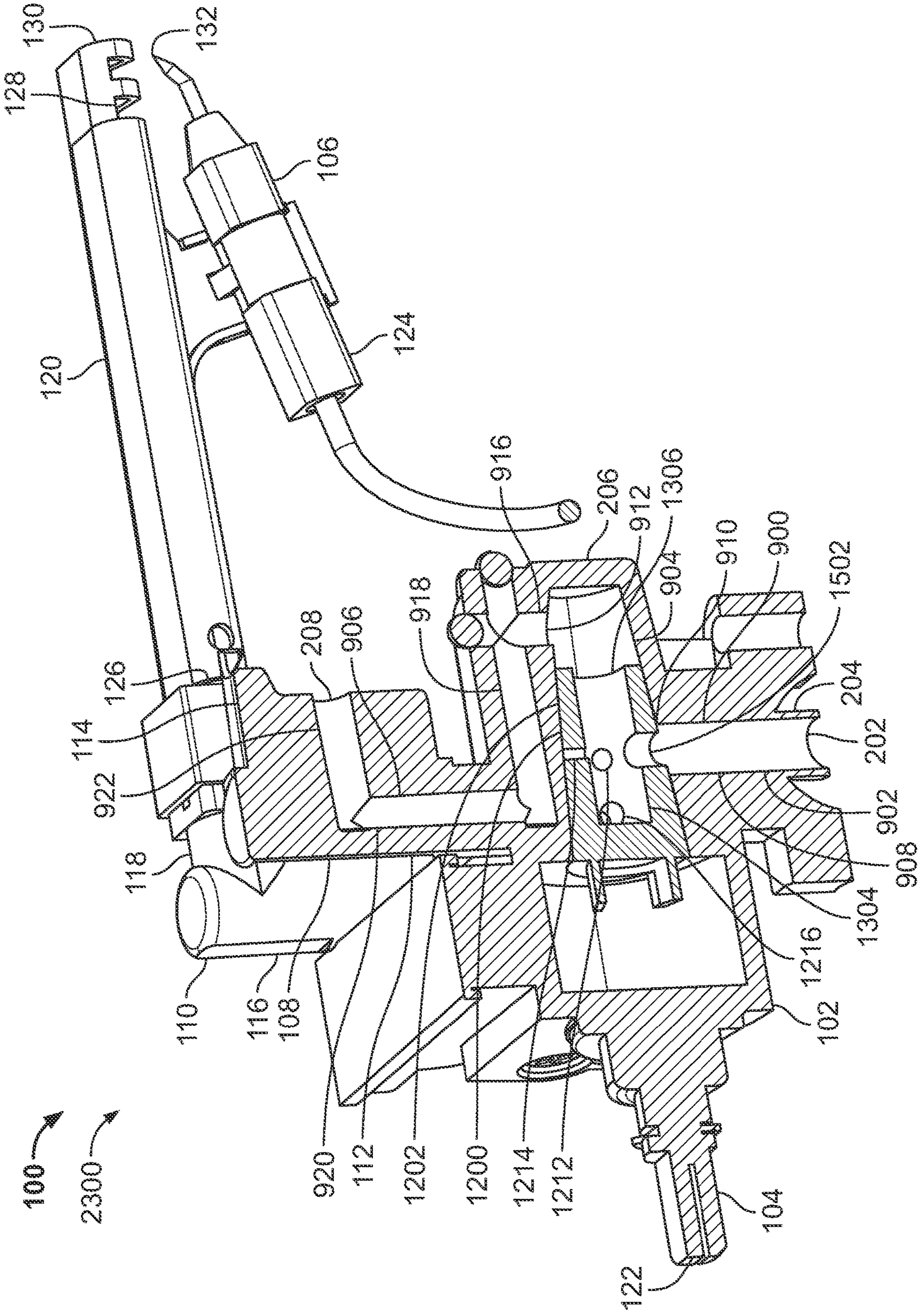
FIG. 23 is a partial cutaway view taken along section A-A of FIG. 5, showing the cone of FIGS. 12-22 disposed in the chamber of the gas valve of FIGS. 1-11 and 20-22, with the cone in an example open position.
Figure 24:
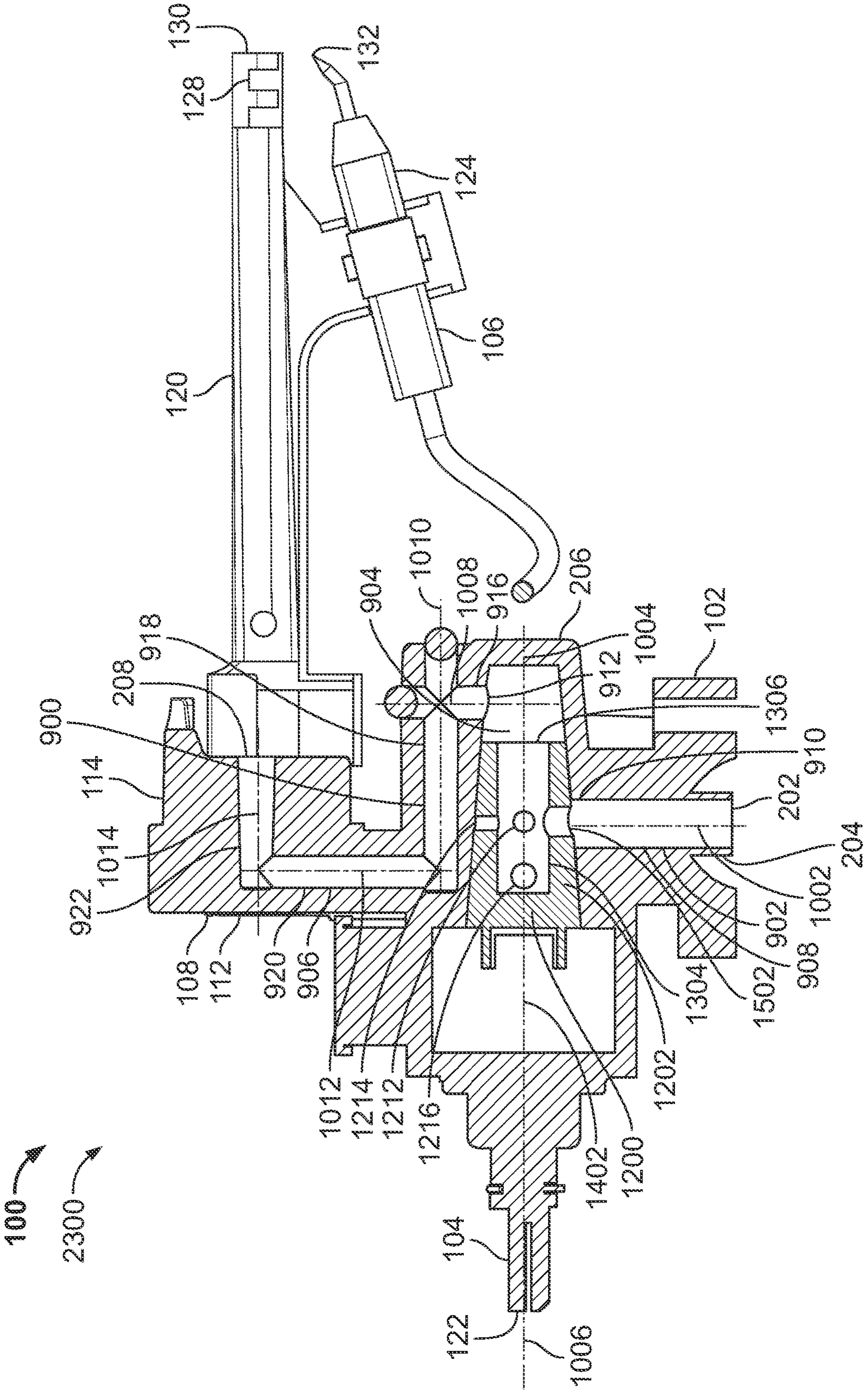
FIG. 24 is a cross-sectional view taken along section A-A of FIG. 5, showing the cone of FIGS. 12-23 disposed in the chamber of the gas valve of FIGS. 1-11 and 20-23, with the cone in the open position of FIG. 23.
Figure 25:
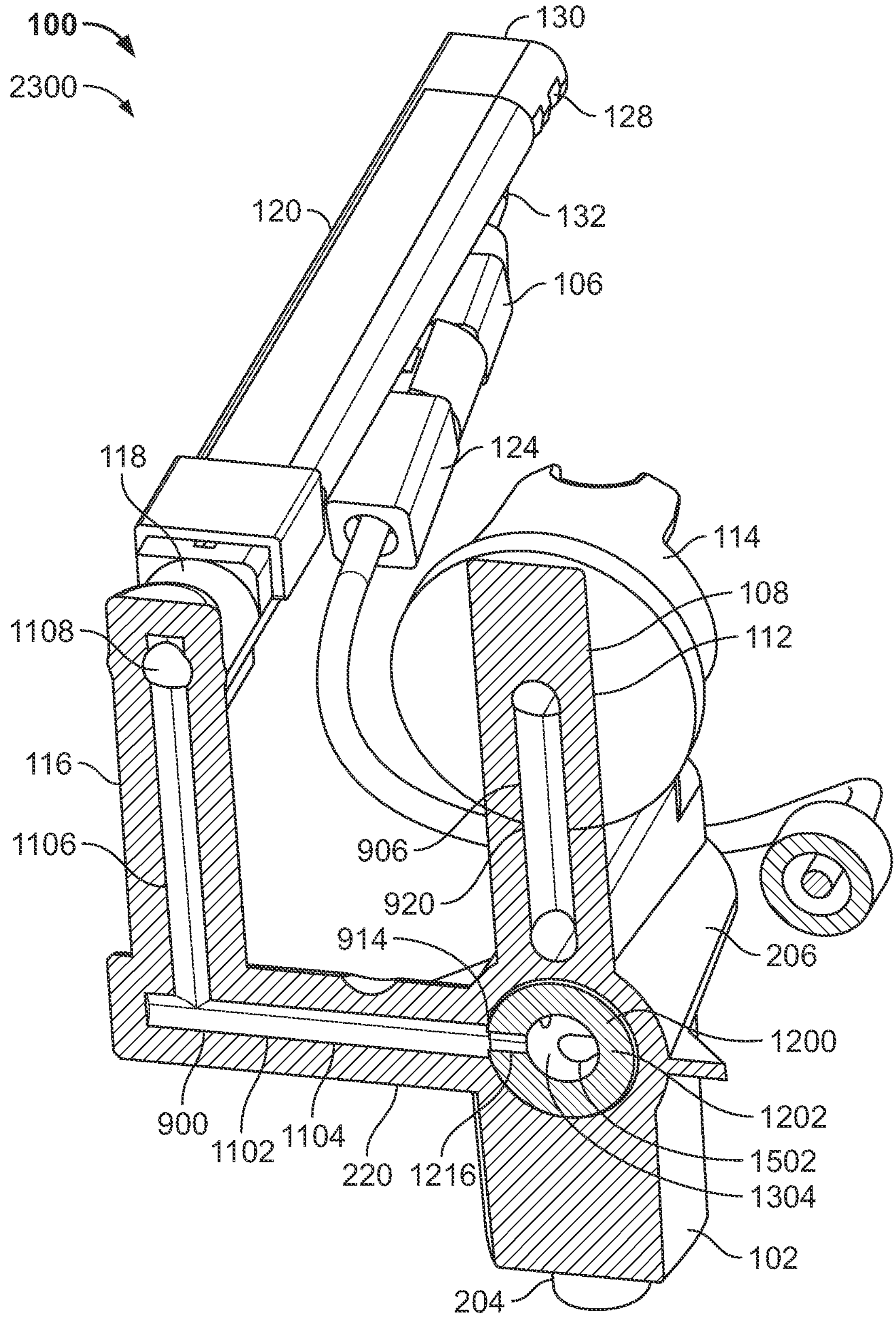
FIG. 25 is a partial cutaway view taken along section B-B of FIG. 7, showing the cone of FIGS. 12-24 disposed in the chamber of the gas valve of FIGS. 1-11 and 20-24, with the cone in the open position 2300 of FIGS. 23 and 24.

FIG. 23 is a partial cutaway view taken along section A-A of FIG. 5, showing the cone 1200 of FIGS. 12-22 disposed in the chamber 904 of the gas valve 100 of FIGS. 1-11 and 20-22, with the cone 1200 in an example open position 2300. FIG. 24 is a cross-sectional view taken along section A-A of FIG. 5, showing the cone 1200 of FIGS. 12-23 disposed in the chamber 904 of the gas valve 100 of FIGS. 1-11 and 20-23, with the cone 1200 in the open position 2300 of FIG. 23. FIG. 25 is a partial cutaway view taken along section B-B of FIG. 7, showing the cone 1200 of FIGS. 12-24 disposed in the chamber 904 of the gas valve 100 of FIGS. 1-11 and 20-24, with the cone 1200 in the open position 2300 of FIGS. 23 and 24.

When the cone 1200 is positioned in the open position 2300 shown in FIGS. 23-25 relative to the chamber 904 of the gas train 900, the first inlet opening 1502 formed in the sidewall 1202 of the cone 1200 is aligned with the inlet opening 910 of the chamber 904. The flow chamber 1304 of the cone 1200 is accordingly in fluid communication with the inlet flow channel 902 of the gas train 900 (e.g., via the alignment between the first inlet opening 1502 of the cone 1200 and the inlet opening 910 of the chamber 904), thereby enabling the movement of pressurized fluid (e.g., pressurized gas) from the inlet flow channel 902 of the gas train 900 into the flow chamber 1304 of the cone 1200 via the inlet opening 910 of the chamber 904 and the first inlet opening 1502 of the cone 1200. When the cone 1200 is positioned in the open position 2300 shown in FIGS. 23-25 relative to the chamber 904 of the gas train 900, the flow chamber 1304 of the cone 1200 is also in fluid communication with the first outlet flow channel 906 of the gas train 900 (e.g., via the first outlet opening 1306 of the cone 1200 and the first outlet opening 912 of the chamber 904), thereby enabling the movement of pressurized fluid (e.g., pressurized gas) from the flow chamber 1304 of the cone 1200 into the first outlet flow channel 906 of the gas train 900 via the first outlet opening 1306 of the cone 1200 and the first outlet opening 912 of the chamber 904.

When the cone 1200 is positioned in the open position 2300 shown in FIGS. 23-25 relative to the chamber 904 of the gas train 900, the second outlet opening 1216 formed in the sidewall 1202 of the cone 1200 is aligned with the second outlet opening 914 of the chamber 904. The flow chamber 1304 of the cone 1200 is accordingly in fluid communication with the second outlet flow channel 1102 of the gas train 900 (e.g., via the alignment between the second outlet opening 1216 of the cone 1200 and the second outlet opening 914 of the chamber 904), thereby enabling the movement of pressurized fluid (e.g., pressurized gas) from the flow chamber 1304 of the cone 1200 into the second outlet flow channel 1102 of the gas train 900 via the second outlet opening 1216 of the cone 1200 and the second outlet opening 914 of the chamber 904. Positioning the cone 1200 in the open position 2300 shown in FIGS. 23-25 can accordingly promote and/or cause the ignition of pressurized combustible fluid (e.g., pressurized combustible gas) that flows through the second outlet flow channel 1102 of the gas train 900 into the ignition conduit 120 of the ignition assembly 106 of the gas valve 100, as described above.

The cone 1200 can be rotated relative to the chamber 904 of the gas train 900 to other open positions that differ from the open position 2300 of FIGS. 23-25 described above. For example, the cone 1200 can be rotated relative to the chamber 904 of the gas train 900 by an additional ninety degree counterclockwise relative to the open position 2300 shown in FIGS. 23-25, thereby placing the cone 1200 in a second open position. When the cone 1200 is positioned in such a second open position, the second inlet opening 1212 formed in the sidewall 1202 of the cone 1200 is aligned with the inlet opening 910 of the chamber 904. The flow chamber 1304 of the cone 1200 is accordingly in fluid communication with the inlet flow channel 902 of the gas train 900 (e.g., via the alignment between the second inlet opening 1212 of the cone 1200 and the inlet opening 910 of the chamber 904), thereby enabling the movement of pressurized fluid (e.g., pressurized gas) from the inlet flow channel 902 of the gas train 900 into the flow chamber 1304 of the cone 1200 via the inlet opening 910 of the chamber 904 and the second inlet opening 1212 of the cone 1200. When the cone 1200 is positioned in the above-described second open position, the flow chamber 1304 of the cone 1200 is also in fluid communication with the first outlet flow channel 906 of the gas train 900 (e.g., via the first outlet opening 1306 of the cone 1200 and the first outlet opening 912 of the chamber 904), thereby enabling the movement of pressurized fluid (e.g., pressurized gas) from the flow chamber 1304 of the cone 1200 into the first outlet flow channel 906 of the gas train 900 via the first outlet opening 1306 of the cone 1200 and the first outlet opening 912 of the chamber 904.

When the cone 1200 is positioned in the above-described second open position, there is once again a lack of alignment between the second outlet opening 1216 formed in the sidewall 1202 of the cone 1200 and the second outlet opening 914 of the chamber 904. The second outlet opening 914 of the chamber 904 is accordingly blocked and/or covered by a solid portion of the sidewall 1202 of the cone 1200, thereby preventing the flow chamber 1304 of the cone 1200 from being in fluid communication with the second outlet flow channel 1102 of the gas train 900, and thereby also preventing the movement of pressurized fluid (e.g., pressurized gas) from the flow chamber 1304 of the cone 1200 into the second outlet flow channel 1102 of the gas train 900 via the second outlet opening 914 of the chamber 904.

As another example, the cone 1200 can be further rotated relative to the chamber 904 of the gas train 900 by an additional ninety degree counterclockwise relative to the second open position described above, thereby placing the cone 1200 in a third open position (e.g., one-hundred eighty degrees from the open position 2300 of FIGS. 23-25). When the cone 1200 is positioned in such a third open position, the third inlet opening 1214 formed in the sidewall 1202 of the cone 1200 is aligned with the inlet opening 910 of the chamber 904. The flow chamber 1304 of the cone 1200 is accordingly in fluid communication with the inlet flow channel 902 of the gas train 900 (e.g., via the alignment between the third inlet opening 1214 of the cone 1200 and the inlet opening 910 of the chamber 904), thereby enabling the movement of pressurized fluid (e.g., pressurized gas) from the inlet flow channel 902 of the gas train 900 into the flow chamber 1304 of the cone 1200 via the inlet opening 910 of the chamber 904 and the third inlet opening 1214 of the cone 1200. When the cone 1200 is positioned in the above-described third open position, the flow chamber 1304 of the cone 1200 is also in fluid communication with the first outlet flow channel 906 of the gas train 900 (e.g., via the first outlet opening 1306 of the cone 1200 and the first outlet opening 912 of the chamber 904), thereby enabling the movement of pressurized fluid (e.g., pressurized gas) from the flow chamber 1304 of the cone 1200 into the first outlet flow channel 906 of the gas train 900 via the first outlet opening 1306 of the cone 1200 and the first outlet opening 912 of the chamber 904.

When the cone 1200 is positioned in the above-described third open position, there is still a lack of alignment between the second outlet opening 1216 formed in the sidewall 1202 of the cone 1200 and the second outlet opening 914 of the chamber 904. The second outlet opening 914 of the chamber 904 is accordingly blocked and/or covered by a solid portion of the sidewall 1202 of the cone 1200, thereby preventing the flow chamber 1304 of the cone 1200 from being in fluid communication with the second outlet flow channel 1102 of the gas train 900, and thereby also preventing the movement of pressurized fluid (e.g., pressurized gas) from the flow chamber 1304 of the cone 1200 into the second outlet flow channel 1102 of the gas train 900 via the second outlet opening 914 of the chamber 904.

Figure 26:
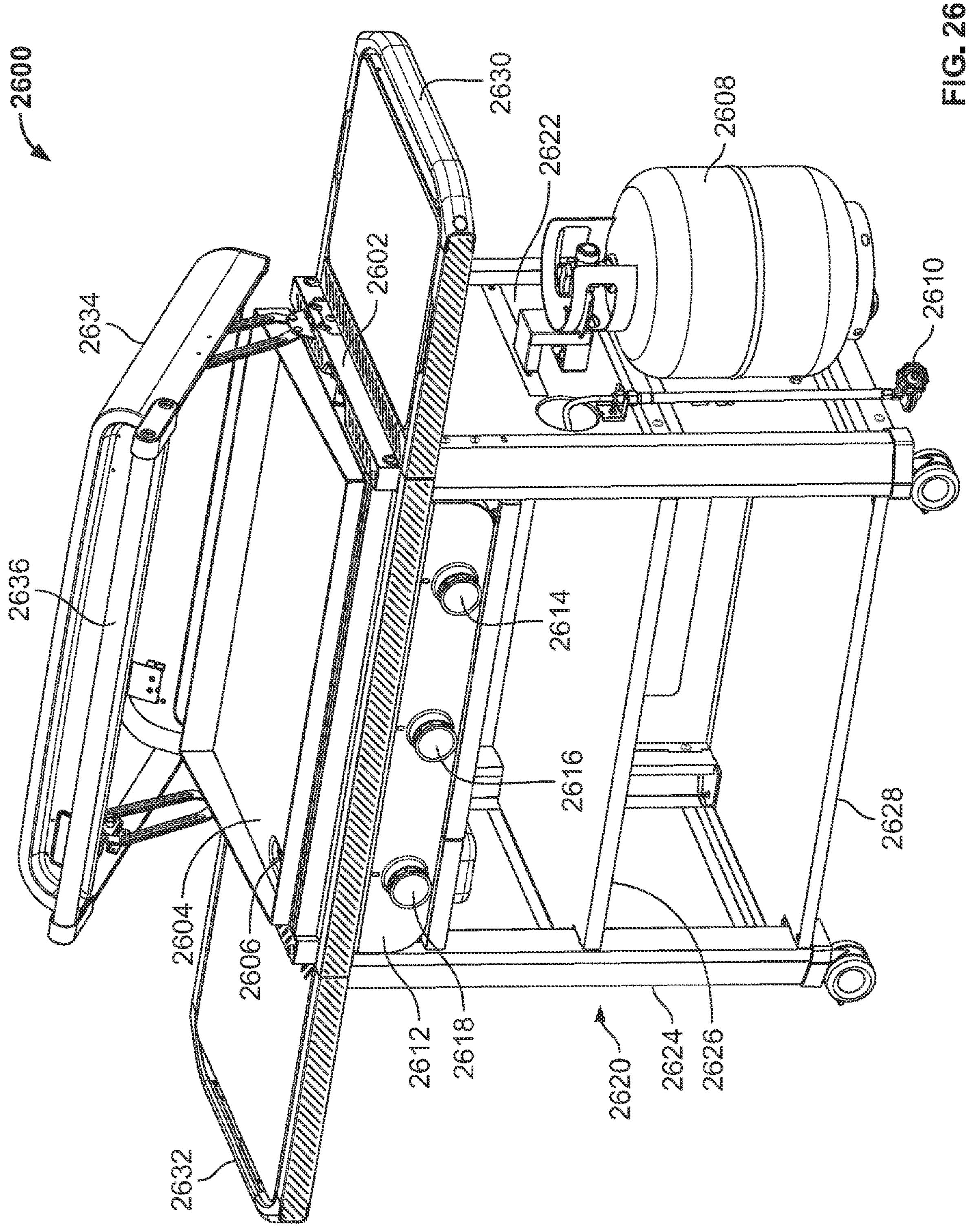
FIG. 26 is a perspective view of an example grill constructed in accordance with the teachings of this disclosure.
Figure 27:
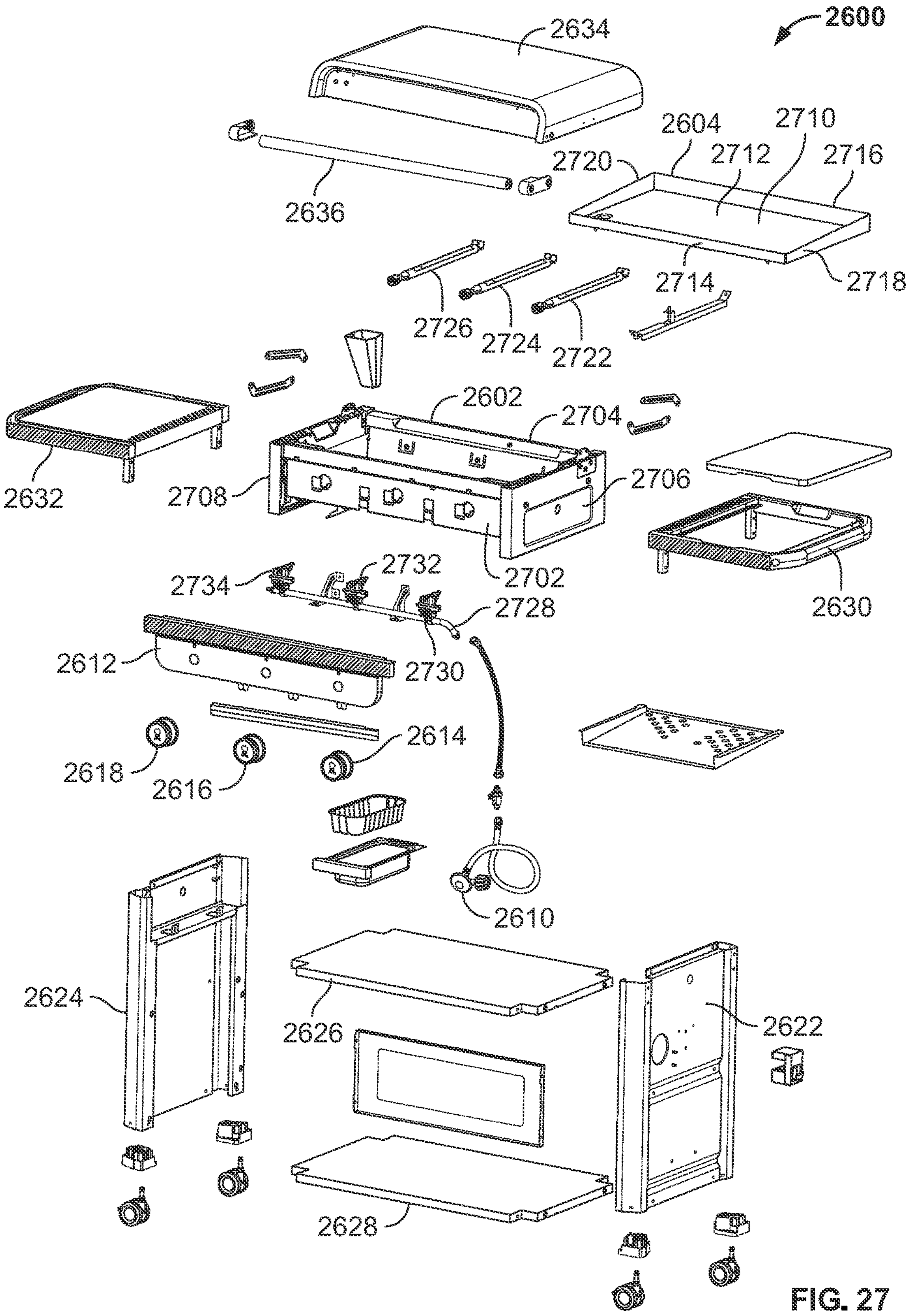
FIG. 27 is an exploded view of the grill of FIG. 26.

The gas valve 100 of FIGS. 1-25 can be implemented in a variety of grills. FIG. 26 is a perspective view of an example grill 2600 constructed in accordance with the teachings of this disclosure. FIG. 27 is an exploded view of the grill 2600 of FIG. 26. In the illustrated example of FIGS. 26 and 27, the grill 2600 is structured as a flat top gas grill. In this regard, the grill 2600 of FIGS. 26 and 27 includes an example cookbox 2602 and an example griddle 2604. In other examples, the grill 2600 can instead be configured as a different type of gas grill. For example, the grill 2600 can instead be configured as a gas grill including a cookbox that supports and/or carries one or more cooking grate(s). The grill 2600 of FIGS. 26 and 27 is configured to include at least one instance of the above-described gas valve 100, with said implementation being further described herein.

In the illustrated example of FIGS. 26 and 27, the cookbox 2602 includes an example an example front wall 2702, an example rear wall 2704, an example right sidewall 2706, and an example left sidewall 2708. The rear wall 2704 of the cookbox 2602 is located opposite the front wall 2702 of the cookbox 2602. The right sidewall 2706 of the cookbox 2602 extends between the front wall 2702 and the rear wall 2704 of the cookbox 2602. The left sidewall 2708 of the cookbox 2602 is located opposite the right sidewall 2706 of the cookbox 2602 and extends between the front wall 2702 and the rear wall 2704 of the cookbox 2602. As shown in FIGS. 26 and 27, the front wall 2702, the rear wall 2704, the right sidewall 2706, and the left sidewall 2708 of the cookbox 2602 define a cavity in which one or more structural component(s) (e.g., one or more burner tube(s)) of the grill 2600 can be disposed.

The griddle 2604 of the grill 2600 is configured to be disposed on and/or above the cookbox 2602 of the grill 2600. In the illustrated example of FIGS. 26 and 27, the griddle 2604 includes an example base 2710 having an example flat top cooking surface 2712 and an underside located opposite the flat top cooking surface 2712. In the illustrated example of FIGS. 26 and 27, the flat top cooking surface 2712 is a continuous, substantially flat and/or substantially planar surface that is free of openings aside from an example waste disposal opening 2606 formed therein. The flat top cooking surface 2712 is configured to support a variety of liquid, semi-liquid, and/or solid food items during a variety of cooking processes that may be performed on the griddle 2604. In the illustrated example of FIGS. 26 and 27, the flat top cooking surface 2712 and/or, more generally, the base 2710 of the griddle 2604 has a generally rectangular profile. In other examples, the flat top cooking surface 2712 and/or, more generally, the base 2710 of the griddle 2604 can instead have a non-rectangular profile (e.g., a circular profile, an oval profile, a triangular profile, a trapezoidal profile, etc.).

The griddle 2604 of FIGS. 26 and 27 further includes an example front lip 2714, and an example rear lip 2716, an example right side lip 2718, and an example left side lip 2720. The rear lip 2716 of the griddle 2604 is located opposite the front lip 2714 of the griddle 2604. The right side lip 2718 of the griddle 2604 extends between the front lip 2714 and the rear lip 2716 of the griddle 2604. The left side lip 2720 of the griddle 2604 is located opposite the right side lip 2718 of the griddle 2604 and extends between the front lip 2714 and the rear lip 2716 of the griddle 2604. The front lip 2714, the rear lip 2716, the right side lip 2718, and the left side lip 2720 of the griddle 2604 extend upwardly from the base 2710 of the griddle 2604 to provide vertical boundaries configured to prevent food items from sliding off the flat top cooking surface 2712 of the griddle 2604 during one or more cooking operation(s) performed thereon.

The grill 2600 of FIGS. 26 and 27 further includes a plurality of burner tubes configured to be supported by, carried by, and/or disposed within the cookbox 2602 of the grill 2600. As shown in FIG. 27, the plurality of burner tubes includes an example first burner tube 2722, an example second burner tube 2724, and an example third burner tube 2726 (e.g., a total of three burner tubes) configured to be laterally spaced apart from one another and arranged in a front-to-rear orientation within the cookbox 2602, with the first burner tube 2722, the second burner tube 2724, and the third burner tube 2726 being of a substantially identical construction relative to one another. In other examples, the plurality of burner tubes can instead include a different number (e.g., two, four, five, etc.) of burner tubes, and the construction of one or more of the burner tubes may differ from that of the first burner tube 2722, the second burner tube 2724, and/or the third burner tube 2726 shown in FIG. 27. The first burner tube 2722 of the grill 2600 is further described below in connection with FIGS. 28-34.

In the illustrated example of FIGS. 26 and 27, the burner tubes (e.g., the first burner tube 2722, the second burner tube 2724, and the third burner tube 2726) form part of a gas train that further includes an example fuel source 2608, an example regulator assembly 2610, an example manifold 2728, and a plurality of control valves corresponding in number to the plurality of burner tubes. In this regard, the plurality of control valves of the grill 2600 as shown in FIG.

27 includes an example first control valve 2730 associated with the first burner tube 2722, an example second control valve 2732 associated with the second burner tube 2724, and an example third control valve 2734 associated with the third burner tube 2726. In the illustrated example of FIGS. 26 and 27, the first control valve 2730, the second control valve 2732, and the third control valve 2734 of the grill 2600 are respectively implemented by separate instances of the gas valve 100 of FIGS. 1-11 and 20-25 described above.

In the illustrated example of FIGS. 26 and 27, the fuel source 2608 is implemented as a fuel tank (e.g., a propane tank) containing combustible gas. In other examples, the fuel source 2608 can instead be implemented as a piped (e.g., household) natural gas line that provides an accessible flow of combustible gas. The regulator assembly 2610 is operatively positioned between the fuel source 2608 and the manifold 2728 such that a supply of pressurized combustible gas provided via the fuel source 2608 flows through the regulator assembly 2610 and into the manifold 2728. The first control valve 2730 is operatively positioned between the manifold 2728 and the first burner tube 2722 such that pressurized combustible gas received at the manifold 2728 can be selectively supplied to the first burner tube 2722 via the first control valve 2730. The second control valve 2732 is operatively positioned between the manifold 2728 and the second burner tube 2724 such that pressurized combustible gas received at the manifold 2828 can be selectively supplied to the second burner tube 2724 via the second control valve 2732. The third control valve 2734 is operatively positioned between the manifold 2728 and the third burner tube 2726 such that pressurized combustible gas received at the manifold 2728 can be selectively supplied to the third burner tube 2726 via the third control valve 2734.

In the illustrated example of FIGS. 26 and 27, the manifold 2728, the first control valve 2730, the second control valve 2732, and the third control valve 2734 are at least partially covered and/or concealed by an example control panel 2612 that is coupled to and/or located along the front of the cookbox 2602. The grill 2600 further includes a plurality of control knobs mounted and/or located along the front face of the control panel 2612, with the plurality of control knobs corresponding in number to the plurality of control valves and/or the number of burner tubes. In this regard, the plurality of control valves of the grill 2600 as shown in FIGS. 26 and 27 includes an example first control knob 2614 associated with the first control valve 2730 and/or the first burner tube 2722, an example second control knob 2616 associated with the second control valve 2732 and/or the second burner tube 2724, and an example third control knob 2618 associated with the third control valve 2734 and/or the third burner tube 2726. Each control knob is mechanically coupled to its corresponding control valve such that movement (e.g., rotation) of the control knob changes the extent to which an adjustable flow control member of the corresponding control valve enables pressurized combustible gas to flow through the corresponding control valve into the corresponding burner tube. For example, the first control knob 2614 is mechanically coupled to the first control valve 2730 such that movement (e.g., rotation) of the first control knob 2614 changes the extent to which an adjustable flow control member of the first control valve 2730 enables pressurized combustible gas to flow through the first control valve 2730 into the first burner tube 2722.

The grill 2600 of FIGS. 26 and 27 further includes an example frame 2620. The frame 2620 can be configured from any number and any type of structural components arranged in any manner that facilitates supporting the cookbox 2602 above an underlying ground surface when the grill 2600 is in use. In the illustrated example of FIGS. 26 and 27, the frame 2620 includes an example right side support panel 2622 and an example left side support panel 2624, each of which is configured to support the cookbox 2602. As shown in FIGS. 26 and 27, the right side support panel 2622 and the left side support panel 2624 are spaced apart from one another, are oriented vertically, and are coupled (e.g., via one or more fastener(s)) to the cookbox 2602 in a fixed manner. The frame 2620 further includes an example upper shelf 2626 and an example lower shelf 2628, each of which is configured to support one or more item(s) at a location below the cookbox 2602 of the grill 2600. As shown in FIGS. 26 and 27, the upper shelf 2626 and the lower shelf 2628 are spaced apart from one another, are oriented horizontally, and are coupled (e.g., via one or more fastener(s)) to the right side support panel 2622 and/or the left side support panel 2624 in a fixed manner. In other examples, the frame 2620 can instead include one or more foldable, slidable, and/or telescoping support member(s) (e.g., leg(s), panel(s), etc.) that facilitate collapsing and/or otherwise modifying the frame 2620 of the grill 2600 when the grill 2600 is not in use.

The grill 2600 of FIGS. 26 and 27 further includes an example right side accessory support frame 2630 and an example left side accessory support frame 2632. The right side accessory support frame 2630 is coupled (e.g., via one or more fastener(s)) to the right side support panel 2622 of the frame 2620, and/or to a right sidewall of the cookbox 2602. Conversely, the left side accessory support frame 2632 is coupled (e.g., via one or more fastener(s)) to the left side support panel 2624 of the frame 2620, and/or to a left sidewall of the cookbox 2602. The right side accessory support frame 2630 and the left side accessory support frame 2632 of the grill 2600 are respectively configured to support one or more insertable accessories and/or one or more snap fit accessories at a location to the side (e.g., the right side or the left side) of the cookbox 2602 of the grill 2600.

The grill 2600 of FIGS. 26 and 27 further includes an example lid 2634 configured to cover and/or enclose the griddle 2604 of the grill 2600 when the lid 2634 is in a closed position. The lid 2634 is movable relative to the cookbox 2602, the griddle 2604, and/or the frame 2620 of the grill 2600 between a closed position in which the flat top cooking surface 2712 of the griddle 2604 is covered, and an open position in which the flat top cooking surface 2712 of the griddle 2604 is exposed (e.g., as shown in FIG. 26). In the illustrated example of FIGS. 26 and 27, the lid 2634 is pivotally coupled to the cookbox 2602 and/or the frame 2620 of the grill 2600 via one or more hinge(s). In other examples, the lid 2634 can instead be removably positioned on the cookbox 2602, the griddle 2604, and/or the frame 2620 of the grill 2600 without there being any direct mechanical coupling between the lid 2634 on the one hand and the cookbox 2602, the griddle 2604, and/or the frame 2620 on the other hand. Movement of the lid 2634 of the grill 2600 between the closed position and the open position can be facilitated via user interaction with an example handle 2636 that is coupled (e.g., via one or more fastener (s)) to the lid 2634.

Figure 28:
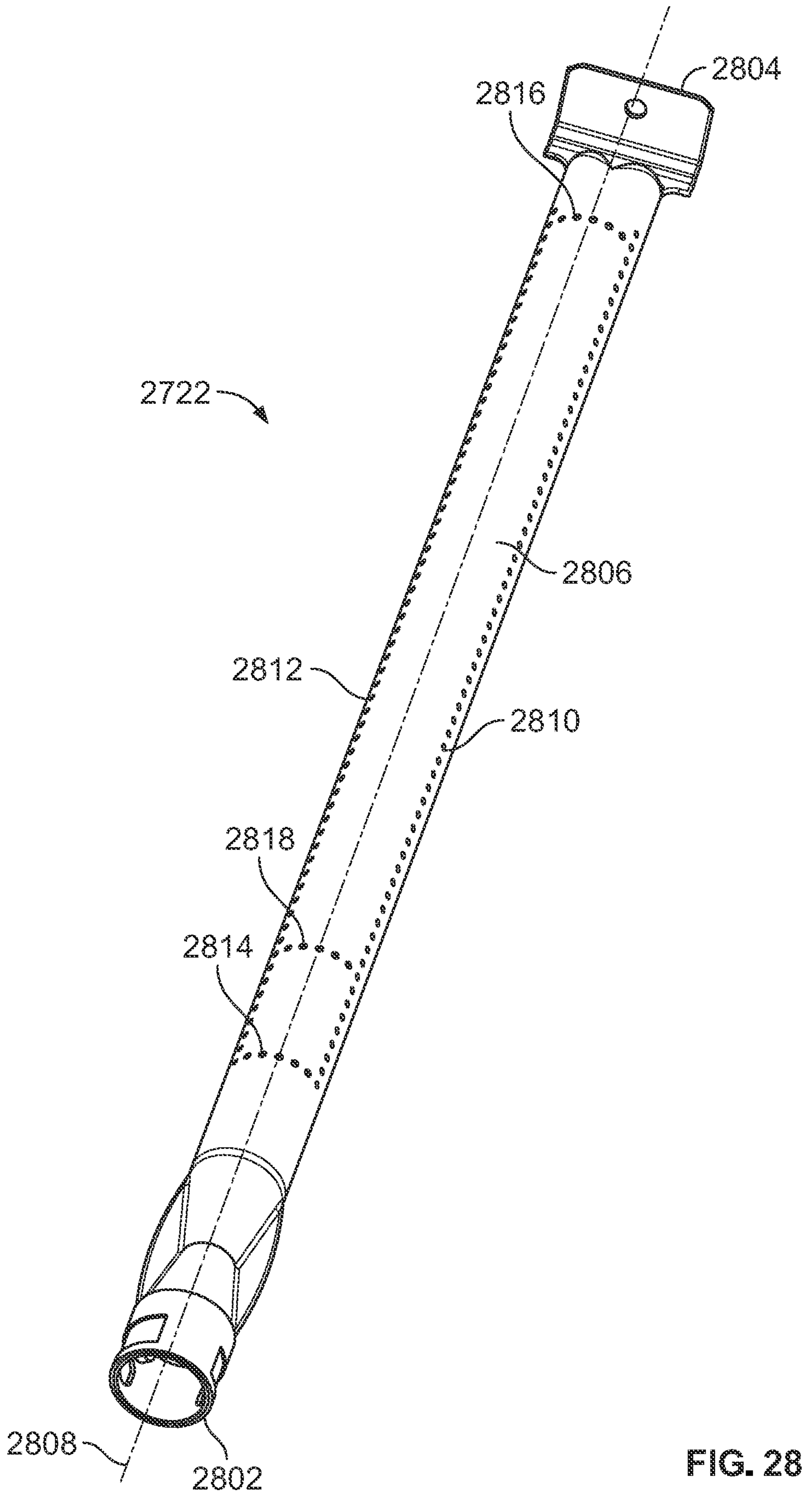
FIG. 28 is a perspective view showing the first burner tube of the grill of FIGS. 26 and 27 in isolation.
Figure 29:
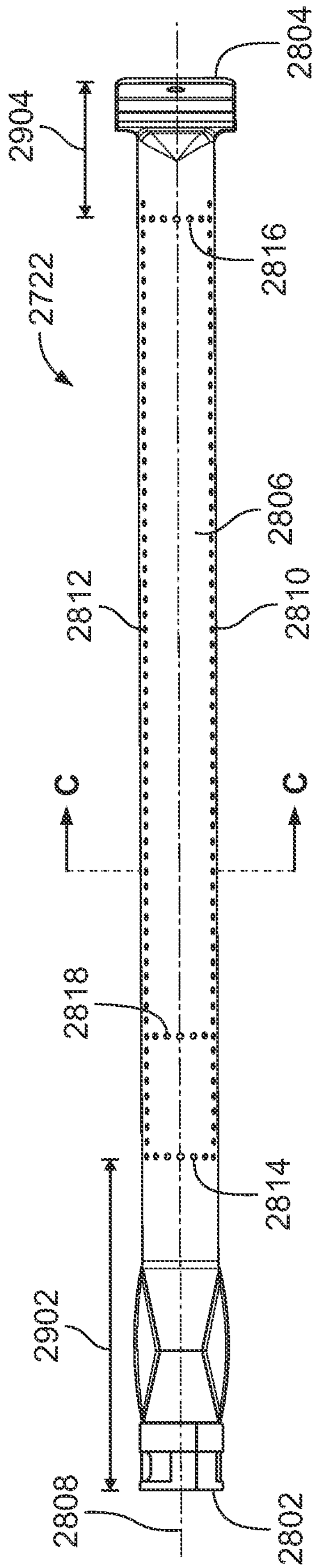
FIG. 29 is a top view of the first burner tube of FIG. 28.
Figure 30:
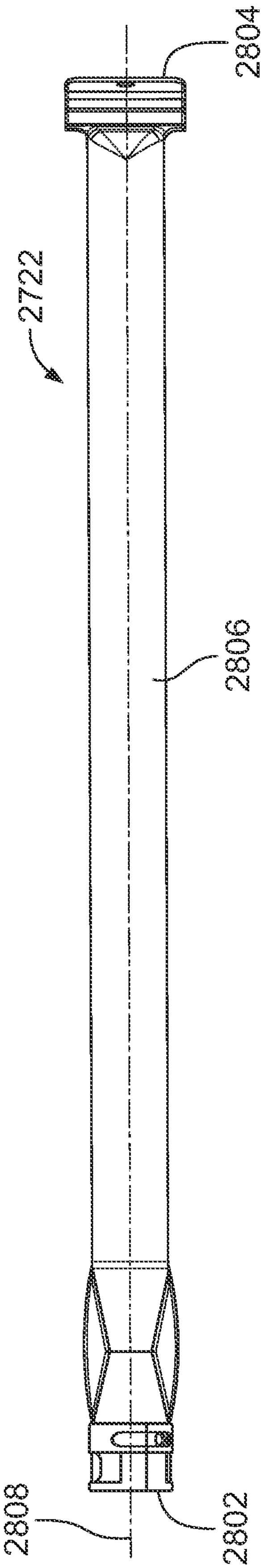
FIG. 30 is a bottom view of the first burner tube of FIGS. 28 and 29.
Figure 31:
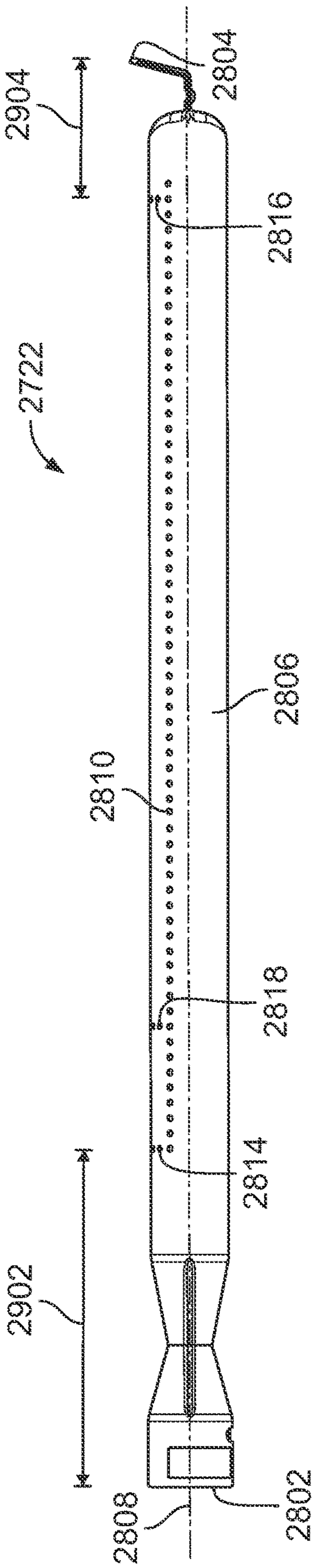
FIG. 31 is a right side view of the first burner tube of FIGS. 28-30.
Figure 32:
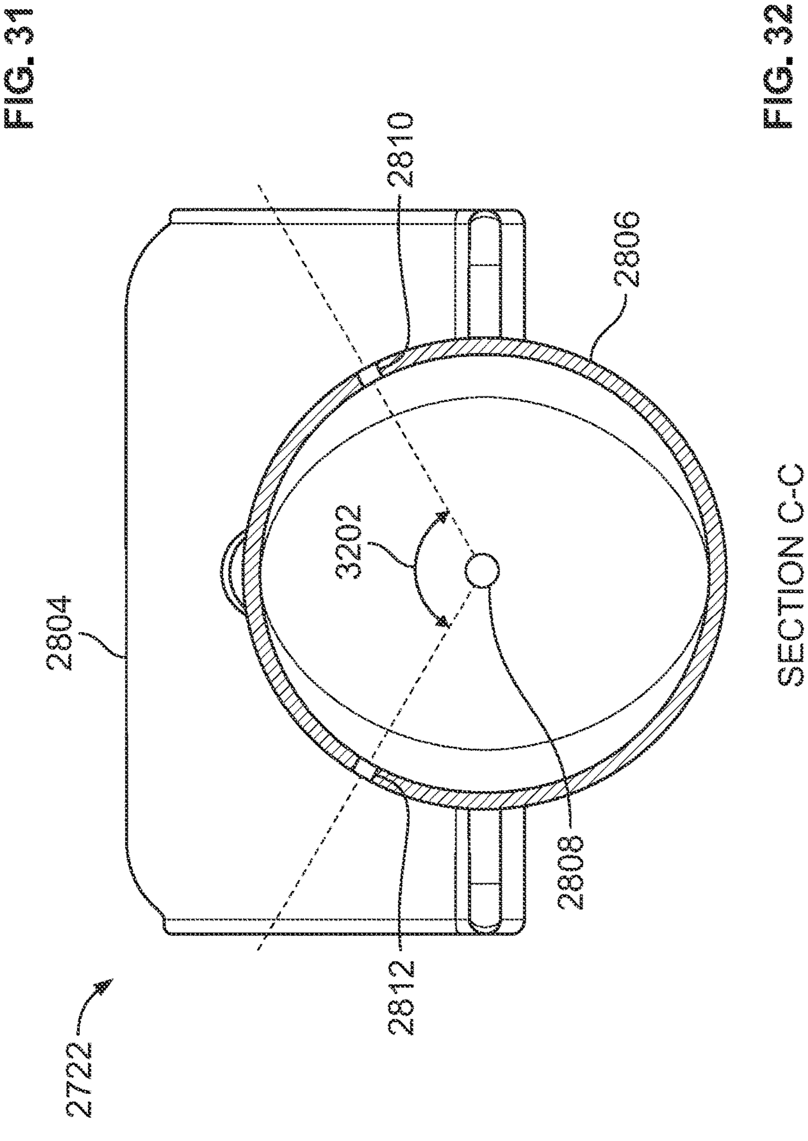
FIG. 32 is a cross-sectional view of the first burner tube of FIGS. 28-31 taken along section C-C of FIG. 29.

FIG. 28 is a perspective view showing the first burner tube 2722 of the grill 2600 of FIGS. 26 and 27 in isolation. FIG. 29 is a top view of the first burner tube 2722 of FIG. 28. FIG. 30 is a bottom view of the first burner tube 2722 of FIGS. 28 and 29. FIG. 31 is a right side view of the first burner tube 2722 of FIGS. 28-30. FIG. 32 is a cross-sectional view of the first burner tube 2722 of FIGS. 28-31 taken along section C-C of FIG. 29. The construction of the second burner tube 2724 and the third burner tube 2726 of the grill 2600 of FIGS. 26 and 27 is substantially identical to that of the first burner tube 2722 as described herein in connection with FIGS. 28-32.

As shown in FIGS. 28-32, the first burner tube 2722 includes an example first end 2802 (e.g., a front end), an example second end 2804 (e.g., a rear end), an example outer wall 2806 extending between the first end 2802 and the second end 2804, and an example central axis 2808 extending between the first end 2802 and the second end 2804. The first end 2802 of the first burner tube 2722 is partially open, with the first end 2802 being configured to receive an outlet of a control valve (e.g., the outlet of the first control valve 2730 as implemented via the first outlet 208 of the gas valve 100) located proximate the front wall 2702 of the cookbox 2602. The second end 2804 of the first burner tube 2722 is closed, with the second end 2804 being configured to be coupled to a mounting flange located proximate the rear wall 2704 of the cookbox 2602. The first burner tube 2722 is accordingly configured to be arranged in a front-to-rear orientation when disposed in the cookbox 2602. In the illustrated example of FIGS. 28-32, the first burner tube 2722 is structured as a linear burner tube having a circular cross-sectional profile. In other example, the first burner tube 2722 can instead be structured as a linear burner tube having a different cross-sectional profile (e.g., a rectangular cross-sectional profile, an oval-shaped cross-sectional profile, a triangular cross-sectional profile, a trapezoidal cross-sectional profile, etc.). In still other examples, the first burner tube 2722 can instead be structured as a non-linear burner tube having one or more bend(s) and/or curve(s) formed therein.

The first burner tube 2722 of FIGS. 28-32 includes a plurality of ports formed in and extending through the outer wall 2806 of the first burner tube 2722. As shown in FIGS. 28-32, the plurality of ports includes an example first row of ports 2810, an example second row of ports 2812, an example third row of ports 2814, and an example fourth row of ports 2816. The first row of ports 2810 is arranged parallel to the central axis 2808. The second row of ports 2812 is also arranged parallel to the central axis 2808, with the second row of ports 2812 being spaced apart from (e.g., angularly displaced from) the first row of ports 2810 about the perimeter (e.g., about the circumference) of the outer wall 2806 of the first burner tube 2722. The third row of ports 2814 is arranged perpendicular to the central axis 2808. The fourth row of ports 2816 is also arranged perpendicular to the central axis 2808, with the fourth row of ports 2816 being spaced apart from (e.g., longitudinally displaced from) the third row of ports 2814 along the central axis 2808 of the first burner tube 2722. In the illustrated example of FIGS. 28-32, the third row of ports 2814 is located proximate the first end 2802 (e.g., the front end) of the first burner tube 2722, and the fourth row of ports 2816 is located proximate the second end 2804 (e.g., the rear end) of the first burner tube 2722. The first burner tube 2722 can include additional ports and/or additional rows of ports relative to those described above. For example, as shown in FIGS. 28-32, the first burner tube 2722 further includes an example fifth row of ports 2818 arranged perpendicular to the central axis 2808, with the fifth row of ports 2818 being spaced apart from and proximate to the third row of ports 2814.

As shown in FIGS. 28-32, the outer wall 2806 of the first burner tube 2722 has a circular cross-sectional profile. The second row of ports 2812 is angularly displaced from the first row of ports 2810 about the circumference of the outer wall 2806 by an example angle 3202 measuring approximately 120.0 degrees. In other examples, the angle 3202 at which the second row of ports 2812 is angularly displaced from the first row of ports 2810 about the circumference of the outer wall 2806 can be between 90.0 and 150.0 degrees. Satisfaction of the above-described range of the angle 3202 at which the second row of ports 2812 is angularly displaced from the first row of ports 2810 about the circumference of the outer wall 2806 advantageously improves the operating efficiency of the cooking engine of the grill 2600, and also improves the heat distribution properties associated with the griddle 2604 of the grill 2600. In this regard, satisfaction of the above-described range of the angle 3202 at which the second row of ports 2812 is angularly displaced from the first row of ports 2810 about the circumference of the outer wall 2806 advantageously assists in minimizing any temperature variation across the flat top cooking surface 2712 of the griddle 2604 during cooking operations performed thereon.

The first burner tube 2722 of FIGS. 28-32 is further configured such that the third row of ports 2814 of the first burner tube 2722 is spaced apart from the first end 2802 (e.g., the front end) of the first burner tube 2722 by an example distance 2902 of approximately 4.4 inches. In other examples, the distance 2902 between the third row of ports 2814 and the first end 2802 of the first burner tube 2722 can be between 1.0 and 6.0 inches. Satisfaction of the above-described range of the distance 2902 between the third row of ports 2814 and the first end 2802 of the first burner tube 2722 advantageously improves the operating efficiency of the cooking engine of the grill 2600, and also improves the heat distribution properties associated with the griddle 2604 of the grill 2600. In this regard, satisfaction of the above-described range of the distance 2902 between the third row of ports 2814 and the first end 2802 of the first burner tube 2722 advantageously assists in minimizing any temperature variation across the flat top cooking surface 2712 of the griddle 2604 during cooking operations performed thereon.

The first burner tube 2722 of FIGS. 28-32 is further configured such that the fourth row of ports 2816 of the first burner tube 2722 is spaced apart from the second end 2804 (e.g., the rear end) of the first burner tube 2722 by an example distance 2904 of approximately 1.8 inches. In other examples, the distance 2904 between the fourth row of ports 2816 and the second end 2804 of the first burner tube 2722 can be between 1.0 and 6.0 inches. Satisfaction of the above-described range of the distance 2904 between the fourth row of ports 2816 and the second end 2804 of the first burner tube 2722 advantageously improves the operating efficiency of the cooking engine of the grill 2600, and also improves the heat distribution properties associated with the griddle 2604 of the grill 2600. In this regard, satisfaction of the above-described range of the distance 2904 between the fourth row of ports 2816 and the second end 2804 of the first burner tube 2722 advantageously assists in minimizing any temperature variation across the flat top cooking surface 2712 of the griddle 2604 during cooking operations performed thereon.

In the illustrated example of FIGS. 28-32, the first burner tube 2722 has a length of approximately 18.6 inches measured along the central axis 2808 from the first end 2802 (e.g., the front end) to the second end 2804 (e.g., the rear end) of the first burner tube 2722. In other examples, the first burner tube 2722 can instead have a length that is substantially greater than or substantially less than 18.6 inches. In the illustrated example of FIGS. 28-32, the outer wall 1806 of the first burner tube 2722 has a diameter of approximately 1.0 inches measured across the circular cross-sectional profile of the outer wall 1806. In other examples, the first burner tube 2722 can instead have a diameter that is substantially greater than or substantially less than 1.0 inches. In the illustrated example of FIGS. 28-32, each one of the ports formed in and extending through the outer wall 2806 of the first burner tube 2722 has a diameter ranging between approximately 0.07 inches and 0.08 inches measured across the circular outlet opening of the port. In other examples, one or more of the ports formed in and extending through the outer wall 1806 of the first burner tube 2722 can instead have a diameter that is substantially less than 0.07 inches or substantially greater than 0.08 inches.

Figure 33:
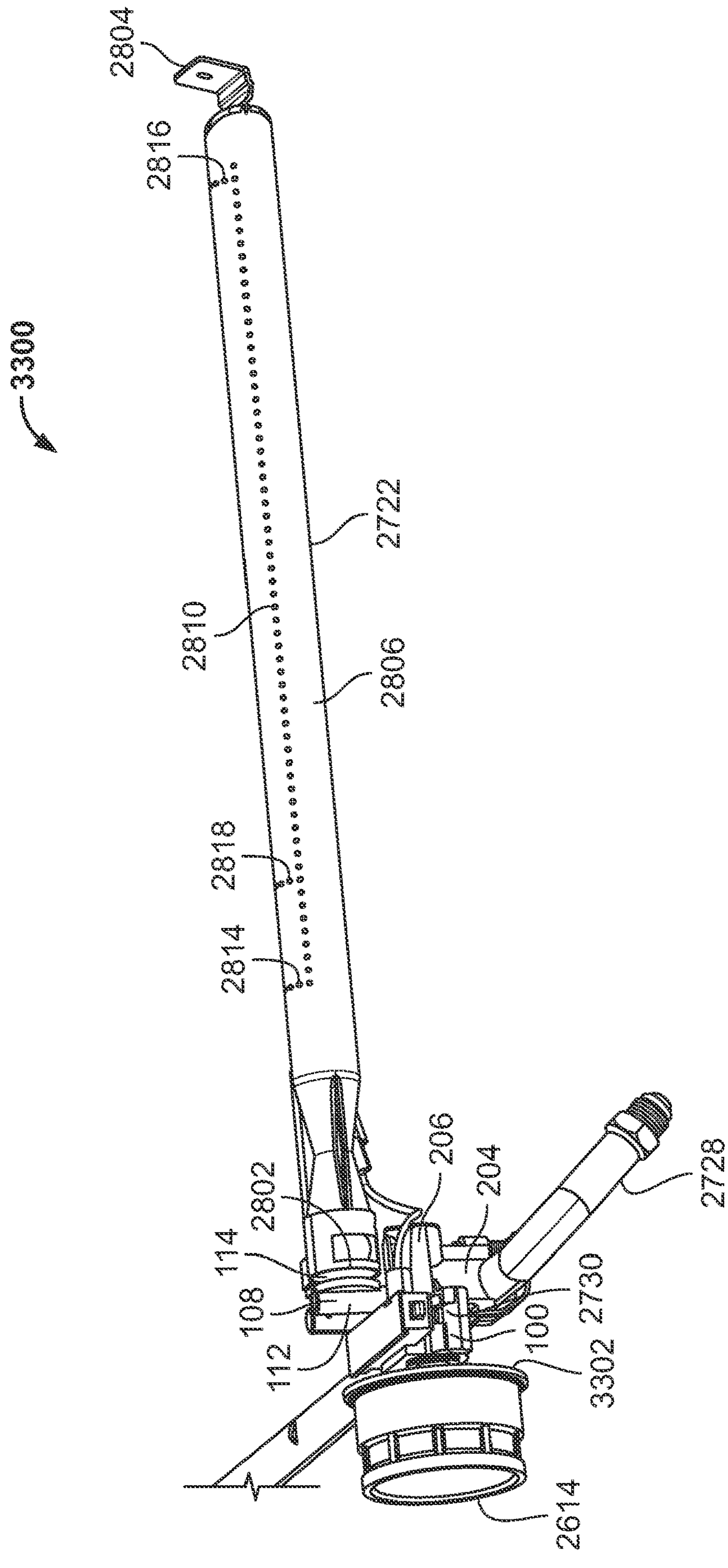
FIG. 33 is a perspective view of a portion of an example burner assembly of the grill of FIGS. 26 and 27.
Figure 34:
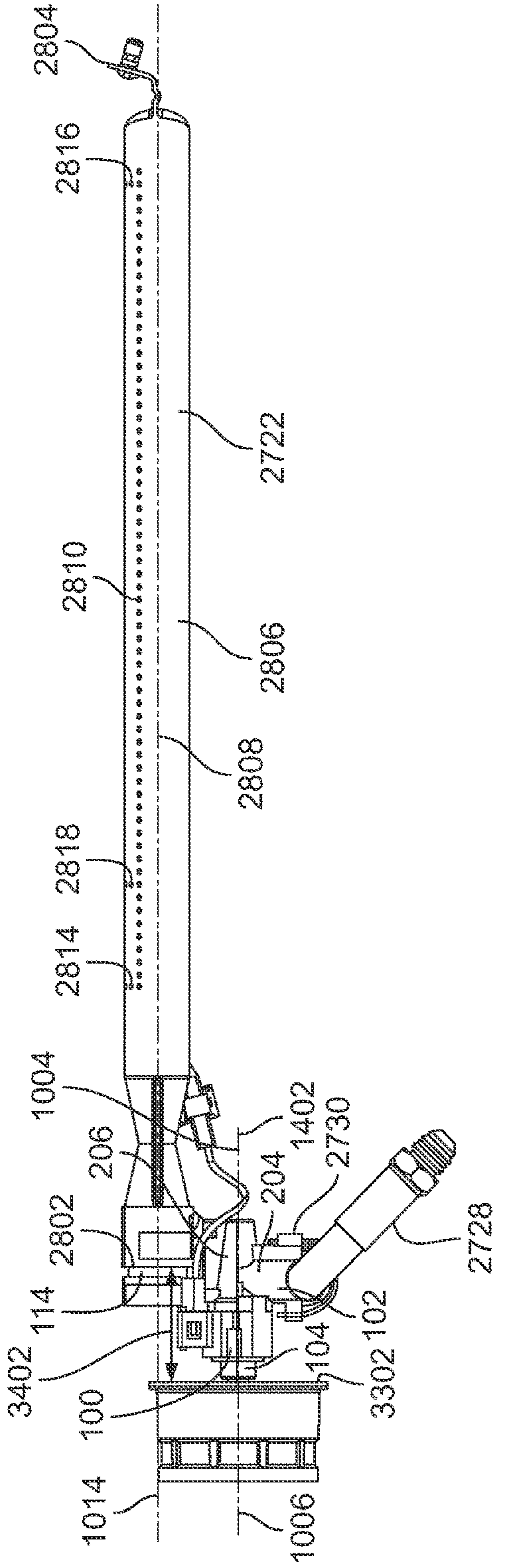
FIG. 34 is a side view of the burner assembly of FIG. 33.

FIG. 33 is a perspective view of a portion of an example burner assembly 3300 of the grill 2600 of FIGS. 26 and 27. FIG. 34 is a side view of the burner assembly 3300 of FIG. 33. The illustrated portion of the burner assembly 3300 of FIGS. 33 and 34 includes the manifold 2728, the first control valve 2730, the first burner tube 2722, and the first control knob 2614 of the grill 2600. Although not shown in FIGS. 33 and 34, the burner assembly 3300 can additionally include the second control valve 2732, the second burner tube 2724, the second control knob 2616, the third control valve 2734, the third burner tube 2726, and the third control knob 2618 of the grill 2600. The first control valve 2730 of FIGS. 33 and 34 is implemented by an instance of the gas valve 100 of FIGS. 1-25 described above.

In the illustrated example of FIGS. 33 and 34, the inlet 202 and/or the first end 212 of the inlet conduit 204 of the gas valve 100 is/are configured to be fluidically coupled to the manifold 2728 such that pressurized fluid (e.g., pressurized gas) present in and/or flowing through the manifold 2728 is able to flow from an outlet and/or an opening of the manifold 2728 into the inlet 202 and/or into the first end 212 of the inlet conduit 204. The second end 218 of the first outlet conduit 108 of the gas valve 100 and/or the first outlet 208 of the gas valve 100 is/are configured to be fluidically coupled to the open first end 2802 of the first burner tube 2722 such that pressurized fluid (e.g., pressurized gas) present in and/or flowing through the first outlet conduit 108 and/or the first outlet 208 is able to flow from the first outlet conduit 108 and/or the first outlet 208 into the open first end 2802 of the first burner tube 2722. The first control knob 2614 is mechanically coupled to the stem 104 of the gas valve 100 such that rotation of the first control knob 2614 causes a corresponding rotation of the stem 104 about the axis of rotation 1006 of the stem 104, which is coaxially aligned with the central axis of the chamber 904 as well as the central axis 1402 of the cone 1200 of the gas valve 100.

In the illustrated example of FIGS. 33 and 34, the central axis 2808 of the first burner tube 2722 is coaxially aligned with the central axis 1014 of the fourth linear segment 922 of the first outlet flow channel 906 of the gas valve 100. Furthermore, the central axis of the first burner tube 2722 is parallel to and offset from the axis of rotation 1006 of the stem 104, parallel to and offset from the central axis of the chamber 904, and/or parallel to and offset from the central axis 1402 of the cone 1200 of the gas valve 100. For example, as shown in FIGS. 33 and 34, the central axis of the first burner tube 2722 is parallel to and located above the axis of rotation 1006 of the stem 104, parallel to and located above the central axis of the chamber 904, and parallel to and located above the central axis 1402 of the cone 1200 of the gas valve 100.

As described above in connection with FIGS. 9-11, the serpentine (e.g., S-shaped) portion of the gas train 900 of FIGS. 9-11 advantageously reduces (e.g., minimizes) the front-to-rear distance between the inlet 202 of the gas valve 100 and the first outlet 208 of the gas valve 100, and/or the front-to-rear distance between the stem 104 of the gas valve 100 and the first outlet 208 of the gas valve 100. As shown in FIGS. 33 and 34, the serpentine (e.g., S-shaped) portion of the gas train 900 of FIGS. 9-11 also advantageously reduces (e.g., minimizes) the front-to-rear distance between an example rear end 3302 of the first control knob 2614 and the first end 2802 (e.g., the front end) of the first burner tube 2722. In the illustrated example of FIGS. 33 and 34, the example distance 3402 between the rear end 3302 of the first control knob 2614 and the first end 2802 (e.g., the front end) of the first burner tube 2722 is approximately 1.8 inches. In other examples, the distance 3402 between the rear end 3302 of the first control knob 2614 and the first end 2802 (e.g., the front end) of the first burner tube 2722 can be between 0.5 and 3.0 inches. The improved space efficiency associated with this/these reduced dimension(s) of the burner assembly 3300 advantageously enables the gas valve 100 of the burner assembly 3300 to be disposed within a correspondingly smaller (e.g., reduced depth) control panel chamber of the grill 2600, and also advantageously enables the first burner tube 2722 of the grill 2600 to be located closer to an interior of the front wall 2702 of the cookbox 2602 of the grill 2600, as further described herein.

Figure 35:
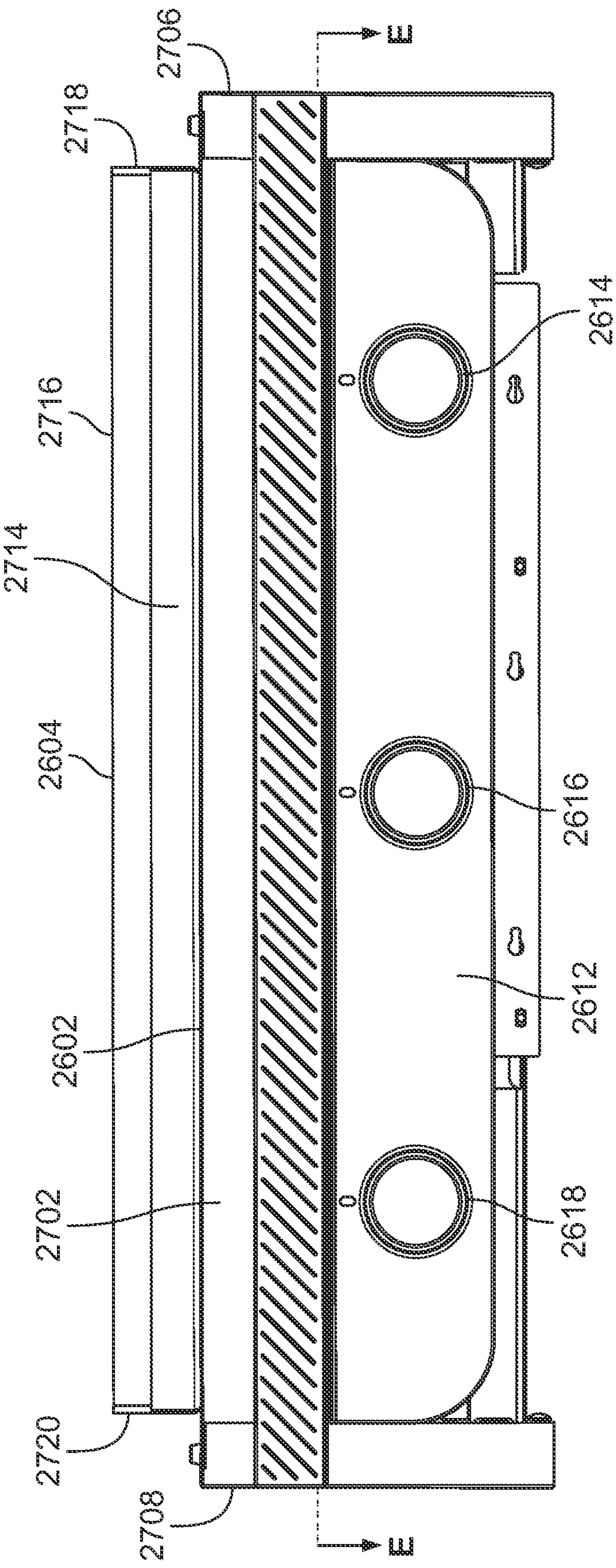
FIG. 35 is a front view showing the grill of FIGS. 26 and 27, with the frame, the lid, and certain other structural features of the grill omitted for enhanced viewability.
Figure 36:
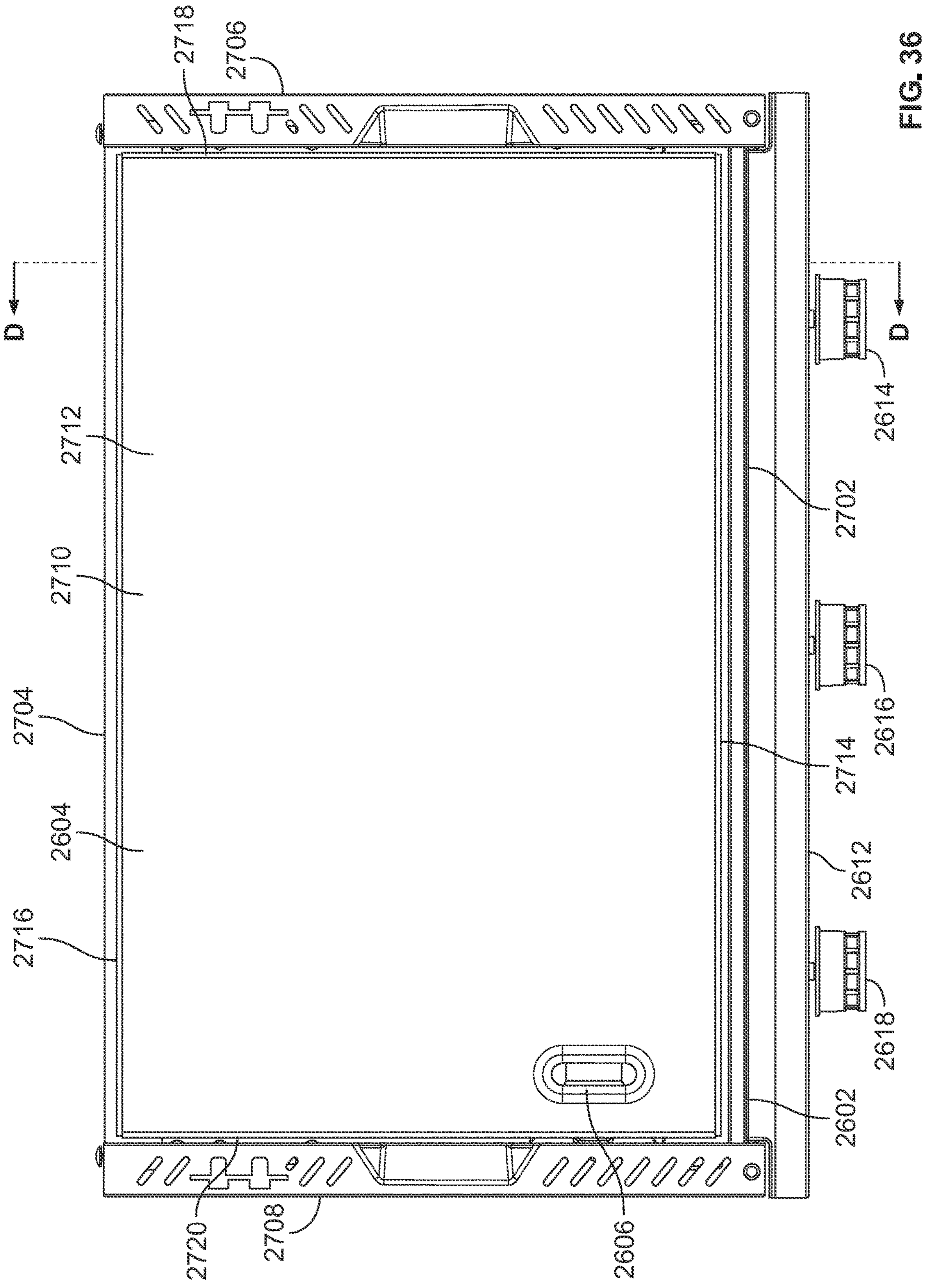
FIG. 36 is a top view of the grill of FIG. 35.
Figure 37:
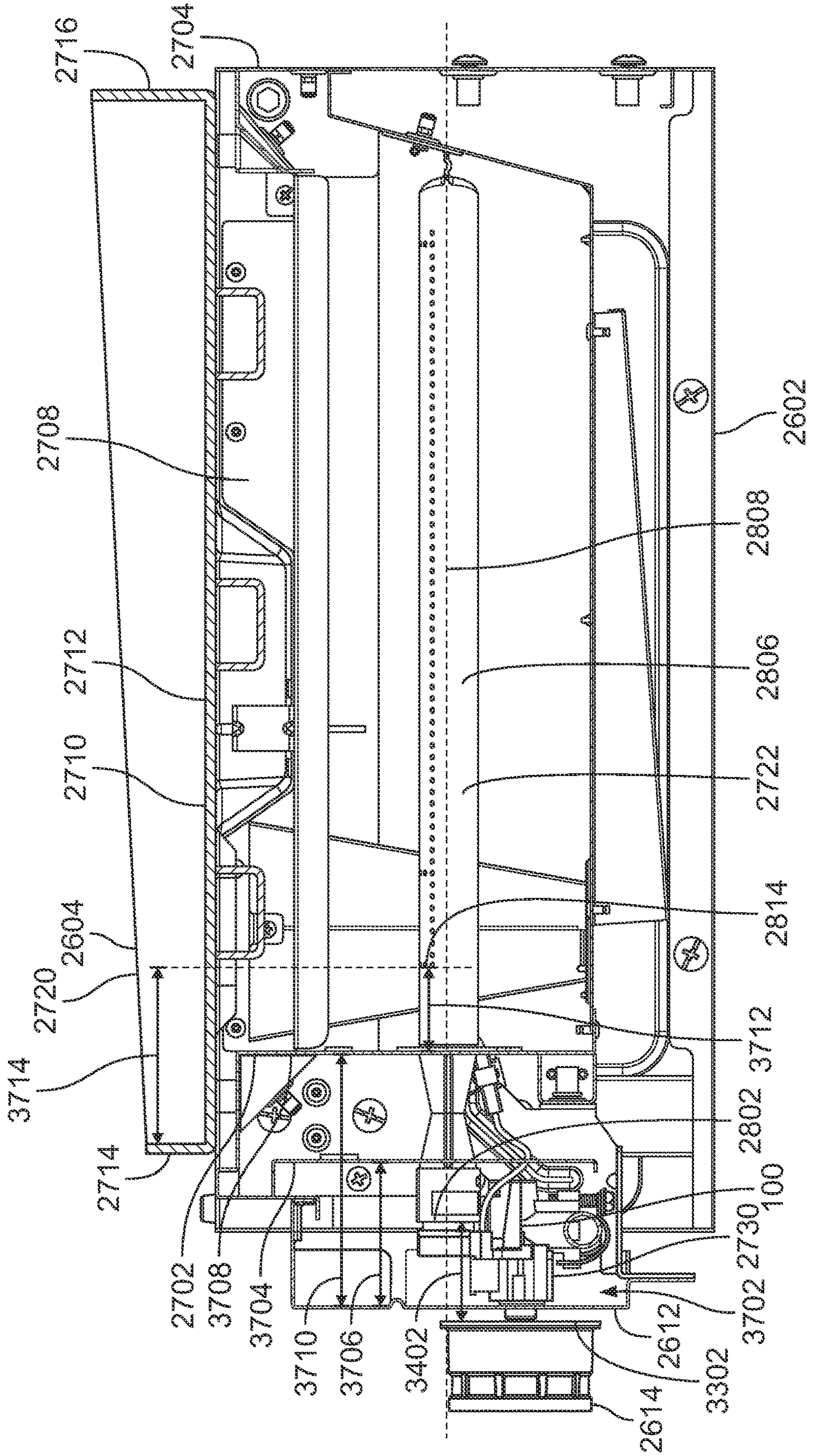
FIG. 37 is a cross-sectional view of the grill of FIGS. 35 and 36 taken along section D-D of FIG. 36.
Figure 38:
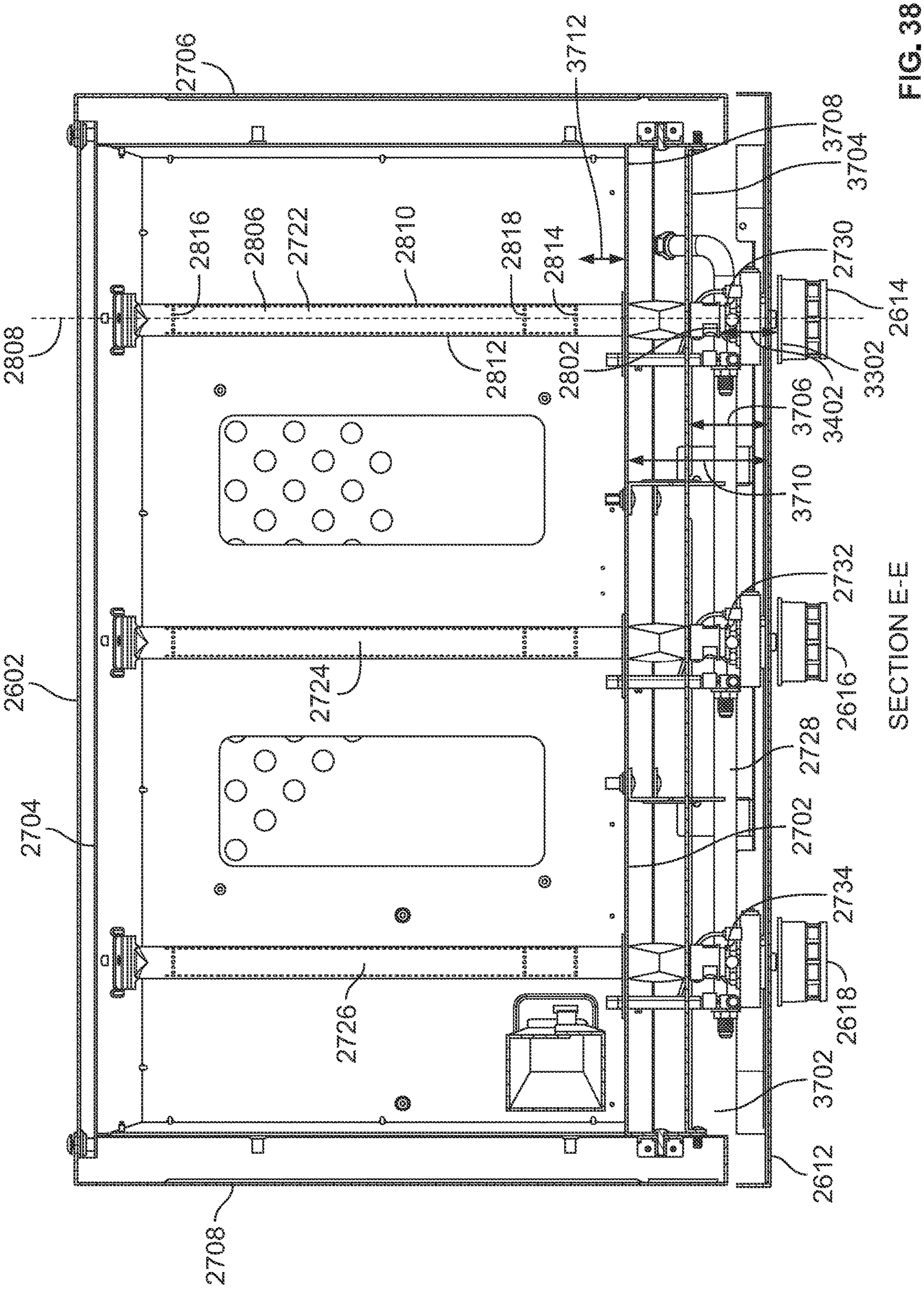
FIG. 38 is a cross-sectional view of the grill of FIGS. 35-37 taken along section E-E of FIG. 35.

FIG. 35 is a front view showing the grill 2600 of FIGS. 26 and 27, with the frame 2620, the lid 2634, and certain other structural features of the grill 2600 omitted for enhanced viewability. FIG. 36 is a top view of the grill 2600 of FIG. 35. FIG. 37 is a cross-sectional view of the grill 2600 of FIGS. 35 and 36 taken along section D-D of FIG. 36. FIG. 38 is a cross-sectional view of the grill 2600 of FIGS. 35-37 taken along section E-E of FIG. 35. As shown in FIGS. 35-38, the griddle 2604 of the grill 2600 is disposed on or above the cookbox 2602 of the grill 2600. As further shown in FIGS. 35-38, the grill 2600 includes an example control panel chamber 3702 located between the control panel 2612 of the grill 2600 and the front wall 2702 of the cookbox 2602 of the grill 2600.

As discussed above in connection with FIGS. 33 and 34 and further shown in FIGS. 35-38, the distance 3402 between the rear end 3302 of the first control knob 2614 of the grill 2600 and the first end 2802 (e.g., the front end) of the first burner tube 2722 of the grill 2600 is approximately 1.8 inches. In other examples, the distance 3402 between the rear end 3302 of the first control knob 2614 of the grill 2600 and the first end 2802 (e.g., the front end) of the first burner tube 2722 of the grill 2600 can be between 0.5 and 3.0 inches. The improved space efficiency associated with this/these reduced dimension(s) of the burner assembly 3300 advantageously enables the control panel chamber 3702 of the grill 2600 to be configured with a correspondingly reduced depth. For example, as shown in FIGS. 35-38, the control panel 2612 of the grill 2600 is spaced apart from an example exterior surface 3704 of the front wall 2702 of the cookbox 2602 of the grill 2600 by an example distance 3706 of approximately 2.5 inches measured depthwise from the control panel 2612 to the exterior surface 3704 of the front wall 2702 of the cookbox 2602. In other examples, the distance 3706 at which the control panel 2612 of the grill 2600 is spaced apart from the exterior surface 3704 of the front wall 2702 of the cookbox 2602 of the grill 2600 can be between 1.0 and 4.0 inches. As another example, as shown in FIGS. 35-38, the control panel 2612 of the grill 2600 is spaced apart from an example interior surface 3708 of the front wall 2702 of the cookbox 2602 of the grill 2600 by an example distance 3710 of approximately 4.4 inches measured depthwise from the control panel 2612 to the interior surface 3708 of the front wall 2702 of the cookbox 2602. In other examples, the distance 3710 at which the control panel 2612 of the grill 2600 is spaced apart from the interior surface 3708 of the front wall 2702 of the cookbox 2602 of the grill 2600 can be between 3.0 and 6.0 inches.

In the illustrated example of FIGS. 35-38, the third row of ports 2814 formed on the outer wall 2806 of the first burner tube 2722 is positioned inwardly from the interior surface 3708 of the front wall 2702 of the cookbox 2602 by an example distance 3712 of approximately 1.5 inches measured depthwise (e.g., along the central axis 2808 of the first burner tube 2722) from the interior surface 3708 of the front wall 2702 of the cookbox 2602 to the third row of ports 2814 of the first burner tube 2722. In other examples, the distance 3712 at which the third row of ports 2814 of the first burner tube 2722 is positioned inwardly from the interior surface 3708 of the front wall 2702 of the cookbox 2602 can be between 1.0 and 6.0 inches. Satisfaction of the above-described range of the distance 3712 at which the third row of ports 2814 of the first burner tube 2722 is positioned inwardly from the interior surface 3708 of the front wall 2702 of the cookbox 2602 advantageously improves the operating efficiency of the cooking engine of the grill 2600, and also improves the heat distribution properties associated with the griddle 2604 of the grill 2600. In this regard, satisfaction of the above-described range of the distance 3712 at which the third row of ports 2814 of the first burner tube 2722 is positioned inwardly from the interior surface 3708 of the front wall 2702 of the cookbox 2602 advantageously assists in minimizing any temperature variation across the flat top cooking surface 2712 of the griddle 2604 during cooking operations performed thereon.

In the illustrated example of FIGS. 35-38, the third row of ports 2814 formed on the outer wall 2806 of the first burner tube 2722 is positioned inwardly from the front lip 2714 of the griddle 2604 by an example distance 3714 of approximately 3.3 inches measured depthwise (e.g., along the central axis 2808 of the first burner tube 2722) from the front lip 2714 of the griddle 2604 to the third row of ports 2814 of the first burner tube 2722. In other examples, the distance 3714 at which the third row of ports 2814 of the first burner tube 2722 is positioned inwardly from the front lip 2714 of the griddle 2604 can be between 1.0 and 6.0 inches. Satisfaction of the above-described range of the distance 3714 at which the third row of ports 2814 of the first burner tube 2722 is positioned inwardly from the front lip 2714 of the griddle 2604 advantageously improves the operating efficiency of the cooking engine of the grill 2600, and also improves the heat distribution properties associated with the griddle 2604 of the grill 2600. In this regard, satisfaction of the above-described range of the distance 3714 at which the third row of ports 2814 of the first burner tube 2722 is positioned inwardly from the front lip 2714 of the griddle 2604 advantageously assists in minimizing any temperature variation across the flat top cooking surface 2712 of the griddle 2604 during cooking operations performed thereon.

The following paragraphs provide various examples in relation to the disclosed space efficient gas valves for grills.

Example 1 includes a gas valve. In Example 1, the gas valve includes a chamber, a flow control member, an inlet conduit, an outlet conduit, and a stem. The flow control member is disposed within the chamber. The flow control member is rotatable within the chamber between an open position and a closed position. The inlet conduit extends downwardly from the chamber. The inlet conduit includes an inlet flow channel having an inlet. The outlet conduit extends upwardly from the chamber. The outlet conduit includes an outlet flow channel having an outlet. The stem is operatively coupled to the flow control member such that rotation of the stem about an axis of rotation of the stem causes a corresponding rotation of the flow control member within the chamber about an axis of rotation of the flow control member. The outlet of the outlet flow channel is located above the axis of rotation of the of the flow control member.

Example 2 includes the gas valve of Example 1. In Example 2, the inlet conduit is configured to be coupled to a manifold of a grill such that the inlet is in fluid communication with the manifold. In Example 2, the outlet conduit is configured to be coupled to a burner tube of the grill such that the outlet is in fluid communication with the burner tube.

Example 3 includes the gas valve of Example 1. In Example 3, the axis of rotation of the flow control member is coaxially aligned with the axis of rotation of the stem.

Example 4 includes the gas valve of Example 1. In Example 4, the chamber includes an inlet opening and an outlet opening, and the flow control member includes a flow chamber having an inlet opening and an outlet opening.

Example 5 includes the gas valve of Example 4. In Example 5, the inlet flow channel of the inlet conduit is in fluid communication with the flow chamber of the flow control member via the inlet opening of the chamber and the inlet opening of the flow chamber when the flow control member is in the open position. In Example 5, the inlet flow channel of the inlet conduit is not in fluid communication with the flow chamber of the flow control member when the flow control member is in the closed position.

Example 6 includes the gas valve of Example 5. In Example 6, the outlet flow channel of the outlet conduit is in fluid communication with the flow chamber of the flow control member via the outlet opening of the flow control member and the outlet opening of the chamber when the flow control member is in the open position.

Example 7 includes the gas valve of Example 6. In Example 7, the outlet flow channel of the outlet conduit is also in fluid communication with the flow chamber of the flow control member via the outlet opening of the flow control member and the outlet opening of the chamber when the flow control member is in the closed position.

Example 8 includes the gas valve of Example 6. In Example 8, the outlet opening of the chamber is a first outlet opening of the chamber and the chamber further includes a second outlet opening. In Example 8, the outlet opening of the flow chamber is a first outlet opening of the flow chamber and the flow chamber further includes a second outlet opening. In Example 8, the outlet conduit is a first outlet conduit of the gas valve, the outlet flow channel is a first outlet flow channel, and the outlet is a first outlet. In Example 8, the gas valve further includes a second outlet conduit including a second outlet flow channel having a second outlet. In Example 8, the second outlet flow channel of the second outlet conduit is in fluid communication with the flow chamber of the flow control member via the second outlet opening of the flow chamber and the second outlet opening of the chamber when the flow control member is in the open position. In Example 8, the second outlet flow channel of the second outlet conduit is not in fluid communication with the flow chamber of the flow control member when the flow control member is in the closed position.

Example 9 includes the gas valve of Example 8. In Example 9, the second outlet conduit is configured to be coupled to an ignition conduit of a grill such that the second outlet is in fluid communication with the ignition conduit.

Example 10 includes the gas valve of Example 1. In Example 10, a gas train of the gas valve includes an S-shaped portion defined by the chamber and the outlet flow channel.

Example 11 includes the gas valve of Example 10. In Example 11, the outlet flow channel includes a first segment extending upwardly from and being in fluid communication with the chamber, a second segment extending forwardly from and being in fluid communication with the first segment, a third segment extending upwardly from and being in fluid communication with the second segment, and a fourth segment extending rearwardly from and being in fluid communication with the third segment. In Example 11, the fourth segment includes the outlet. In Example 11, the S-shaped portion of the gas train includes the chamber, the first segment, the second segment, the third segment, and the fourth segment.

Example 12 includes the gas valve of Example 11. In Example 12, the first segment, the second segment, the third segment, and the fourth segment are linear.

Example 13 includes the gas valve of Example 12. In Example 13, a central axis of the chamber, a central axis of the second segment, and a central axis of the fourth segment are parallel to one another and horizontally oriented. In Example 13, a central axis of the first segment and a central axis of the third segment are parallel to one another and vertically oriented.

Example 14 includes the gas valve of Example 13. In Example 14, the central axis of the second segment is located above the central axis of the chamber, the central axis of the fourth segment is located above the central axis of the second segment, and the central axis of the third segment is located forward of the central axis of the first segment.

Example 15 includes the gas valve of Example 14. In Example 15, the central axis of the third segment is parallel to and located forward of a central axis of the inlet flow channel.

Example 16 includes a grill. In Example 16, the grill includes a gas valve, a manifold, a burner tube, and a control knob. In Example 16, the gas valve includes a chamber, a flow control member, an inlet conduit, an outlet conduit, and a stem. The flow control member is disposed within the chamber. The flow control member is rotatable within the chamber between an open position and a closed position. The inlet conduit extends downwardly from the chamber. The inlet conduit includes an inlet flow channel having an inlet. The outlet conduit extends upwardly from the chamber. The outlet conduit includes an outlet flow channel having an outlet. The stem is operatively coupled to the flow control member such that rotation of the stem about an axis of rotation of the stem causes a corresponding rotation of the flow control member within the chamber about an axis of rotation of the flow control member. The axis of rotation of the flow control member is coaxially aligned with the axis of rotation of the stem. The outlet of the outlet flow channel is located above the axis of rotation of the of the flow control member. The manifold is coupled to the inlet conduit of the gas valve such that the inlet is in fluid communication with the manifold. The burner tube is coupled to the outlet conduit of the gas valve such that the outlet is in fluid communication with the burner tube. The control knob is operatively coupled to the stem such that rotation of the control knob causes a corresponding rotation of the stem.

Example 17 includes the grill of Example 16. In Example 17, a gas train of the gas valve includes an S-shaped portion defined by the chamber and the outlet flow channel.

Example 18 includes the grill of Example 17. In Example 18, the outlet flow channel includes a first segment extending upwardly from and being in fluid communication with the chamber, a second segment extending forwardly from and being in fluid communication with the first segment, a third segment extending upwardly from and being in fluid communication with the second segment, and a fourth segment extending rearwardly from and being in fluid communication with the third segment. In Example 18, the fourth segment includes the outlet. In Example 18, the S-shaped portion of the gas train includes the chamber, the first segment, the second segment, the third segment, and the fourth segment.

Example 19 includes the grill of Example 18. In Example 19, the first segment, the second segment, the third segment, and the fourth segment are linear. In Example 19, a central axis of the chamber, a central axis of the second segment, and a central axis of the fourth segment are parallel to one another and horizontally oriented. In Example 19, a central axis of the first segment and a central axis of the third segment are parallel to one another and vertically oriented.

In Example 20, the central axis of the second segment is located above the central axis of the chamber, the central axis of the fourth segment is located above the central axis of the second segment, the central axis of the third segment is located forward of the central axis of the first segment, and the central axis of the third segment is parallel to and located forward of a central axis of the inlet flow channel.

Although certain example apparatus, systems, methods, and articles of manufacture have been disclosed herein, the scope of coverage of this patent is not limited thereto. On the contrary, this patent covers all apparatus, systems, methods, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A gas valve, comprising:

a chamber;

a flow control member disposed within the chamber, the flow control member being rotatable within the chamber between an open position and a closed position;

an inlet conduit extending downwardly from the chamber, the inlet conduit including an inlet flow channel having an inlet;

an outlet conduit extending upwardly from the chamber, the outlet conduit including an outlet flow channel having an outlet, wherein a gas train of the gas valve includes an S-shaped portion defined by the chamber and the outlet flow channel; and a stem operatively coupled to the flow control member such that rotation of the stem about an axis of rotation of the stem causes a corresponding rotation of the flow control member within the chamber about an axis of rotation of the flow control member, wherein the outlet of the outlet flow channel is located above the axis of rotation of the of the flow control member.

2. The gas valve of claim 1, wherein the inlet conduit is configured to be coupled to a manifold of a grill such that the inlet is in fluid communication with the manifold, and wherein the outlet conduit is configured to be coupled to a burner tube of the grill such that the outlet is in fluid communication with the burner tube.

3. The gas valve of claim 1, wherein the axis of rotation of the flow control member is coaxially aligned with the axis of rotation of the stem.

4. The gas valve of claim 1, wherein the chamber includes an inlet opening and an outlet opening, and the flow control member includes a flow chamber having an inlet opening and an outlet opening.

5. The gas valve of claim 4, wherein the inlet flow channel of the inlet conduit is in fluid communication with the flow chamber of the flow control member via the inlet opening of the chamber and the inlet opening of the flow chamber when the flow control member is in the open position, and wherein the inlet flow channel of the inlet conduit is not in fluid communication with the flow chamber of the flow control member when the flow control member is in the closed position.

6. The gas valve of claim 5, wherein the outlet flow channel of the outlet conduit is in fluid communication with the flow chamber of the flow control member via the outlet opening of the flow control member and the outlet opening of the chamber when the flow control member is in the open position.

7. The gas valve of claim 6, wherein the outlet flow channel of the outlet conduit is also in fluid communication with the flow chamber of the flow control member via the outlet opening of the flow control member and the outlet opening of the chamber when the flow control member is in the closed position.

8. The gas valve of claim 6, wherein the outlet opening of the chamber is a first outlet opening of the chamber and the chamber further includes a second outlet opening, wherein the outlet opening of the flow chamber is a first outlet opening of the flow chamber and the flow chamber further includes a second outlet opening, wherein the outlet conduit is a first outlet conduit of the gas valve, the outlet flow channel is a first outlet flow channel, and the outlet is a first outlet, wherein the gas valve further comprises a second outlet conduit including a second outlet flow channel having a second outlet, wherein the second outlet flow channel of the second outlet conduit is in fluid communication with the flow chamber of the flow control member via the second outlet opening of the flow chamber and the second outlet opening of the chamber when the flow control member is in the open position, and wherein the second outlet flow channel of the second outlet conduit is not in fluid communication with the flow chamber of the flow control member when the flow control member is in the closed position.

9. The gas valve of claim 8, wherein the second outlet conduit is configured to be coupled to an ignition conduit of a grill such that the second outlet is in fluid communication with the ignition conduit.

10. The gas valve of claim 1, wherein the outlet flow channel includes a first segment extending upwardly from and being in fluid communication with the chamber, a second segment extending forwardly from and being in fluid communication with the first segment, a third segment extending upwardly from and being in fluid communication with the second segment, and a fourth segment extending rearwardly from and being in fluid communication with the third segment, wherein the fourth segment includes the outlet, wherein the S-shaped portion of the gas train includes the chamber, the first segment, the second segment, the third segment, and the fourth segment.

11. The gas valve of claim 10, wherein the first segment, the second segment, the third segment, and the fourth segment are linear.

12. The gas valve of claim 11, wherein a central axis of the chamber, a central axis of the second segment, and a central axis of the fourth segment are parallel to one another and horizontally oriented, and wherein a central axis of the first segment and a central axis of the third segment are parallel to one another and vertically oriented.

13. The gas valve of claim 12, wherein the central axis of the second segment is located above the central axis of the chamber, the central axis of the fourth segment is located above the central axis of the second segment, and the central axis of the third segment is located forward of the central axis of the first segment.

14. The gas valve of claim 13, wherein the central axis of the third segment is parallel to and located forward of a central axis of the inlet flow channel.

15. A grill, comprising:

a gas valve including:

a chamber;

a flow control member disposed within the chamber, the flow control member being rotatable within the chamber between an open position and a closed position;

an inlet conduit extending downwardly from the chamber, the inlet conduit including an inlet flow channel having an inlet;

an outlet conduit extending upwardly from the chamber, the outlet conduit including an outlet flow channel having an outlet, wherein a gas train of the gas valve includes an S-shaped portion defined by the chamber and the outlet flow channel; and a stem operatively coupled to the flow control member such that rotation of the stem about an axis of rotation of the stem causes a corresponding rotation of the flow control member within the chamber about an axis of rotation of the flow control member, wherein the axis of rotation of the flow control member is coaxially aligned with the axis of rotation of the stem, and wherein the outlet of the outlet flow channel is located above the axis of rotation of the of the flow control member;

a manifold coupled to the inlet conduit of the gas valve such that the inlet is in fluid communication with the manifold;

a burner tube coupled to the outlet conduit of the gas valve such that the outlet is in fluid communication with the burner tube; and a control knob operatively coupled to the stem such that rotation of the control knob causes a corresponding rotation of the stem.

16. The grill of claim 15, wherein the outlet flow channel includes a first segment extending upwardly from and being in fluid communication with the chamber, a second segment extending forwardly from and being in fluid communication with the first segment, a third segment extending upwardly from and being in fluid communication with the second segment, and a fourth segment extending rearwardly from and being in fluid communication with the third segment, wherein the fourth segment includes the outlet, wherein the S-shaped portion of the gas train includes the chamber, the first segment, the second segment, the third segment, and the fourth segment.

17. The grill of claim 16, wherein the first segment, the second segment, the third segment, and the fourth segment are linear, wherein a central axis of the chamber, a central axis of the second segment, and a central axis of the fourth segment are parallel to one another and horizontally oriented, and wherein a central axis of the first segment and a central axis of the third segment are parallel to one another and vertically oriented.

18. The grill of claim 17, wherein the central axis of the second segment is located above the central axis of the chamber, the central axis of the fourth segment is located above the central axis of the second segment, the central axis of the third segment is located forward of the central axis of the first segment, and the central axis of the third segment is parallel to and located forward of a central axis of the inlet flow channel.

19. The grill of claim 15, wherein the chamber includes an inlet opening and an outlet opening, and the flow control member includes a flow chamber having an inlet opening and an outlet opening, wherein the inlet flow channel of the inlet conduit is in fluid communication with the flow chamber of the flow control member via the inlet opening of the chamber and the inlet opening of the flow chamber when the flow control member is in the open position, wherein the inlet flow channel of the inlet conduit is not in fluid communication with the flow chamber of the flow control member when the flow control member is in the closed position, and wherein the outlet flow channel of the outlet conduit is in fluid communication with the flow chamber of the flow control member via the outlet opening of the flow control member and the outlet opening of the chamber when the flow control member is in the open position and also when the flow control member is in the closed position.

20. The grill of claim 19, wherein the outlet opening of the chamber is a first outlet opening of the chamber and the chamber further includes a second outlet opening, wherein the outlet opening of the flow chamber is a first outlet opening of the flow chamber and the flow chamber further includes a second outlet opening, wherein the outlet conduit is a first outlet conduit of the gas valve, the outlet flow channel is a first outlet flow channel, and the outlet is a first outlet, wherein the gas valve further includes a second outlet conduit including a second outlet flow channel having a second outlet, wherein the second outlet flow channel of the second outlet conduit is in fluid communication with the flow chamber of the flow control member via the second outlet opening of the flow chamber and the second outlet opening of the chamber when the flow control member is in the open position, wherein the second outlet flow channel of the second outlet conduit is not in fluid communication with the flow chamber of the flow control member when the flow control member is in the closed position, and wherein the second outlet conduit is coupled to an ignition conduit of the grill such that the second outlet is in fluid communication with the ignition conduit.

* * * * *